US010029378B2

(12) United States Patent
Mathieu et al.

(10) Patent No.: US 10,029,378 B2
(45) Date of Patent: Jul. 24, 2018

(54) SYSTEM AND METHOD FOR REDUCING GIVEAWAY MATERIAL ON MINT PRODUCTS

(71) Applicant: ROYAL CANADIAN MINT, Ottawa (CA)

(72) Inventors: Yanick Mathieu, Gatineau (CA); David John Stanley Baldwin, Ottawa (CA); Frederick Leclerc, Gatineau (CA); Thomas Hrach, Perchtoldsdorf (AT); Mag. Hermann Schurer, Vienna (AT)

(73) Assignee: Royal Canadian Mint, Ottawa, Ontario (CA)

( * ) Notice: Subject to any disclaimer, the term of this patent is extended or adjusted under 35 U.S.C. 154(b) by 407 days.

(21) Appl. No.: 14/039,827

(22) Filed: Sep. 27, 2013

(65) Prior Publication Data

US 2014/0101924 A1    Apr. 17, 2014

Related U.S. Application Data

(63) Continuation of application No. PCT/CA2012/050192, filed on Mar. 28, 2012.
(Continued)

(51) Int. Cl.
*B62D 5/00* (2006.01)
*B26D 5/00* (2006.01)
(Continued)

(52) U.S. Cl.
CPC ................. *B26D 5/00* (2013.01); *B44B 5/00* (2013.01); *G01G 19/00* (2013.01); *A44C 21/00* (2013.01);
(Continued)

(58) Field of Classification Search
CPC .......... A44C 21/00; A44C 27/00; B26D 5/00; B21D 53/44; Y10T 29/49995;
(Continued)

(56) References Cited

U.S. PATENT DOCUMENTS 1,374,075 A    4/1921   Graham
3,096,837 A *  7/1963   Abbott ..................... A21O 5/00
                                                141/83
(Continued)

FOREIGN PATENT DOCUMENTS

CN    1057496 A    1/1992
CN    1236584 A    12/1999
(Continued)

OTHER PUBLICATIONS

International Search Report corresponding to International Application No. PCT/CA2012/050192 mailed May 24, 2012.
(Continued)

*Primary Examiner* — Christopher M Koehler
(74) *Attorney, Agent, or Firm* — Myers Bigel, P.A.

(57) ABSTRACT

A machine and method for reducing giveaway material on mint products. The machine may include a conveying assembly for conveying a plurality of mints products to be processed. The machine may also include a processing assembly for processing at least one given mint product at a time, so as to remove an amount of giveaway material from each one of the mint products. The machine may also include a recuperating assembly for recuperating mint products having being processed. The method may include the steps of a) evaluating at least one physical parameter of a given mint product to be processed; b) comparing said at least one physical parameter of the mint product to be processed with a minimum threshold physical parameter in order to determine an attainable range of giveaway material
(Continued)

to be removed; c) projecting a targeted amount of giveaway material to be removed from the mint product to be processed depending on the attainable range of giveaway material; and d) removing the targeted amount of giveaway material via at least one surface of the mint product.

73 Claims, 55 Drawing Sheets

Related U.S. Application Data

(60) Provisional application No. 61/468,385, filed on Mar. 28, 2011, provisional application No. 61/510,848, filed on Jul. 22, 2011, provisional application No. 61/540,813, filed on Sep. 29, 2011, provisional application No. 61/603,546, filed on Feb. 27, 2012.

(51) Int. Cl.
  B44B 5/00 (2006.01)
  G01G 19/00 (2006.01)
  A44C 21/00 (2006.01)
  A44C 27/00 (2006.01)

(52) U.S. Cl.
  CPC ......... *A44C 27/00* (2013.01); *Y10T 29/49995* (2015.01)

(58) Field of Classification Search
  CPC ......... Y10T 29/49764; Y10T 29/49771; Y10T 29/49776; Y10T 29/49751; Y10T 29/53022; Y10T 29/53039; Y10T 29/53043
  USPC ............... 73/163, 1.01; 164/458, 4.1, 155.7; 177/60, 62
  See application file for complete search history.

(56) References Cited

U.S. PATENT DOCUMENTS

| | | | |
|---|---|---|---|
| 3,811,522 A * | 5/1974 | Wolf | B44B 5/024 101/18 |
| 3,908,493 A | 9/1975 | Sivachenko | |
| 3,956,692 A * | 5/1976 | Weinberg | G01N 27/023 194/319 |
| 4,006,527 A | 2/1977 | Sivachenko | |
| 4,063,346 A | 12/1977 | Simpson et al. | |
| 4,120,121 A | 10/1978 | Surman | |
| 4,223,751 A * | 9/1980 | Ayers | B07C 5/16 177/210 C |
| 4,226,054 A | 10/1980 | Coty | |
| 4,279,968 A | 7/1981 | Ruscoe et al. | |
| 4,316,645 A | 2/1982 | Korwin | |
| 4,373,300 A | 2/1983 | Partridge | |
| 4,426,225 A | 1/1984 | Ida et al. | |
| 4,427,442 A | 1/1984 | Day | |
| 4,668,289 A | 5/1987 | Langer et al. | |
| 4,868,951 A * | 9/1989 | Akesson | A22C 25/12 177/145 |
| 4,899,392 A * | 2/1990 | Merton | G07D 5/005 194/302 |
| 5,094,922 A | 3/1992 | Ielpo et al. | |
| 5,133,019 A * | 7/1992 | Merton | G07D 5/005 194/302 |
| 5,139,886 A | 8/1992 | Truong et al. | |
| 5,151,167 A | 9/1992 | Truong et al. | |
| 5,195,626 A | 3/1993 | Le Hong et al. | |
| 5,293,981 A | 3/1994 | Abe et al. | |
| 5,554,070 A | 9/1996 | Takatoshi et al. | |
| 5,624,019 A | 4/1997 | Furneaux | |
| 5,630,288 A | 5/1997 | Lasset et al. | |
| 5,842,916 A | 12/1998 | Gerrity et al. | |
| 6,044,541 A | 4/2000 | Truong | |
| 6,174,230 B1 | 1/2001 | Gerrity et al. | |
| 6,186,424 B1 | 2/2001 | Uno et al. | |
| 6,340,424 B1 * | 1/2002 | Elman | B23H 9/10 205/645 |
| 6,484,884 B1 | 11/2002 | Gerrity et al. | |
| 6,499,581 B2 | 12/2002 | Yoshida et al. | |
| 6,547,649 B1 | 4/2003 | Andrus | |
| 6,560,547 B1 | 5/2003 | Bartsch et al. | |
| 6,592,769 B1 | 7/2003 | Erickson | |
| 6,666,318 B2 | 12/2003 | Gerrity et al. | |
| 6,722,012 B1 | 4/2004 | Texeira et al. | |
| 6,805,618 B1 | 10/2004 | Ward et al. | |
| 7,014,029 B2 | 3/2006 | Winters | |
| 7,017,729 B2 | 3/2006 | Gerrity et al. | |
| 7,464,802 B2 | 12/2008 | Gerrity et al. | |
| 7,967,125 B2 | 6/2011 | Ishimatsu et al. | |
| 2003/0111204 A1 | 6/2003 | Holzgruber et al. | |
| 2004/0068341 A1 * | 4/2004 | Minucciani | B23K 26/03 700/110 |
| 2004/0103512 A1 | 6/2004 | Fitch | |
| 2004/0173434 A1 | 9/2004 | Morita et al. | |
| 2005/0252339 A1 | 11/2005 | Cascone | |
| 2009/0288794 A1 | 11/2009 | Lynn | |
| 2010/0294015 A1 | 11/2010 | Fahrenbach | |
| 2011/0184697 A1 | 7/2011 | Tada | |
| 2012/0032013 A1 | 2/2012 | Rice et al. | |
| 2014/0041825 A1 * | 2/2014 | Faoro | B22D 7/005 164/493 |

FOREIGN PATENT DOCUMENTS

| | | |
|---|---|---|
| CN | 101003238 A | 7/2007 |
| CN | 101134293 A | 3/2008 |
| CN | 101144777 A | 3/2008 |
| DE | 7314223 | 8/1973 |
| EP | 1918125 A2 | 5/2008 |
| FR | 2303447 A7 | 10/1976 |

OTHER PUBLICATIONS

Written Opinion of the International Searching Authority corresponding to International Application No. PCT/CA2012/050192 mailed May 24, 2012.

International Preliminary Report on Patentability corresponding to International Application No, PCT/CA2012/050192 mailed Jul. 17, 2013.

Ruddy, J.F., "Photograde: Official Photographic Grading Guide for the United States Coins", Chapter 5—Grades and Prices, Surface Characteristics, Characteristics of the Planchet, p. 48-49, 2005.

\* cited by examiner

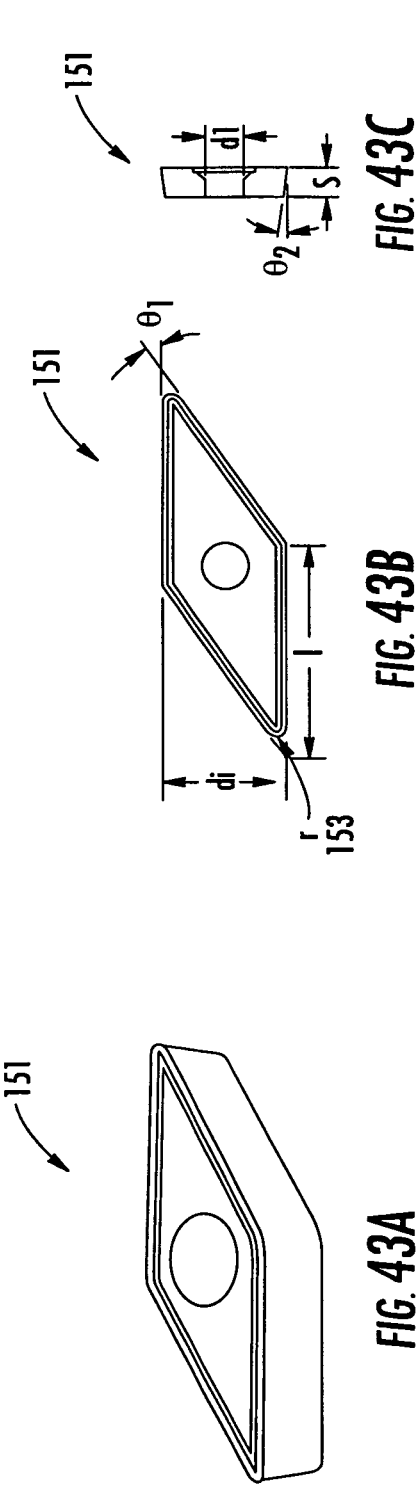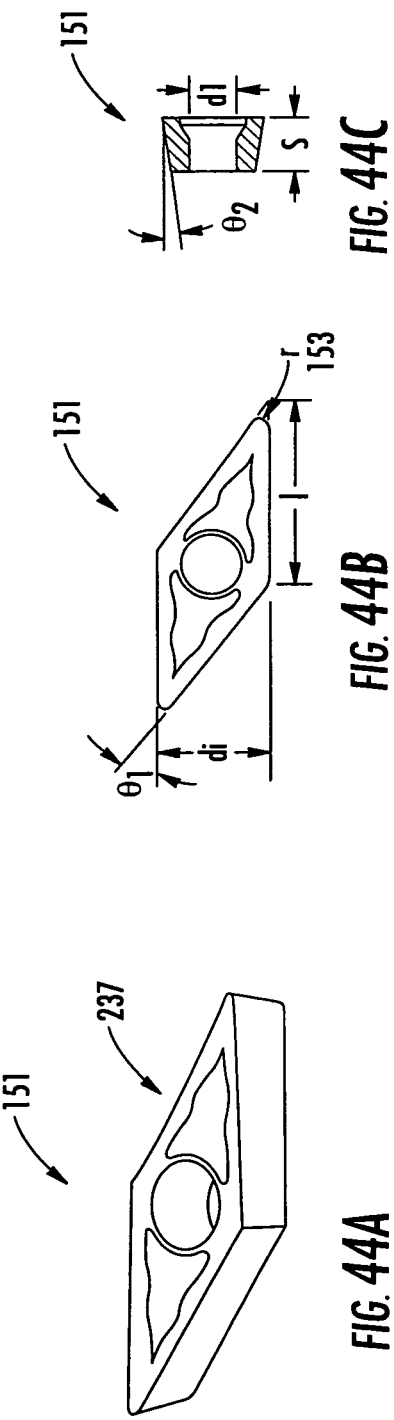

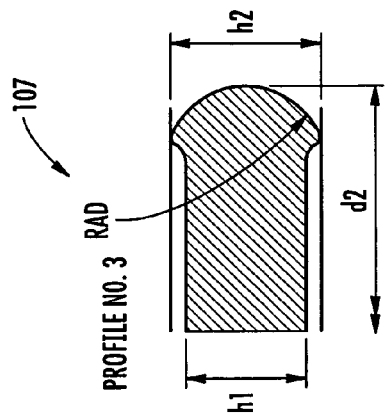
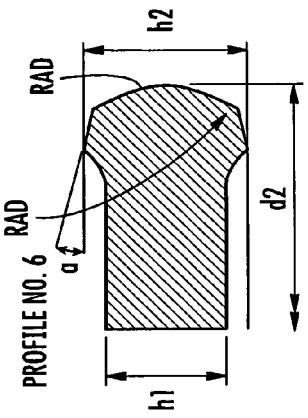
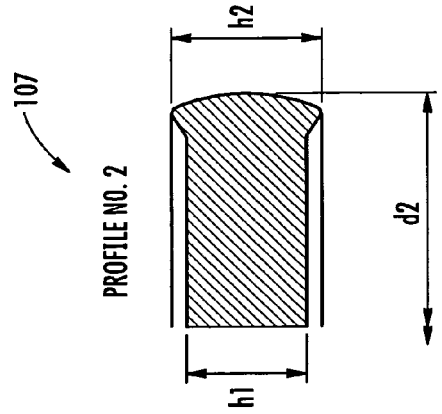
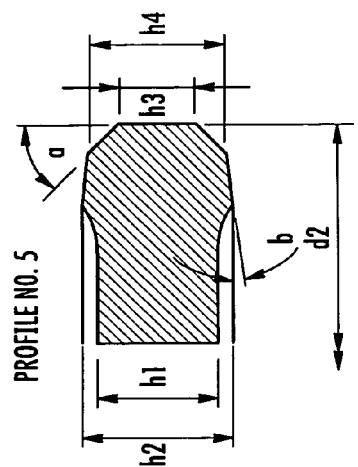
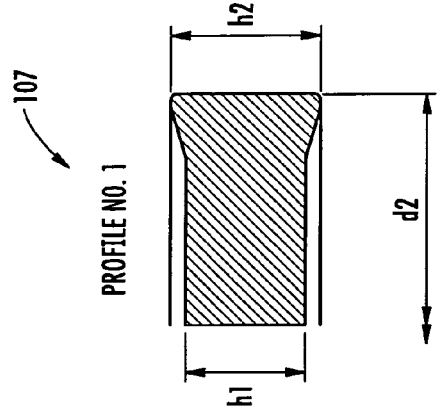
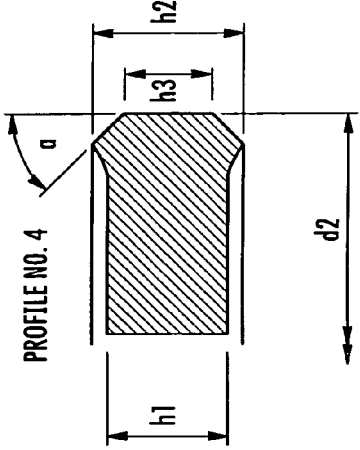

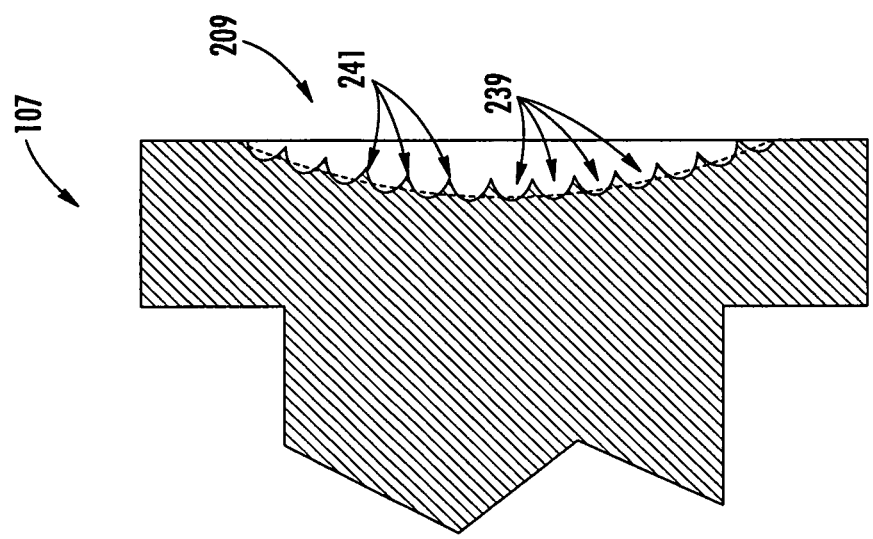
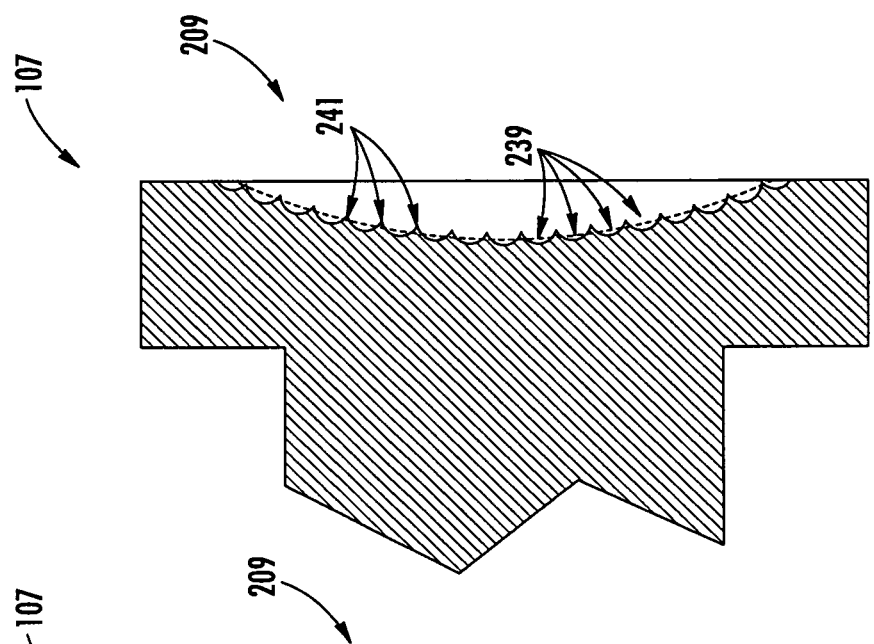
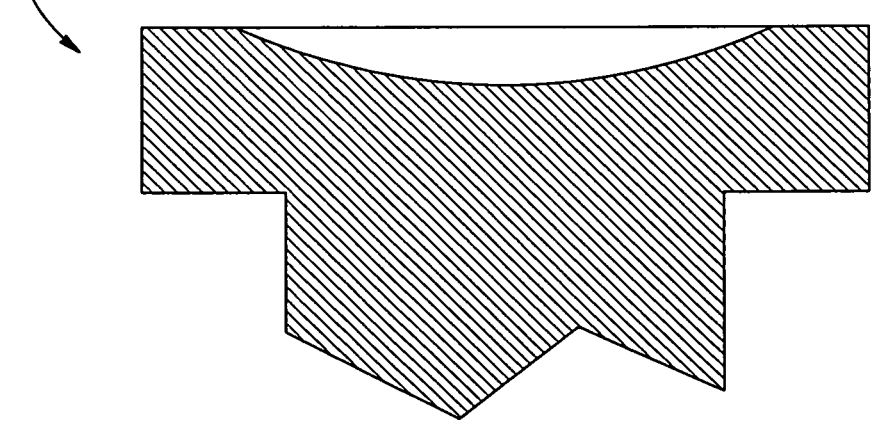

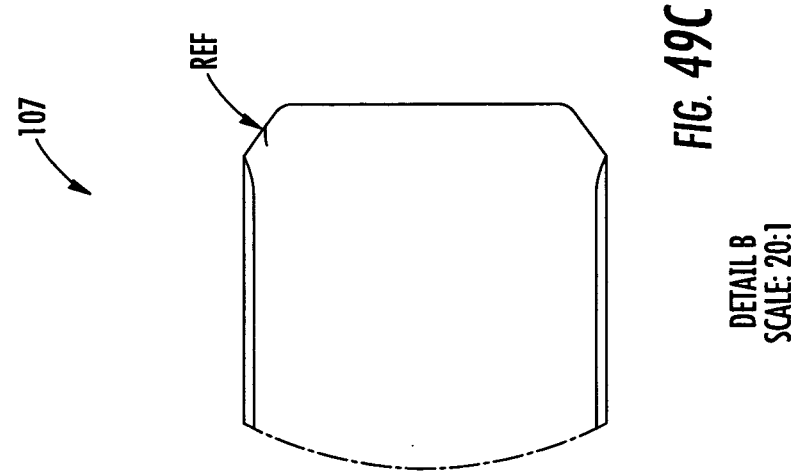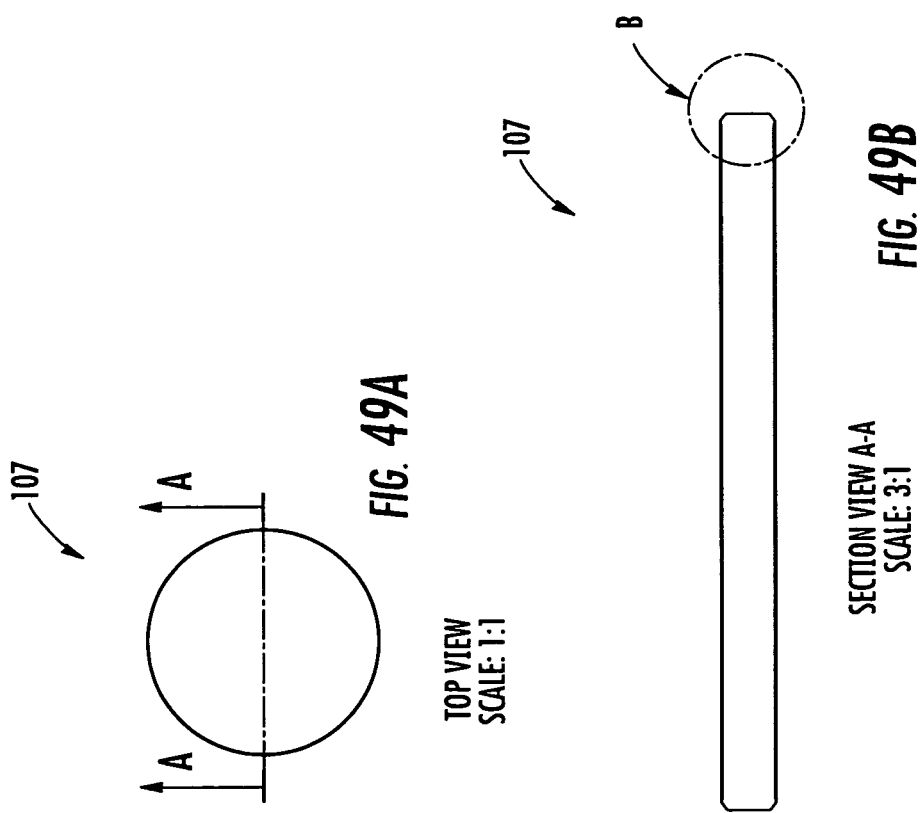

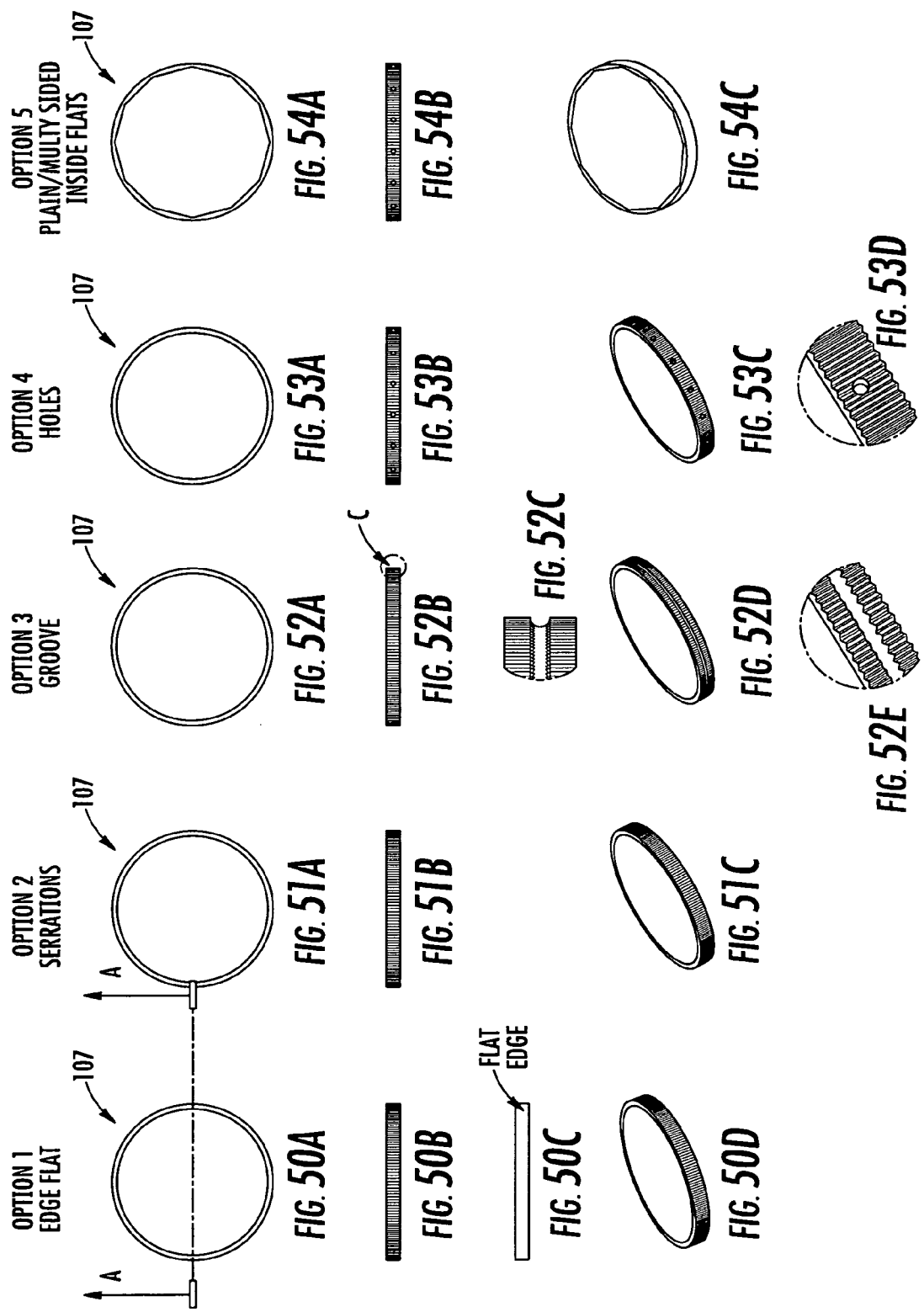

FIG. 69A

| DATE | TIME | BLANK COUNTER | EMPLOYEE | BLANK TYPE | WEIGHT SCALE | CALCULATED AMOUNT | WEIGH SCALE2 | DEC SCALE2 | AMOUNT REMOVED | TOOL | MS | TOTAL REMOVED | QUANTITY REMOVED |
|---|---|---|---|---|---|---|---|---|---|---|---|---|---|
| 2/7/2012 | 07:59:55 | 99 | MR. X | SILVER A | 31.474 | 0.344 | 31.130 | 1 | 0.344 | 1 | 1 | | 0.365 |
| 2/7/2012 | 07:59:57 | 100 | MR. X | SILVER A | 31.403 | 0.273 | 31.130 | 1 | 0.273 | 1 | 2 | | 0.294 |
| 2/7/2012 | 07:59:59 | 101 | MR. X | SILVER A | 31.351 | 0.221 | 31.135 | 1 | 0.216 | 1 | 1 | | 0.242 |
| 2/7/2012 | 08:00:01 | 102 | MR. X | SILVER A | 31.429 | 0.299 | 31.134 | 1 | 0.295 | 1 | 2 | | 0.320 |
| 2/7/2012 | 08:00:03 | 103 | MR. X | SILVER A | 31.458 | 0.328 | 31.129 | 1 | 0.329 | 1 | 1 | | 0.349 |
| 2/7/2012 | 08:00:05 | 104 | MR. X | SILVER A | 31.396 | 0.266 | 31.127 | 1 | 0.269 | 1 | 2 | | 0.287 |
| 2/7/2012 | 08:00:07 | 106 | MR. X | SILVER A | 31.385 | 0.255 | 31.136 | 1 | 0.249 | 1 | 2 | | 0.276 |
| 2/7/2012 | 08:00:09 | 105 | MR. X | SILVER A | 31.333 | 0.203 | 31.131 | 1 | 0.202 | 1 | 1 | | 0.224 |
| 2/7/2012 | 08:00:11 | 108 | MR. X | SILVER A | 31.370 | 0.240 | 31.128 | 1 | 0.242 | 1 | 2 | | 0.261 |
| 2/7/2012 | 08:00:13 | 107 | MR. X | SILVER A | 31.384 | 0.254 | 31.134 | 1 | 0.250 | 1 | 1 | | 0.275 |
| 2/7/2012 | 08:00:15 | 110 | MR. X | SILVER A | 31.401 | 0.271 | 31.131 | 1 | 0.270 | 1 | 2 | | 0.292 |
| 2/7/2012 | 08:00:17 | 109 | MR. X | SILVER A | 31.452 | 0.322 | 31.130 | 1 | 0.322 | 1 | 1 | | 0.343 |
| 2/7/2012 | 08:00:19 | 112 | MR. X | SILVER A | 31.326 | 0.196 | 31.125 | 1 | 0.201 | 1 | 2 | | 0.217 |
| 2/7/2012 | 08:00:21 | 111 | MR. X | SILVER A | 31.354 | 0.224 | 31.130 | 1 | 0.224 | 1 | 1 | | 0.245 |

FIG. 69B

| | SCALE 1 | SCALE 2 |
|---|---|---|
| AVERAGE | 31.430 | 31.131 |
| STDS (σ) | 0.059 | 0.005 |
| μ-3σ | 31.252 | 31.117 |
| μ+3σ | 31.608 | 31.144 |
| RANGE 6σ | 0.355 | 0.027 |
| COUNT | 10414 | 10414 |

SYSTEM AND METHOD FOR REDUCING GIVEAWAY MATERIAL ON MINT PRODUCTS

RELATED APPLICATIONS

This application is a bypass continuation application of PCT Application No. PCT/CA2012/050192, filed on Mar. 28, 2012, which claims priority from U.S. Provisional Application No. 61/468,385, filed on Mar. 28, 2011, U.S. Provisional Application No. 61/510,848, filed on Jul. 22, 2011, U.S. Provisional Application No. 61/540,813, filed on Sep. 29, 2011, and U.S. Provisional Application No. 61/603,546, filed on Feb. 27, 2012, The contents of each of these applications are incorporated herein by reference in their entireties. The above-referenced PCT International Application was published as International Publication No. WO 2012/129691 A1 on Oct. 4, 2012.

FIELD OF THE INVENTION

The present invention relates to a system and to a method for reducing giveaway material on products. More particularly, and according to a preferred embodiment, the present invention relates to a system and to a method for reducing giveaway material on mint products, such as bullion products, investment products, numismatic products, circulation products, medals, medallions, ingots, bars, blanks, cast bars, minted bars, minted coins, and the like.

BACKGROUND OF THE INVENTION

It is well known in the art that gold, silver, palladium and platinum bullion products are a common way of owning precious metal. Bullion products are priced according to their net weight, plus a small premium based on supply and demand.

The troy ounce (ozt) is a unit of imperial measure. In the present day, it is most commonly used to gauge the weight and therefore the price of precious metals. One troy ounce is equivalent to 31.1034768 grams. Accordingly, the minimum net weight of a 1-oz bullion product must reflect the purity of the material. For example:

99.99%=31.1066 grams
99.9%=31.1346 grams
91.67% (22 carats)=33.9298 grams

Typically, a mint is an industrial facility which manufactures coins for currency, and other related products. A recent study carried out by the Applicant, done on 1-oz gold and silver bullion products from the most reputable mints of the world, reveal that these mints "giveaway" a considerable amount of extra precious metal in order to ensure the minimum legal trade weight being required. This major problem is not only limited to traditional mints in that, it has also been found by the Applicant that various other products (for example, blanks, finished products, ingots, bars, etc.) made of solid precious metal, such as gold, silver, platinum, palladium, etc., when manufactured, processed, distributed and/or sold by different entities throughout the world, such as furnishers, refiners, smelters, and the like, always have a considerable amount of excess weight than the official weight indicated in the final form that they are commercialized in (for example, when they are being sold, etc.).

This excess or extra weight, referred to herein as "giveaway", given that there appears to be no universally-common known term having been assigned thereto in the industry, due to the fact this problem has never been addressed, has literally been given away, for decades if not centuries, without any second thoughts.

However, when considering the high value of precious metals, the high demand for bullion products, and the enormous volume of products being manufactured by the different mints for example, on a yearly basis, this results in literally millions of dollars being wasted each year, by simply giving this extra weight of precious metals away, particularly in the case of smaller products where the percentage of giveaway material tends to be even higher with respect to the nominal value (i.e. minimum allowed weight of legal trade) indicated on the product. Thus, in the case of "smaller" products (ex. less than 100 ozt), the percentage of the value of giveaway material being simply given away tends to be much greater with respect to the value at which the product is being sold.

For example, extensive studies carried out by the Applicant have shown that for 1-ozt silver round coins (99.99% purity) being produced, there can be quite often about 600 mg of giveaway material per product (that is, instead of weighing the required 31.1066 grams, the final products can weigh up over to 31.700 grams), and in the case of 1-ozt gold round coins (22 carats) being produced, there is up to 80 mg of giveaway material per product.

Unfortunately, this problem of giveaway material seems to have never been properly addressed, and the conventional processes that exist today for manufacturing or processing mint products and/or other analogous products do not enable to resolve this very critical giveaway problem.

Hence, in light of the aforementioned, there is a need for an improved system or method which, by virtue of its design and components, would be able to overcome or at least minimize some of the aforementioned prior art problems, in that, it would be very useful to have a technology that is capable of reducing and recovering giveaway material on products being manufactured or processed.

SUMMARY OF THE INVENTION

The object of the present invention is to provide a system or a method which satisfies some of the above-mentioned needs and which is thus an improvement over the prior art.

Another object of the present invention is to reduce and recover, as much as possible, the amount of giveaway material on a given product, particularly on a product made of or containing precious metal, in a substantially precise, systematic and repeatable manner.

Another object of the present invention is to remove and recover giveaway material from products made of substantially solid precious metals.

Another object of the present invention is to remove and recover giveaway material from mint products, by processing said mint products in a very precise, systematic and repeatable manner, at a convenient location during a manufacturing process, so as to ensure that removal of giveaway material on the resulting products of said processed mint products is practically unnoticeable, or at the very least, satisfies a given criteria of visual quality assurance.

In accordance with the present invention, the above main object is achieved, as will be easily understood, with a system or a method to recuperate giveaway material on mint products, such as the one briefly described herein and such as the one exemplified in the accompanying drawings.

The present invention is particularly advantageous in that it can be easily incorporated into a standard manufacturing process for producing mint products made of solid precious metals (such as gold, silver, platinum and palladium, for example), and in that it enables to improve the accuracy of these products by reducing the weight of the products closer to the minimum allowed weight of legal trade, thereby reducing the amount of giveaway material being "given away", which can represent millions and millions of dollars in savings per year.

More particularly, according to one aspect of the present invention, there is provided machine for reducing giveaway material from a plurality of mint products, the machine comprising:

a conveying assembly for conveying a plurality of mints products to be processed;

a processing assembly for processing at least one given mint product at a time, so as to remove an amount of giveaway material from each one of the mint products; and a recuperating assembly for recuperating mint products having being processed.

Preferably, the processing assembly comprises an evaluating assembly for evaluating at least one physical parameter of the mint product to be processed.

Preferably also, the processing assembly comprises a weighing assembly for weighing each given mint product to be processed, and according to a preferred embodiment, the weighing assembly comprises at least one scale operatively resting on a ground surface via at least one vibration-dampening assembly, and being operatively isolated from the rest of the machine. The weighing assembly may also comprise an adjustment mechanism for adjusting a value of the weight of the mint product to be processed and/or having been processed depending on previous readings, and other considerations.

Preferably also, the processing assembly comprises a manipulating assembly for manipulating the mints products to be processed, and this manipulating assembly may take on the form of at least one articulated arm, for example, configured for manipulating a given mint product to be processed to and from a corresponding carrousel.

Preferably also, the processing assembly comprises a scanning assembly for scanning the mint product to be processed, and for generating a corresponding profile thereof, and also preferably comprises a material-removal assembly for removing giveaway material from the mint product to be processed.

According to another aspect of the present invention, there is provided a method of reducing giveaway material on products, such as mint products, for example.

Namely, and according to a preferred aspect of the present invention, there is provided a method of reducing giveaway material from a plurality of mint products each having different physical parameters, the method comprising the steps of:

a) evaluating at least one physical parameter of a given mint product to be processed;

b) comparing said at least one physical parameter of the mint product to be processed with a minimum threshold physical parameter in order to determine an attainable range of giveaway material to be removed;

c) projecting a targeted amount of giveaway material to be removed from the mint product to be processed depending on the attainable range of giveaway material; and d) removing the targeted amount of giveaway material via at least one surface of the mint product.

According to another aspect of the present invention, there is provided a system or a machine for carrying out the above-mentioned method.

According to another aspect of the present invention, there is provided a processing plant (or "mint") provided with the above-mentioned system, machine and/or components thereof.

According to another aspect of the present invention, there is provided a method of installing (i.e. assembling, etc.) the above-mentioned system, machine, processing plant and/or components thereof.

According to another aspect of the present invention, there is provided a method of operating the above-mentioned system, machine, processing plant and/or components thereof.

According to another aspect of the present invention, there is provided a kit with corresponding components for assembling the above-mentioned system, machine, processing plant and/or components thereof.

According to yet another aspect of the present invention, there is also provided a method of assembling components of the above-mentioned kit.

According to yet another aspect of the present invention, there is also provided a method of doing business with the above-mentioned method(s), kit, system, machine, processing plant and/or components thereof.

According to yet another aspect of the present invention, there is also provided a product (ex. mint product) having been obtained or processed (modified, altered, etc.) with the above-mentioned method(s), kit, system, machine, processing plant and/or components thereof.

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 43*a* is a perspective view of a cutting tool to be used with a system for reducing giveaway material according to a preferred embodiment of the present invention.

FIG. 43*b* is a side elevational view of what is shown in FIG. 43*a*.

FIG. 43*c* is a cross-sectional view of what is shown in FIG. 43*b*.

FIG. 44*a* is a perspective view of another cutting tool provided with a chip-breaker to be used with a system for reducing giveaway material according to another preferred embodiment of the present invention.

FIG. 44*b* is a side elevational view of what is shown in FIG. 44*a*.

FIG. 44*c* is a cross-sectional view of what is shown in FIG. 44*b*.

FIGS. 45*a*-45*f* are examples of different rim profiles of mint products capable of being processed with a system or a method for reducing giveaway material therefrom according to different preferred embodiments of the present invention.

FIG. 46 is a partial cross-sectional view of an outer peripheral portion of a mint product with a side surface having been processed with a system or a method for reducing giveaway material therefrom according to a preferred embodiment of the present invention.

FIG. 47 is a partial cross-sectional view of an outer peripheral portion of a mint product with a side surface having been processed with a system or a method for reducing giveaway material therefrom according to another preferred embodiment of the present invention.

FIG. 48 is a partial cross-sectional view of an outer peripheral portion of a mint product with a side surface having been processed with a system or a method for reducing giveaway material therefrom according to yet another preferred embodiment of the present invention.

FIG. 49*a* is a top view of a mint product to be processed with a system or a method for reducing giveaway material therefrom according to a preferred embodiment of the present invention.

FIG. 49*b* is a cross-sectional view taken along line A-A of FIG. 49*a*.

FIG. 49*c* is an enlarged view of a portion of what is shown in FIG. 49*b*.

FIGS. 50*a*-54*c* are different views exemplifying different options on how giveaway material could be removed from a given mint product according to different preferred embodiments of the present invention.

FIG. 69a is a table containing data relating to a few samples of blanks among over 10 000 pieces having been tested on Feb. 7, 2012, by the Applicant, using a system and method for reducing giveaway material according to a preferred embodiment of the present invention.

FIG. 69b is a table summarizing data regarding all of the pieces having been tested/processed that day.

DETAILED DESCRIPTION OF PREFERRED EMBODIMENTS OF THE INVENTION

Figure 1:
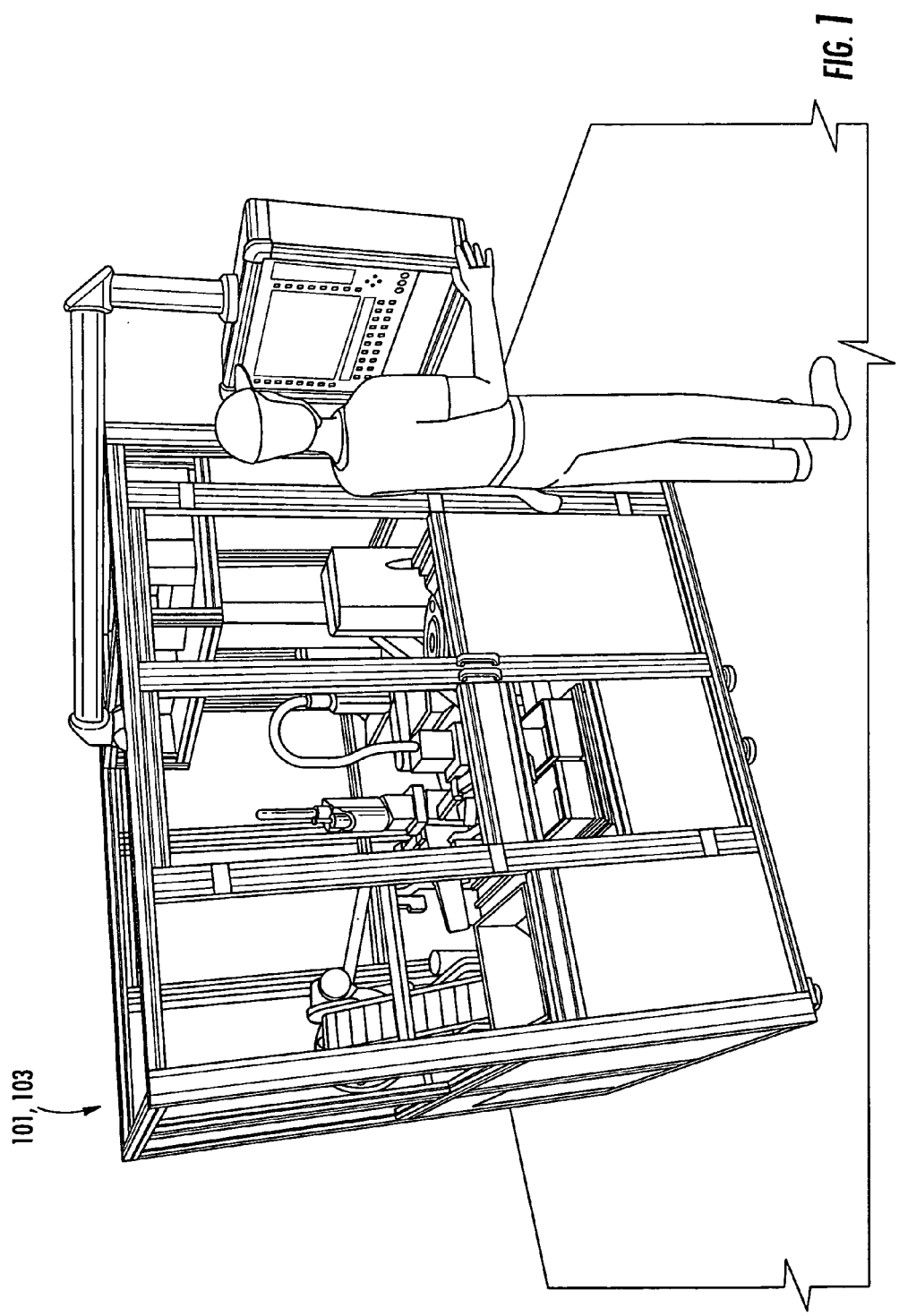
FIG. 1 is a perspective view a user interacting with a system for reducing giveaway material from a plurality of mint products according to a preferred embodiment of the present invention.
Figure 2:
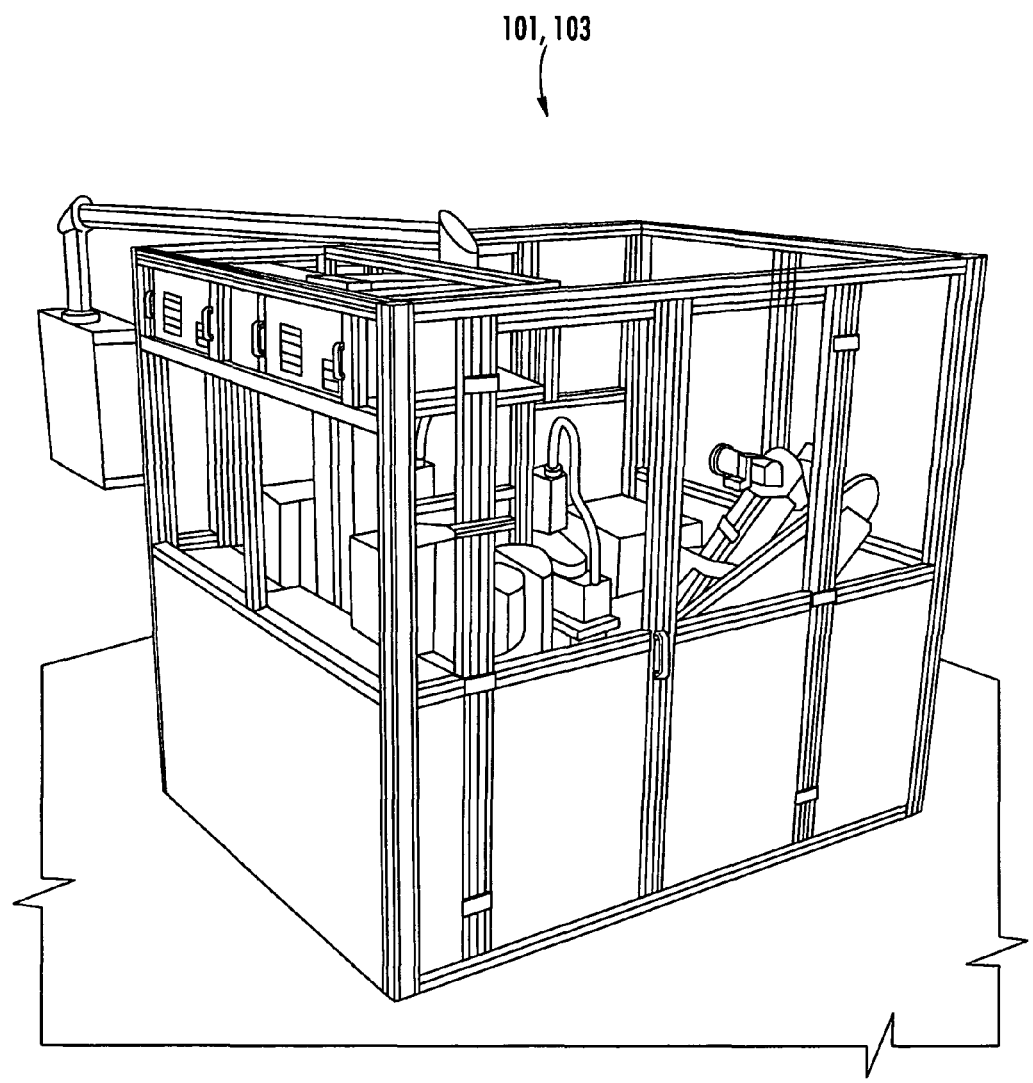
FIG. 2 is another perspective view of what is shown in FIG. 1.
Figure 3:
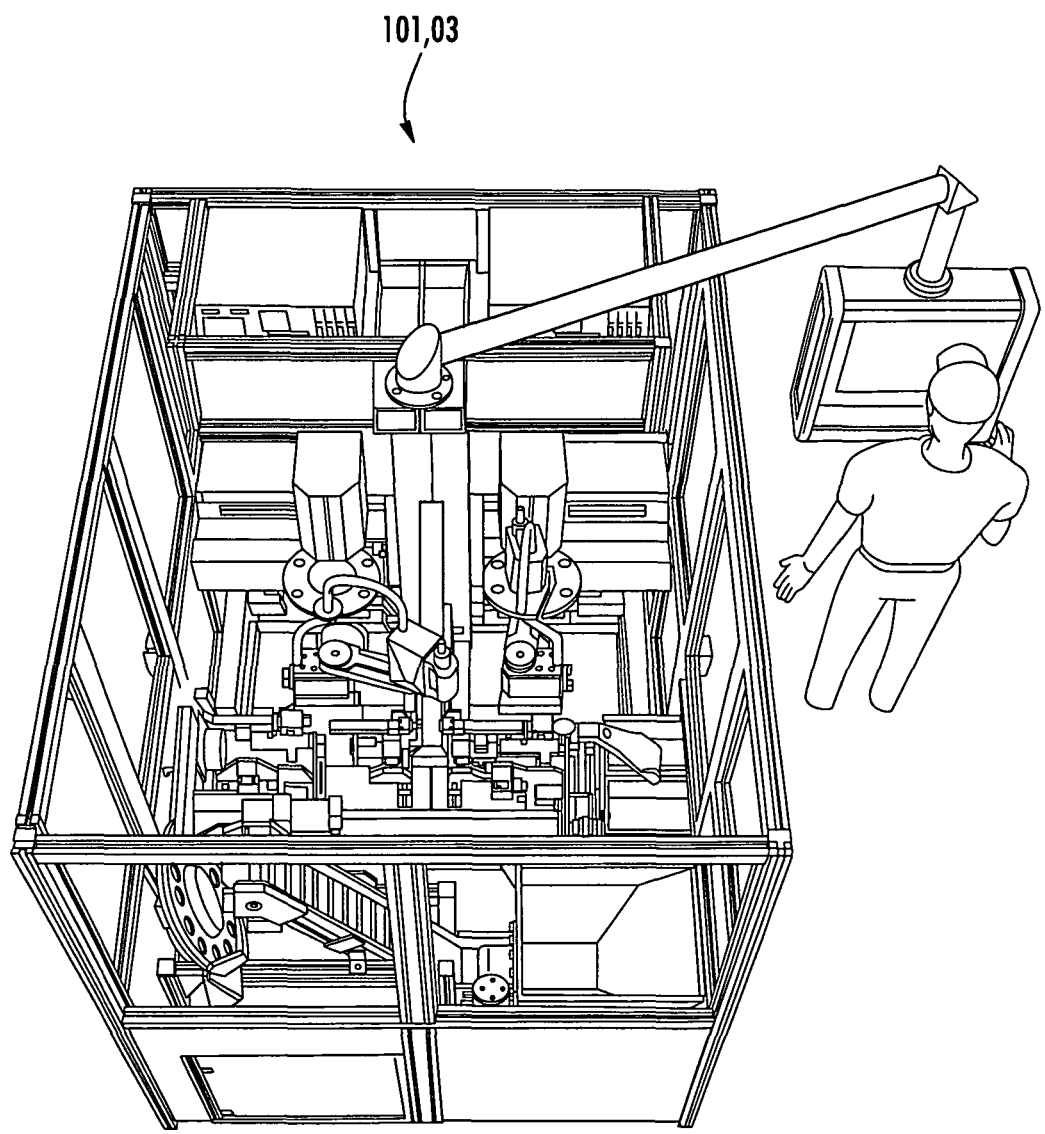
FIG. 3 is a top perspective view of what is shown in FIG. 1.
Figure 4:
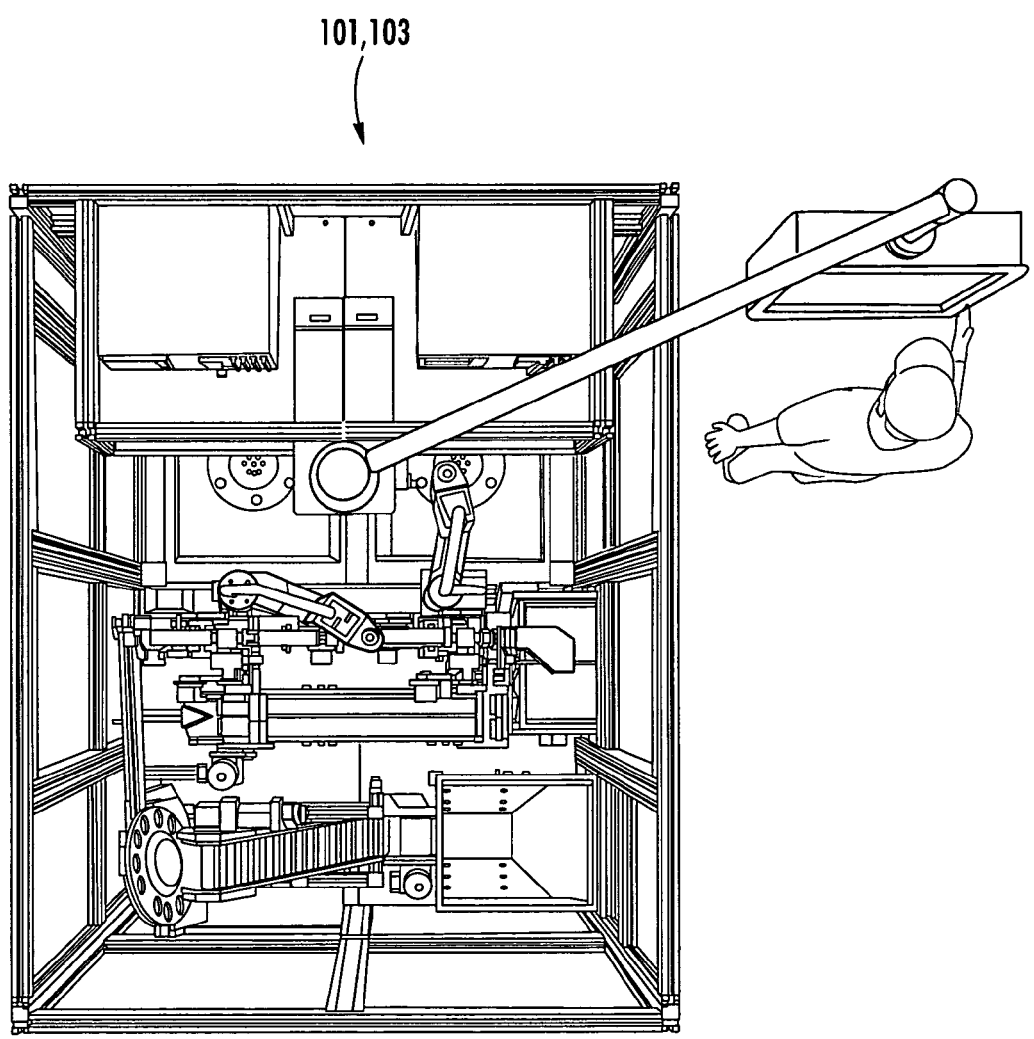
FIG. 4 is a top perspective view of what is shown in FIG. 3.
Figure 5:
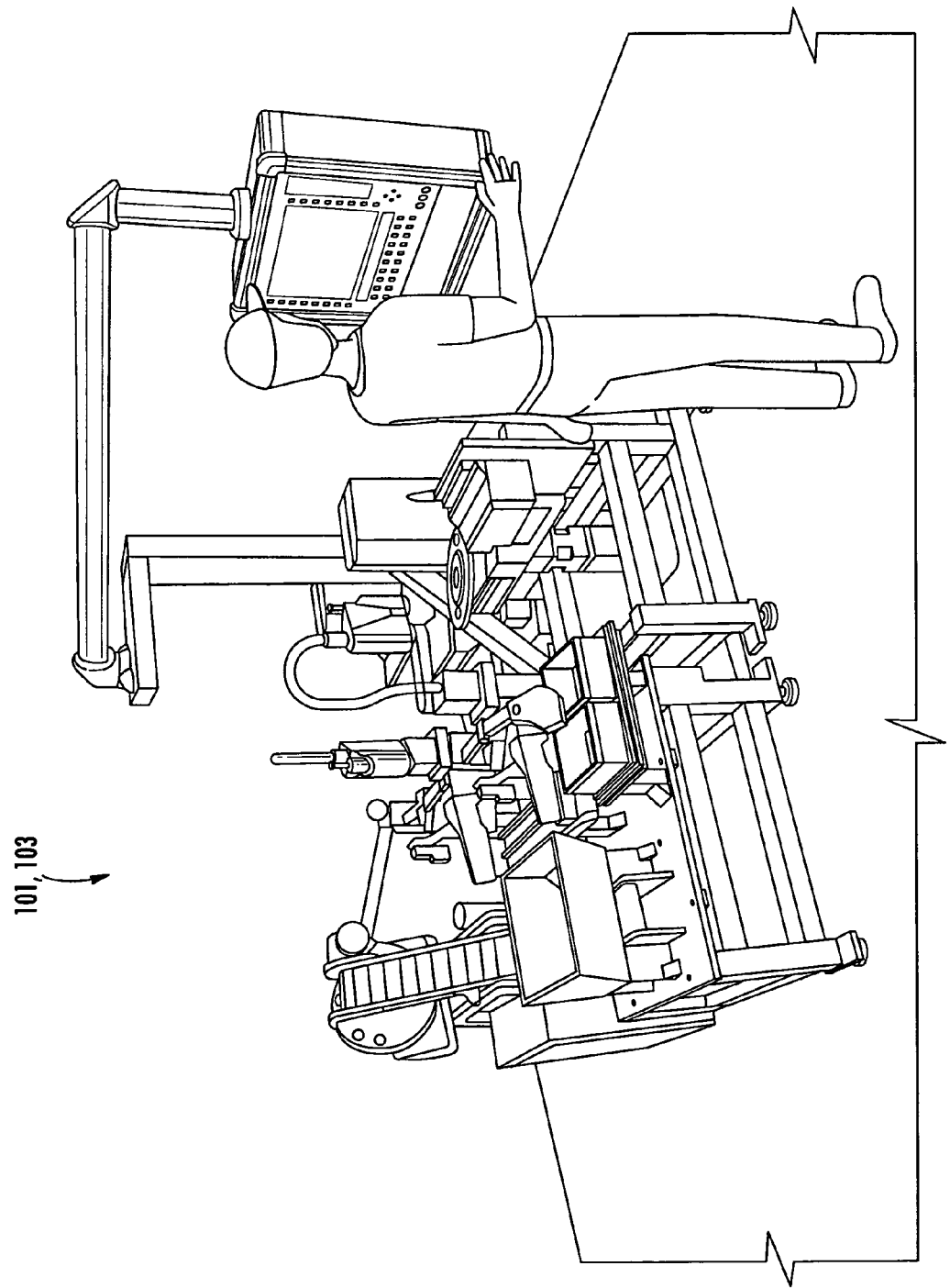
FIG. 5 is another perspective view of what is shown in FIG. 1, the enclosure of the system having been removed to better illustrate main inner components of the system according to a preferred embodiment of the present invention.
Figure 6:
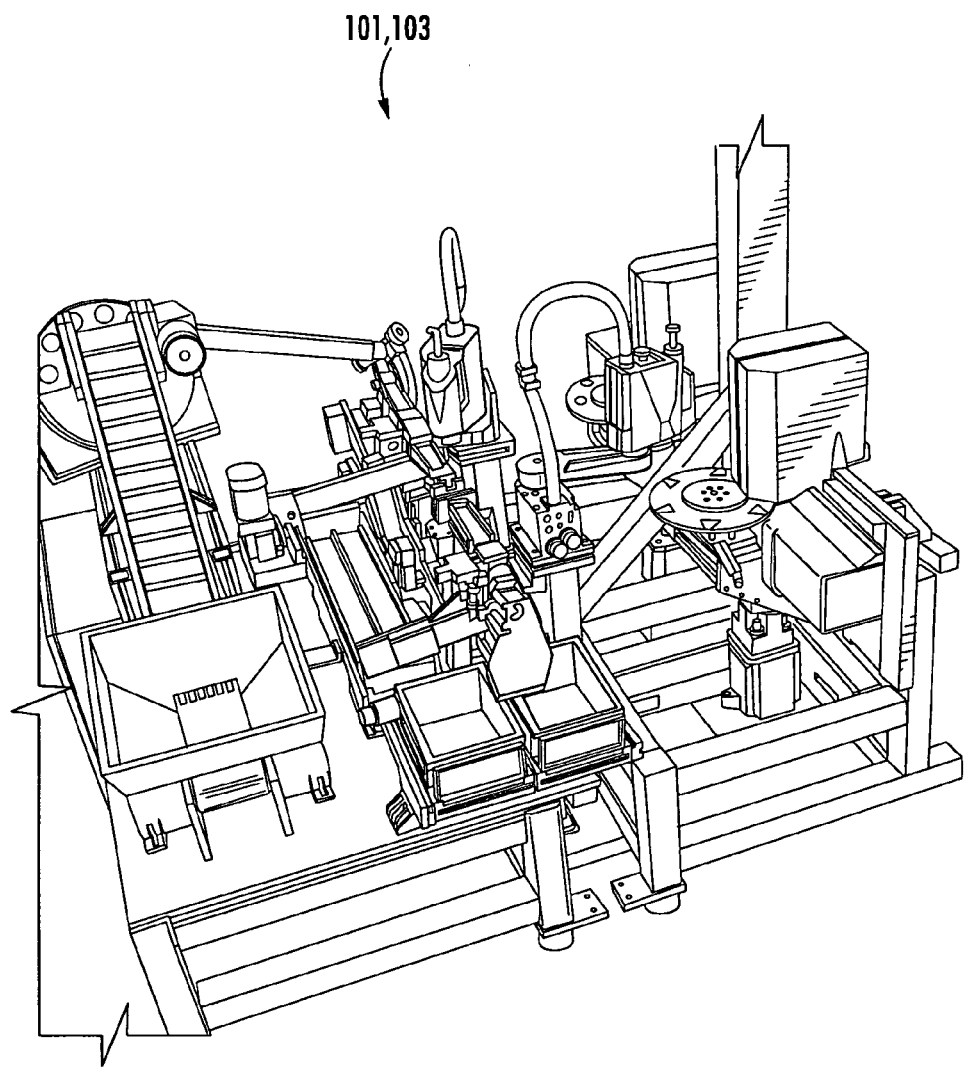
FIG. 6 is an enlarged perspective view of a portion of what is shown in FIG. 5.
Figure 7:
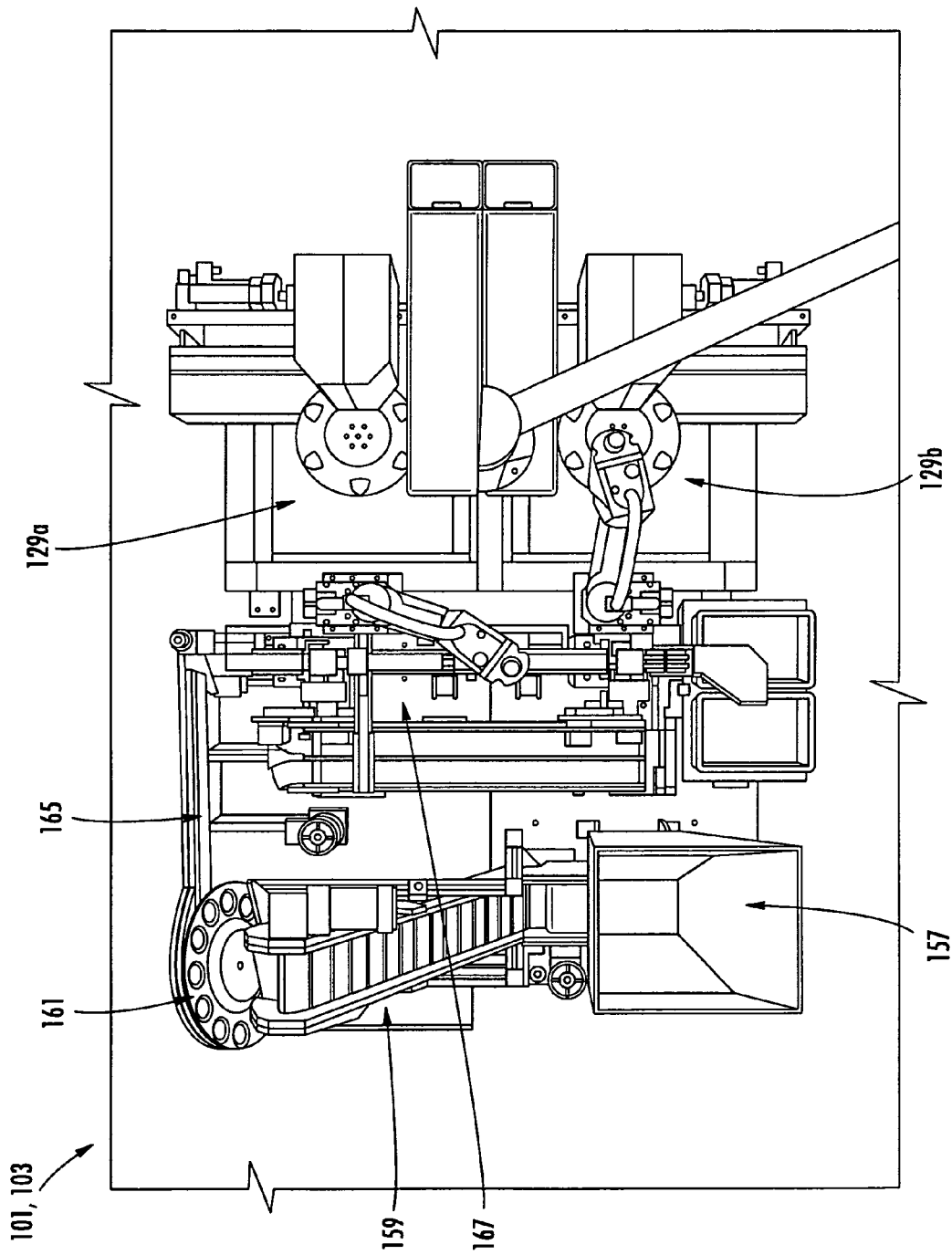
FIG. 7 is a top view of what is shown in FIG. 5, so as to better illustrate the different stages or a layout of the system according to a preferred embodiment of the present invention.
Figure 8:
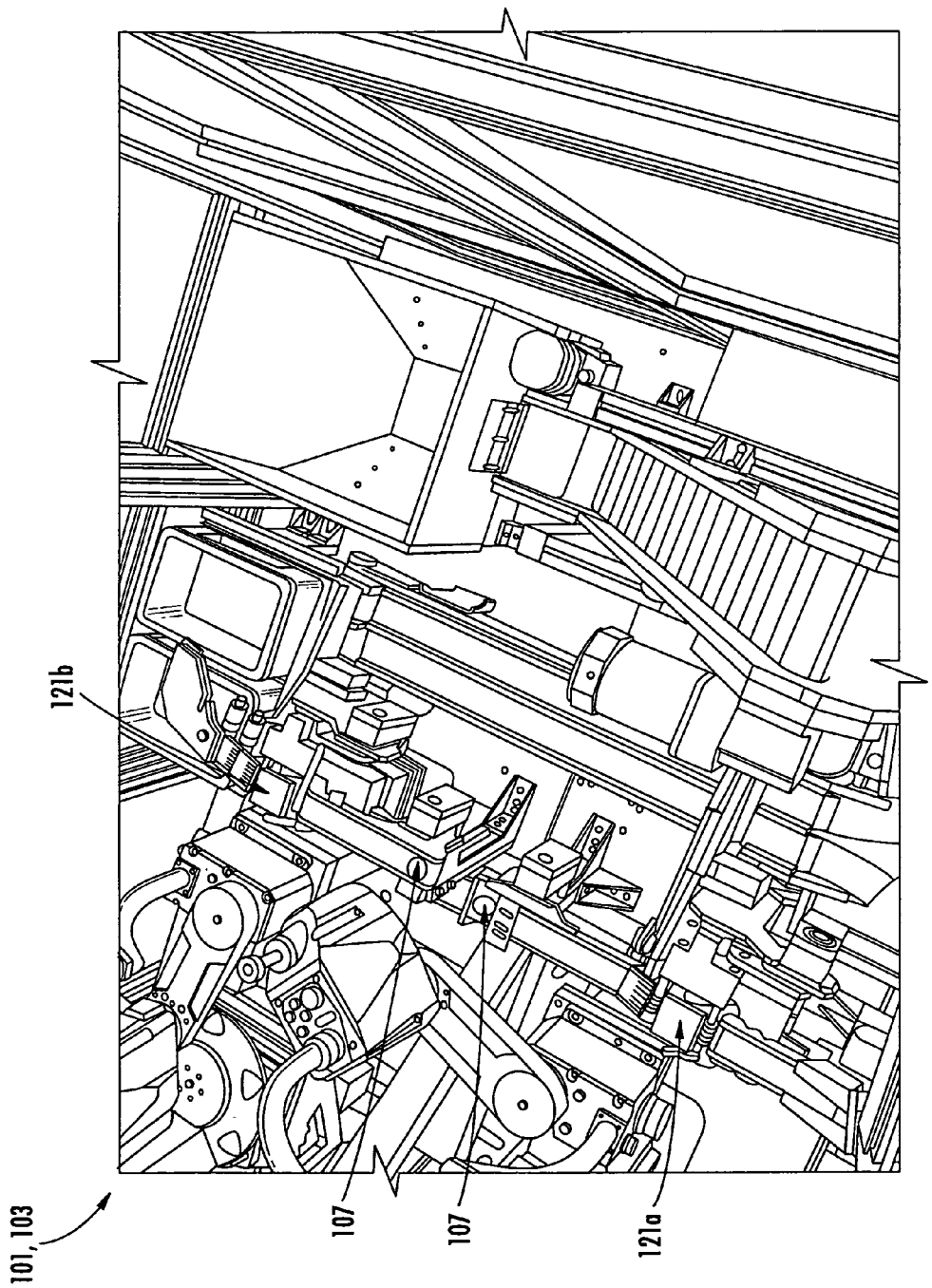
FIG. 8 is an enlarged perspective view of a portion of what is shown in FIG. 7.
Figure 9:
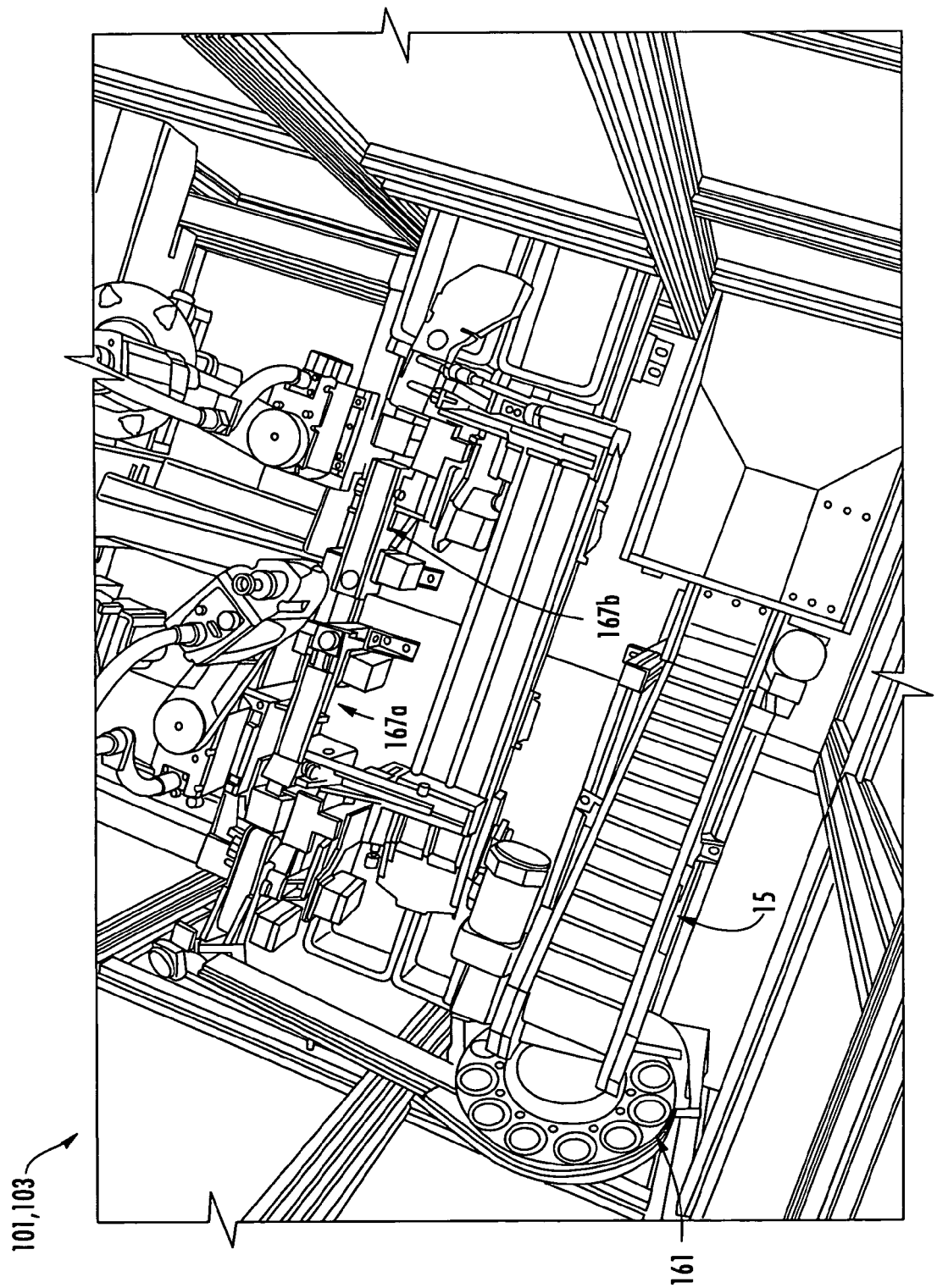
FIG. 9 is another perspective view of what is shown in FIG. 8.
Figure 10:
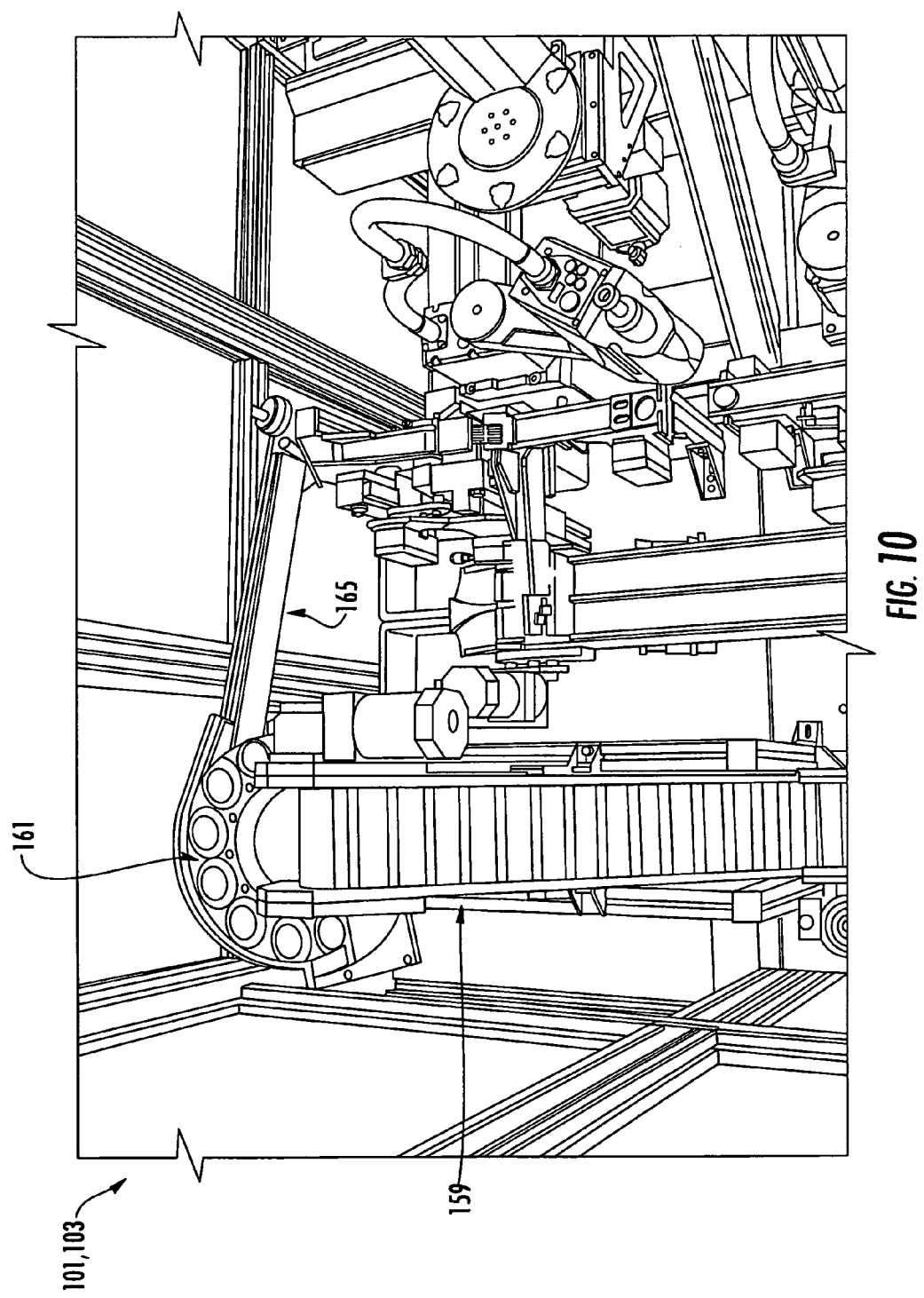
FIG. 10 is an enlarged perspective view of a portion of what is shown in FIG. 9.
Figure 11:
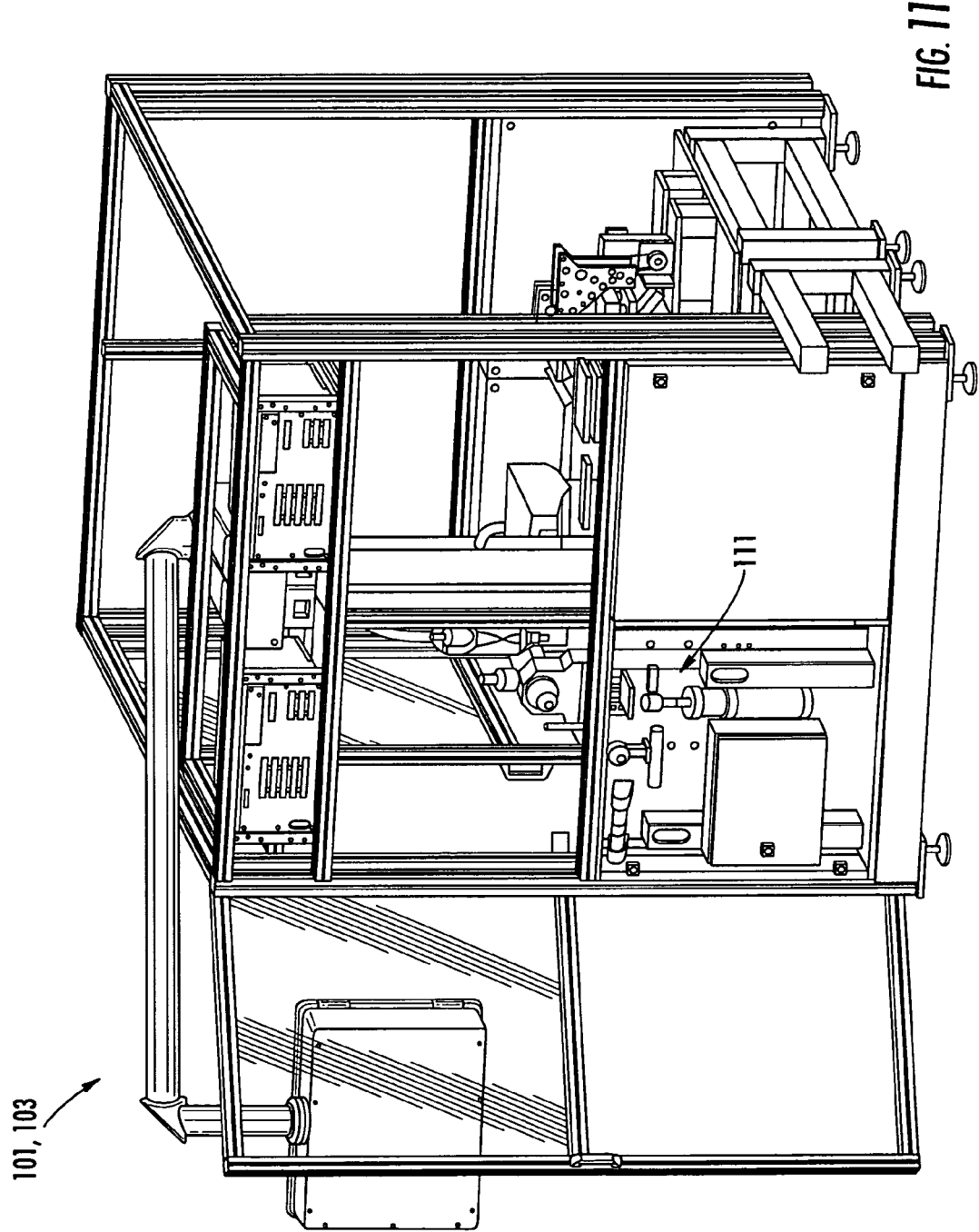
FIG. 11 is a perspective view of a system for reducing giveaway material on a plurality of mint products according to yet another preferred embodiment of the present invention, this system being shown with a door of the enclosure in an opened configuration, and with a front panel having been removed so as to better illustrate where each of the mint products are processed by the processing assembly of the system.
Figure 12:
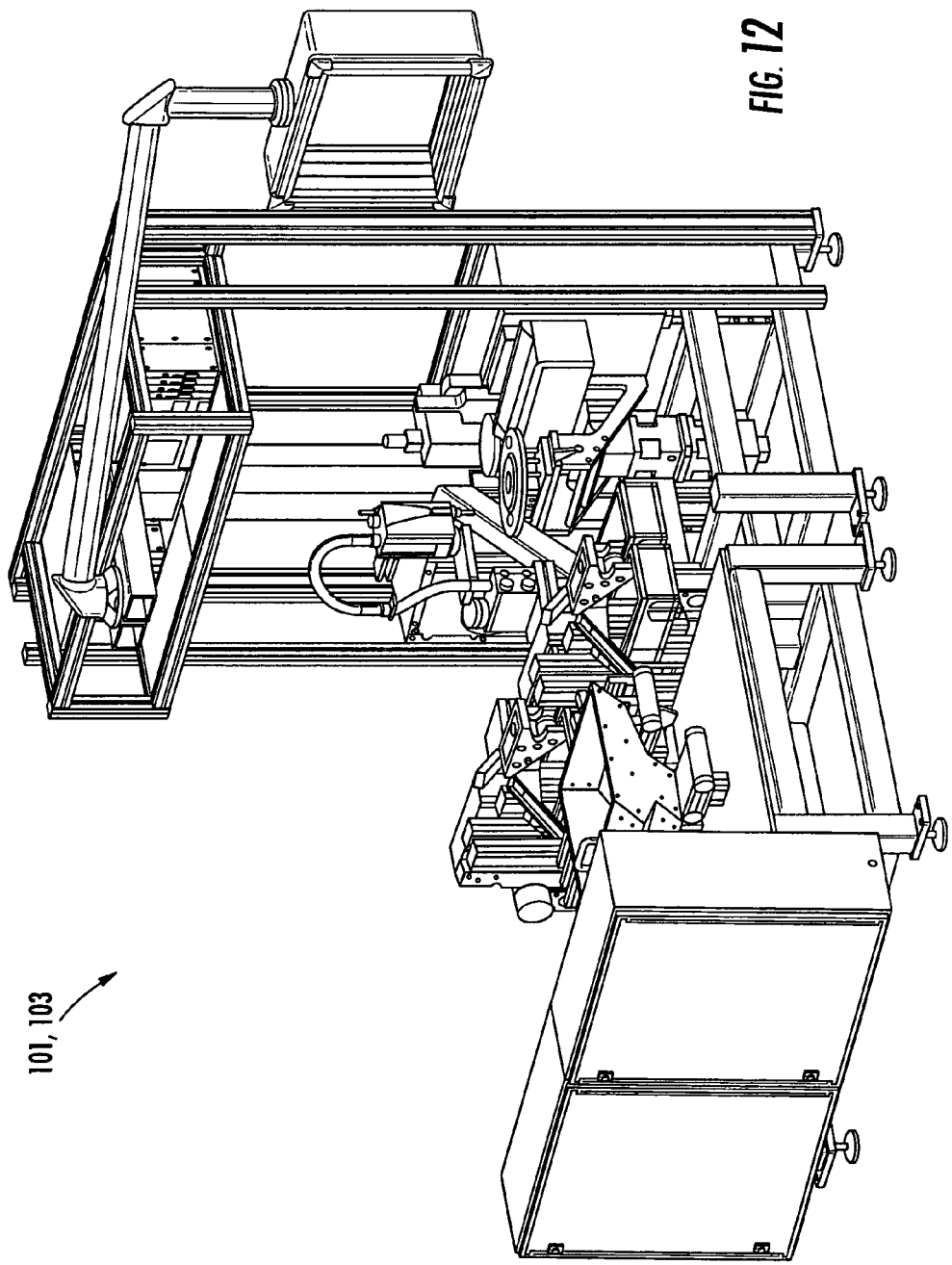
FIG. 12 is another perspective view of what is shown in FIG. 11, the system being now shown with its enclosure having been removed so as to better illustrate main inner components of the system according to another preferred embodiment of the present invention.
Figure 13:
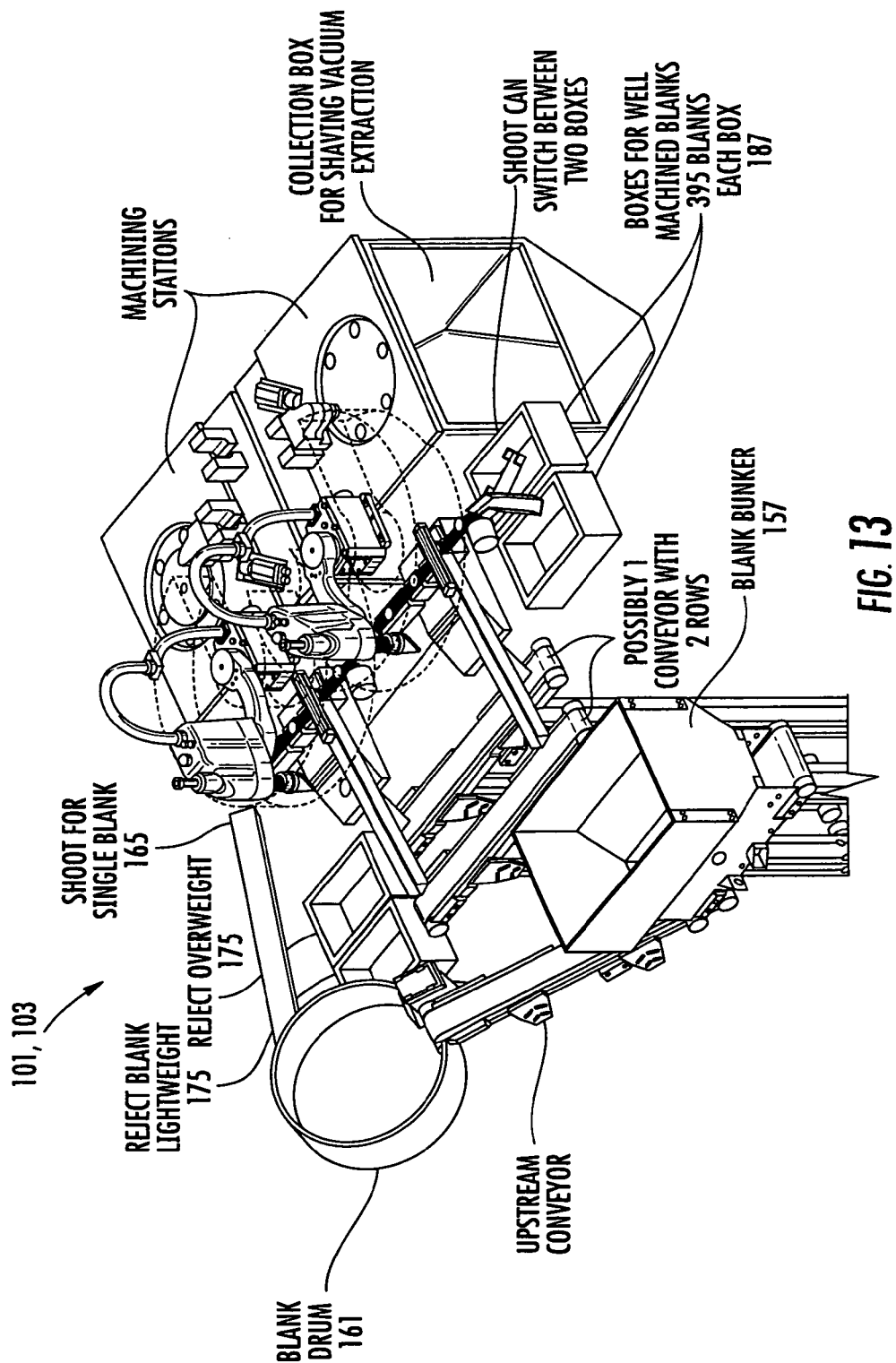
FIG. 13 is a perspective view of conveying, processing and recuperating assemblies for a system for reducing giveaway material on a plurality of mint products according to another preferred embodiment of the present invention.
Figure 14:
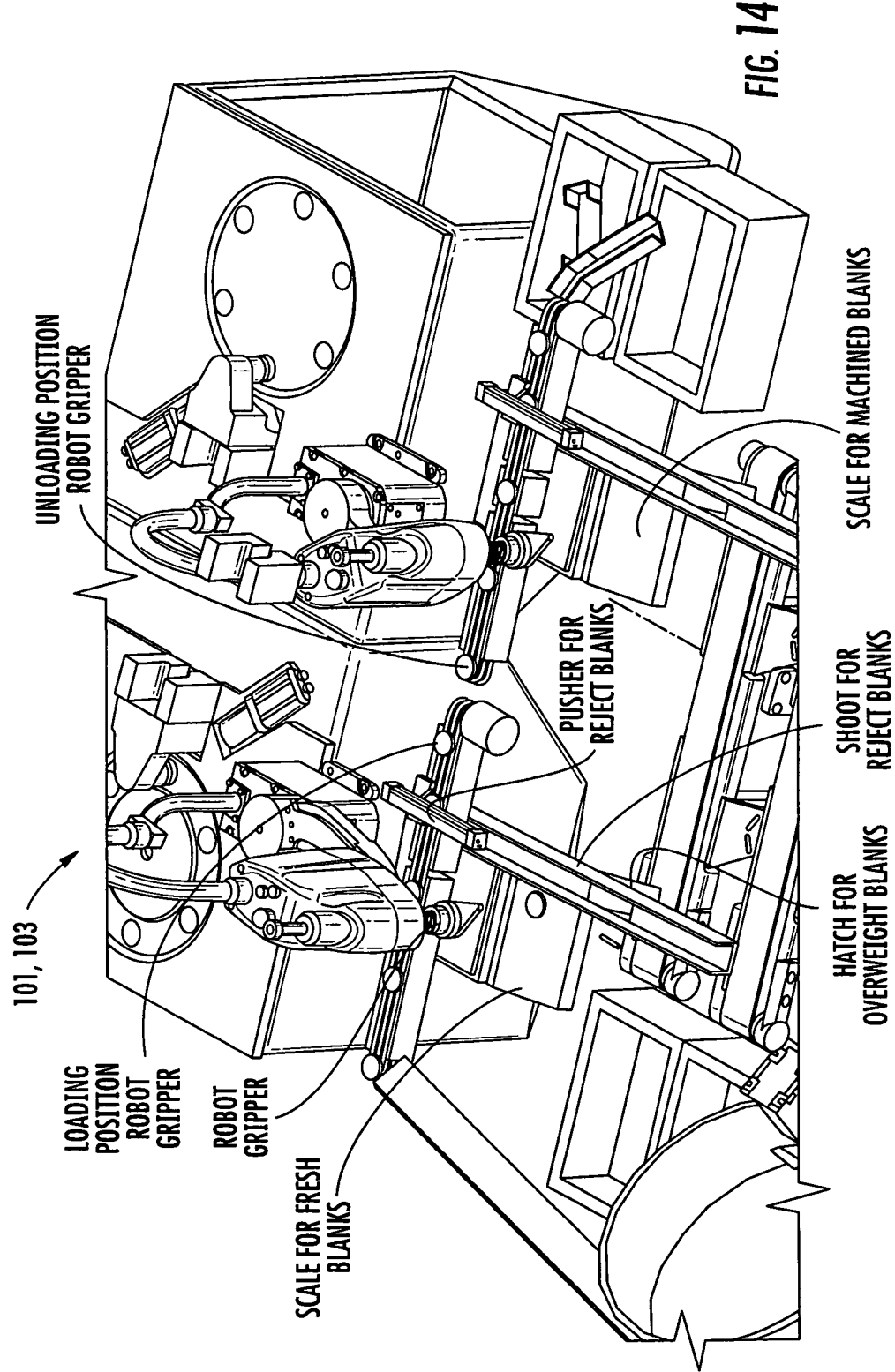
FIG. 14 is an enlarged perspective view of a portion of what is shown in FIG. 13.
Figure 15:
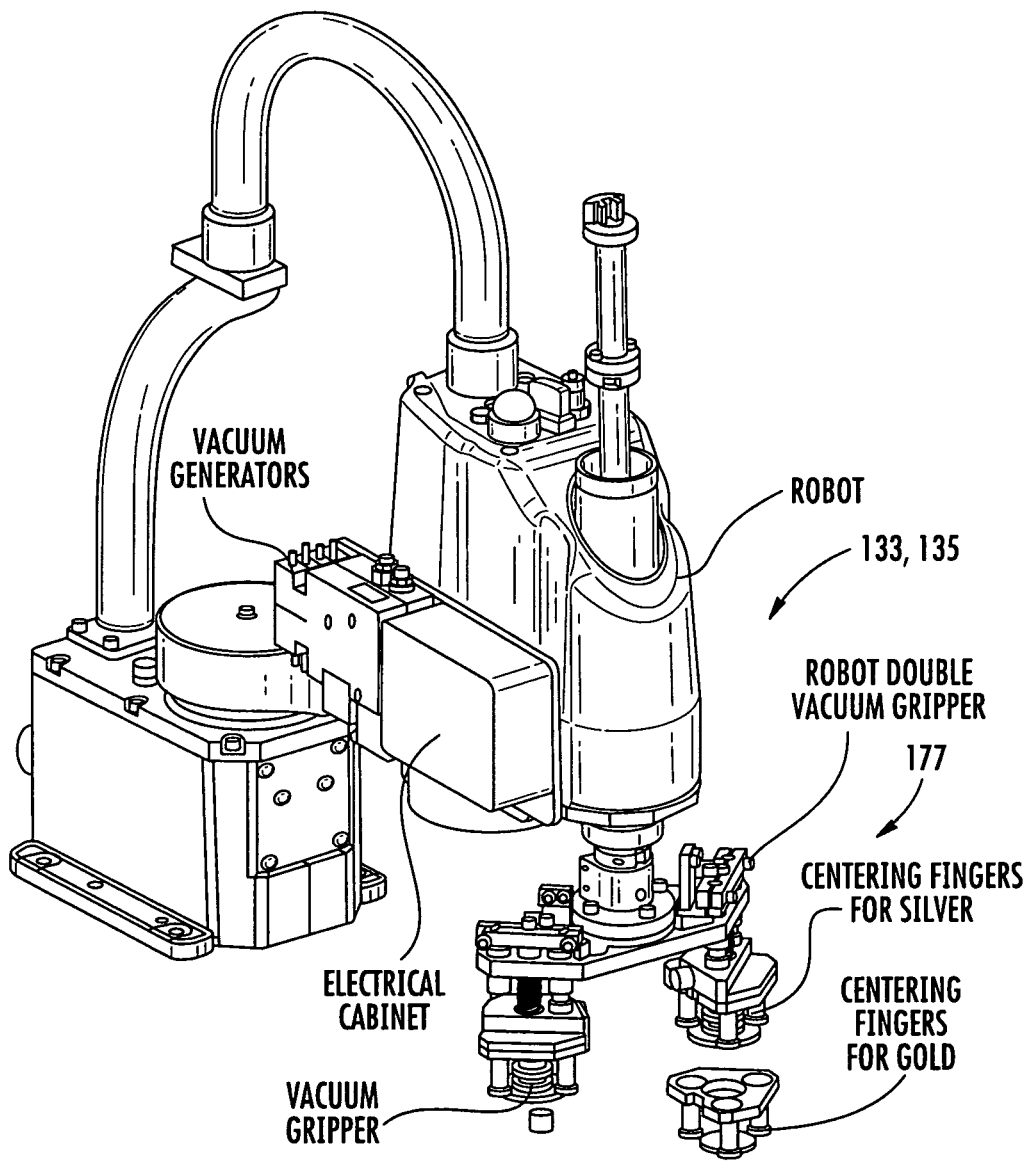
FIG. 15 is a perspective view of a manipulating assembly in the form of an articulated arm according to a preferred embodiment of the present invention, the articulated arm being shown provided with a pair of vacuum grippers each containing centering fingers for use with silver products, and an interchangeable gripper containing centering fingers for use with gold products being also shown.
Figure 16:
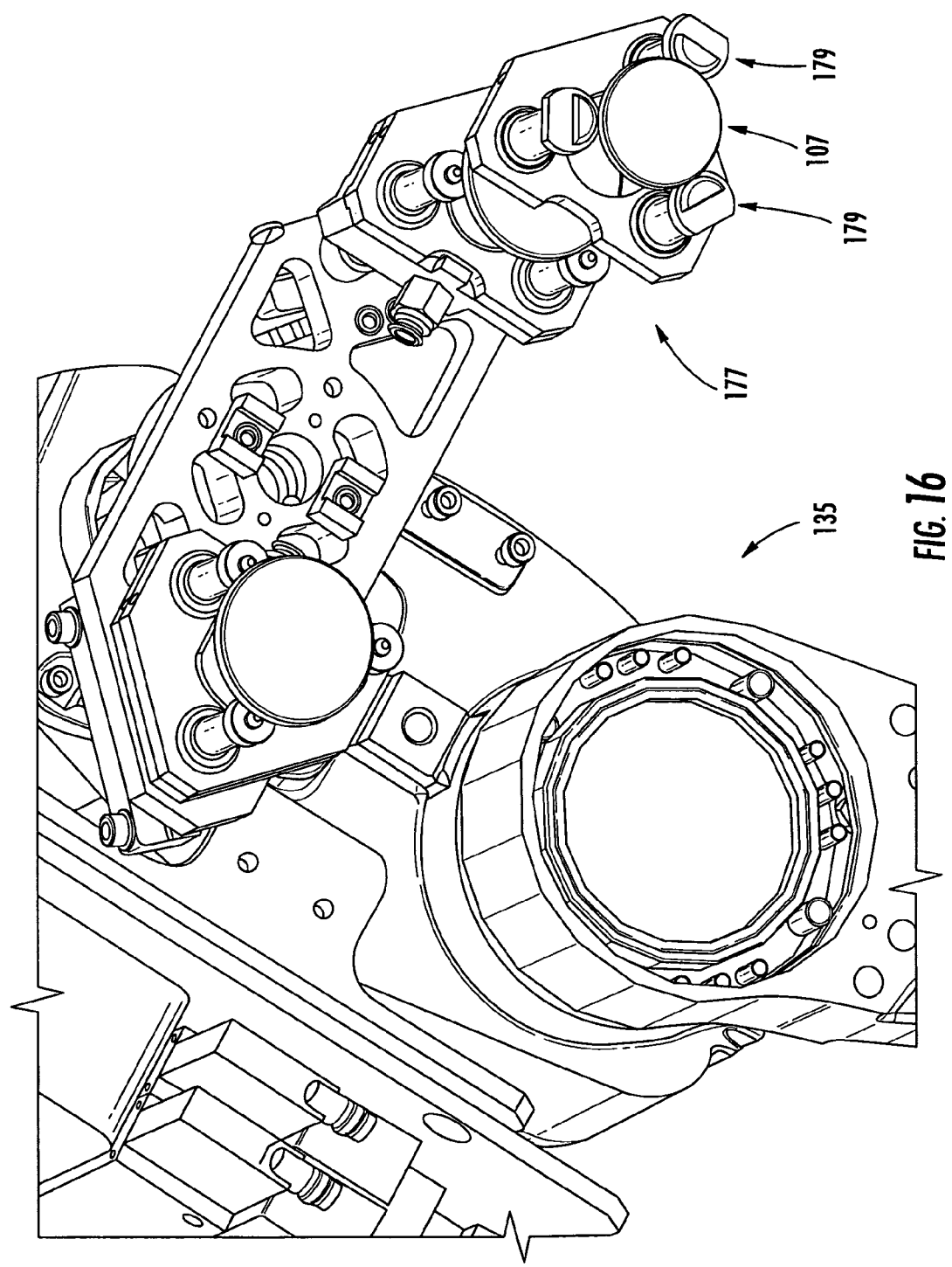
FIG. 16 is a bottom perspective view of a portion of what is shown in FIG. 15, better illustrating how the centering fingers of the articulated arm cooperate with mint products to be manipulated.
Figure 17:
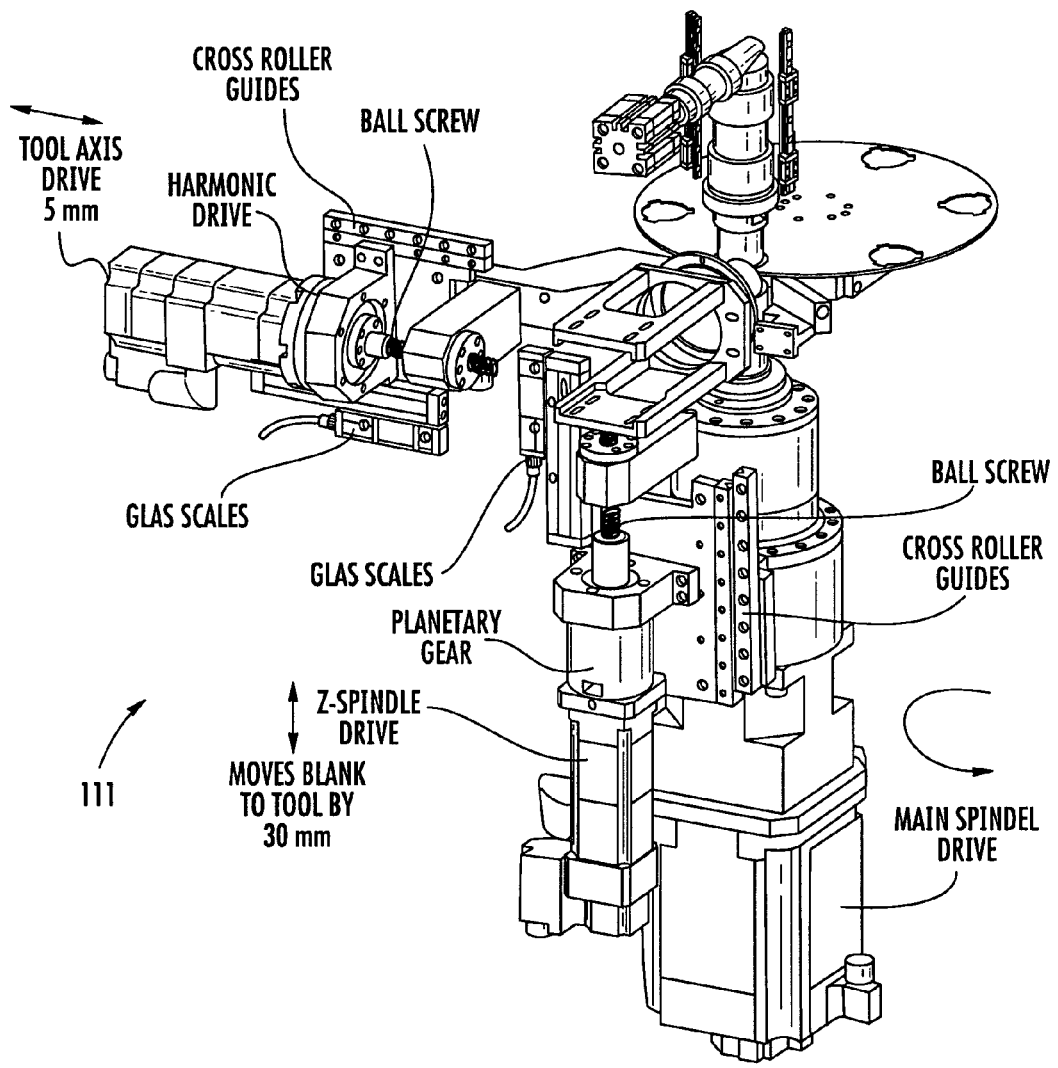
FIG. 17 is a perspective view of components of a processing assembly to be used with a system for reducing giveaway material on mint products according to a preferred embodiment of the present invention.

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed to remove (i.e. "recover") giveaway material on "mint" products, such as bullion investment products, for example, it may be used with other types of objects, and in other fields, as apparent to a person skilled in the art. For this reason, expressions such as "mint", "giveaway", "bullion", "investment", "product", etc., used herein should not be taken as to limit the scope of the present invention and includes all other kinds of objects or fields with which the present invention could be used and may be useful (ex. coins or tokens used for recreational purposes and the like), as apparent to a person skilled in the art.

Moreover, in the context of the present invention, the expressions "system", "machine", "method", "kit", "plant" and "assembly", as well as any other equivalent expressions and/or compounds word thereof known in the art will be used interchangeably, as apparent to a person skilled in the art. This applies also for any other mutually equivalent expressions, such as, for example: a) "production", "manufacturing", "stamping", "processing", "striking", etc.; b) "mint", "facility", "plant", "manufacturing", etc.; c) "bullion", "product", "blank", "bar", "ingot", "piece", "coin", "token", "currency", "metal", etc.; d) "processing", "altering", "modifying", "changing", "reducing", "removing", "cutting", "recovering", "retrieving", etc.; e) "giveaway", "material", "dust", "shavings", "particles", "fumes", "liquid", "excess", "extra", "surplus", "over", "exceeding", "unnecessary", etc.; f) "system", "machine", "assembly", "device", "apparatus", "unit", "component", "equipment", etc.; g) "evaluating", "projecting", "approximating", "guessing", "estimating", "determining", "calculating", "gauging", "weighing", etc.; h) "surface", "area", "plane", "region", "portion", "edge", "thickness", "height", "dimension", "width", "parameter", etc.; i) "mark", "logo", "engraving", "cavity", "effigy", etc.; j) "scanning", "evaluating", etc.; k) "round", "circular", "oblong", "elliptical", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that expressions such as "connected" and "connectable", or "mounted" and "mountable", may be interchangeable, in that the present invention also relates to a kit with corresponding components for assembling a resulting fully assembled system or machine used for reducing giveaway material on various different types of products, such as mint products, for example.

Moreover, components of the machine(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiment of the present invention as illustrated in the accompanying drawings may comprise various components, and although the preferred embodiments of the method and corresponding system may consists of certain preferred steps and components as explained herein, not all of these steps and components are essential to the invention and thus should not be taken in their restrictive sense, i.e. should not be taken as to limit the scope of the present invention. It is to be understood, as also apparent to a person skilled in the art, that other suitable steps, components and cooperation thereinbetween, may be used for the present method and corresponding system (as well as corresponding components) according to the present invention, as will be briefly explained hereinafter and as can be easily inferred herefrom by a person skilled in the art, without departing from the scope of the invention.

Broadly described, the present invention, as illustrated in the accompanying drawings, relates to a system (101) and method for reducing giveaway material on manufacturing products (107), whether finalized products (107) or intermediate products (107) thereof, and being particularly useful for "mint" products (107), such as bullion products, investment products, numismatic products, circulation products, medals, medallions, ingots, bars, blanks, and the like, for example, or for reducing giveaway material on any other type of product (107), preferably made of a precious metal (such as gold, silver, platinum and palladium, for example). As will be shown hereinbelow, the present invention possesses several advantages when compared to conventional techniques/methods known in the art. Namely, the present invention is advantageous in that it enables to improve the accuracy of these products (107) by reducing the weight of the products (107) closer to the minimum allowed weight of legal trade, or to a given threshold, thereby avoiding that excess extra material of high value from being simply given away.

Furthermore, it is worth mentioning that in the context of the present description, explanations regarding the invention are given in relation to a 1-ozt silver round coin, which is a high-volume product produced by the Applicant (i.e. a "Mint"), merely given as way of a simple example of how the present invention can be useful and may be useful. However, a person skilled in the art, in view of the present description, will understand that the present invention may be used for by various other types of entities (refiners, smelters, etc.), with various other types of objects (cast bars, minted bars, minted coins, coin blanks and medallions, ingots, etc.), made of various other types of materials (gold, etc.), without departing from the scope of the present invention. For this reason, an expression such as "mint" is not intended to be limiting in any sort of way, and is intended to cover any product where the removal of giveaway material according to the present invention could be used and may be useful.

According to one preferred aspect of the present invention, there is provided a machine (103) for reducing giveaway material from a plurality of mint products (107) each having different physical parameters. As shown in the accompanying figures, the machine (103) may comprise a conveying assembly (109), a processing assembly (111), and a recuperating assembly (113). The conveying assembly (109) is used for conveying a plurality of mints products (107) to be processed. The processing assembly (111) is used for processing at least one given mint (107) product at a time, and in particular, for removing giveaway material from each product (107). The recuperating assembly (113) is used for recuperating mint products (107) having being processed in the present machine (103) and/or method.

According to a preferred embodiment of the present invention, the processing assembly (111) of the machine (103) is configured for: a) evaluating at least one physical parameter of a given mint product (107) to be processed; b) comparing said at least one physical parameter of the mint product (107) to be processed with a minimum threshold physical parameter in order to determine an attainable range of giveaway material to be removed; c) projecting or calculating a targeted amount of giveaway material to be removed from the mint product (107) to be processed depending on, or as a function of, the attainable range of giveaway material; and d) removing the targeted amount of giveaway material via at least one surface (115) (portion, etc.) of the mint product (107).

As a result, the processing assembly (111) preferably comprises an evaluating assembly (117) for evaluating at least one physical parameter of the mint product (107) to be processed. The at least one physical parameter of the mint product (107) to be processed could be, for example, weight, dimension, geometric profile, type of material, purity of material, material density, material hardness or any other parameter of the mint product (107) to be processed, to be used to determine an amount of giveaway material to be removed (or any other consideration for that matter), or the best mode in which to do so, as can be easily understood by a person skilled in the art In the event where the at least one parameter to be evaluated (or approximated, estimated, etc.) and considered is "weight" (i.e. one of the simplest parameters to evaluate, especially when considering "giveaway material"), then the processing assembly (111) may comprise a weighing assembly (119) for weighing the mint product (107) to be processed. Preferably, the weighing assembly (119) comprises at least one scale (121) operatively resting on a ground surface (123) via at least one vibration-dampening assembly (125), and according to a preferred embodiment of the present invention, each scale (121) is operatively isolated from the rest of the machine (102), so as to have precise readings (ex. a tolerance of about +/−2 mg). Preferably also, the weighing assembly (119) comprises an adjustment mechanism (127) for adjusting a value of the weight being measured for a given mint product (107) to be processed depending on previous readings and other previous mint products (107) having been processed, so that the present system (101) can "learn" and "adjust" itself accordingly for achieving even more precise results.

As better exemplified in FIGS. 3-10 and 13-23, the processing assembly (111) preferably comprises at least one rotating carrousel (129) having pockets (131) for receiving a plurality of mint products (107) to be processed, and also comprises a manipulating assembly (133) for manipulating the mints products (107) to be processed.

According to a preferred embodiment of the present invention, and as better illustrated in FIGS. 1-16, the manipulating assembly (133) comprises at least one articulated arm (135), and preferably a pair of such articulated arms (135a,135b), and each articulated arm (135) is configured for manipulating a given mint product (107) to be processed to and from a corresponding carrousel (129). Preferably, the manipulating assembly (133) comprises a centering assembly (137) for centering each mint product (107) to be processed with respect a corresponding reference line or point.

As can be easily understood by a person skilled in the art when referring to FIGS. 17-23 and 41, and according to a preferred embodiment of the present invention, the processing assembly (111) comprises first and second clamping components (143a,143b) (i.e. clampers) for clamping each mint product (107) to be processed, the clamping components (143) being preferably made of high polished steel. As also shown, the processing assembly (111) is preferably configured for rotating each mint product (107) to be processed with respect to a corresponding reference line (139) or point (141), and the processing assembly (111) is preferably configured for vertical displacing each mint product (107) to be processed with respect to a corresponding reference line (139) or point (141).

The processing assembly (111) may comprise a scanning assembly (145) for scanning the mint product (107) to be processed, and for generating a corresponding profile thereof. This visual information obtained by the scanning assembly (145) can then be advantageously used for calculating an exact amount of targeted giveaway material to be removed.

Preferably also, the processing assembly (111) further comprises a material-removal assembly (147) for removing giveaway material from the mint product (107) to be processed, which, in its simplest form, may consist of a cutting assembly (149) for cutting away giveaway material from the mint product (107) to be processed, using a cutting tool (151), such as a carbide cutting tool (151) having a given radius of curvature (153), as will be explained in greater detail hereinbelow.

Preferably also, the processing assembly (111) comprises a computing assembly (155) for receiving and computing data associated with the mints products (107), and for adjusting parameters of the machine (103) according to said data.

Referring now to FIGS. 1-23, a brief overview of the operation of a machine (103) for reducing giveaway material according to a preferred embodiment of the present invention will be given. Indeed, as can be easily understood by a person skilled in the art when referring to these figures, the mint products to be processed, such as for example, in our illustrative case, products (107) or blanks for 1-oz silver round coins, are inserted into a blank bunker (157) acting as a feeding hopper. The blank bunker (157) is preferably configured so as to avoid jamming of the blanks within the bunker, and so that the blanks fall by gravity, down to a portion of the system (101) where the blanks are fed to an upstream conveyor (159). If ever deemed appropriate, downward movement of the blanks within the blank bunker (157) could be assisted by a vibration mechanism. The upstream conveyor (159) brings the blanks to a blank drum (161) which is preferably configured to rotate, and is also provided with pockets (163), so that blanks inserted into said pockets (163) are then individually fed via a rotation of the blank drum (161) into a corresponding chute (165) for aligning singled blanks.

As can be easily understood when referring to FIGS. 3-14, each blank is then brought from the chute (165) to a conveying belt (167) which brings each blank to a corresponding scale (121a) where an initial weight of each blank is measured. If the blank is under a given predetermined weight, then it will be pushed via a corresponding pusher (169) for reject blanks onto a chute (171) for reject blanks, which will bring the blank down to a corresponding conveyor (173) which will then convey the blank into a box (175) for lightweight reject blanks. If however, the blank is above a minimal predetermined weight, and preferably within a certain range of weight (that is, not above a pre-established maximum limit weight), then the blank will be picked up by the articulated arm (135) which will bring the blank onto a corresponding pocket (131) of the carousel (129) of the processing assembly (111).

As mentioned earlier, the articulated arm (135) preferably comprises appropriate accessories or grippers (177) for manipulating and handling each mint product (107), whether the blank be made of silver, or any other type of product made of another type of material, as can be easily understood by a person skilled in the art. According to a preferred embodiment of the present invention, each articulated arm (135) preferably comprises a pair of grippers (177a,177b), each containing centering fingers (179) for centering each blank, as can be easily understood when referring to FIGS. 13-16. Furthermore, each gripper (177) is preferably a vacuum gripper (177).

Afterwards, each blank will be brought, via an appropriate rotation of the carousel (129), to a processing stage (181) of the processing assembly (111), where the giveaway material having been calculated based on the initial weight of the blank measured on the first scale (121a), will be removed following certain criteria. Namely, it is worth mentioning that the theoretical obtainable range of giveaway material that can be removed from a given product (107) is the initial weight of a product (107) minus the minimal weight that it should have for its legal trade, taking into consideration any tolerance(s) from the scale (121) which should be factored in, as a preventive measure. Furthermore, given that any processing tool generally involves a certain tolerance or margin of error, which in the case of the present machine (103), is about +/−20 mg, this tolerance could also be factored in with respect to the amount of giveaway material to be removed, so that when considering both tolerances of the scale (121) and of the process, this ensure that the mint product (107) having been processed will be above the weight that it is intended for, as can be easily understood by a person skilled in the art.

According to a preferred embodiment of the present invention, and as explained earlier, each articulated arm (135) preferably comprises a pair of grippers (177) for manipulating blanks so that for each pass of the articulated arm (135), the articulated arm (135) takes up a first blank at a loading position (183) (via a first gripper (177a) of the arm (135)), while dropping off a blank having been brought back from the carousel (129) (via the second gripper (177b)) at an unloading position (185), and the first and second articulated arms (135a,135b) are preferably configured to operate in a substantially synchronous manner so as to avoid interference of one with respect to the other. For example, when one articulating arm (135a) is taking up a blank at the loading position (183) while unloading a blank having been processed at the unloading position (185), then the other arm (135b) is generally about its corresponding carousel (129b) dropping off a blank having been previously picked up at the loading position (183), and picking up a product (107) having been processed by the processing station (181) of its corresponding carrousel (129b), in order to drop it off at the unloading position (183) when this second articulated arm (135b) comes back at the pick up/drop off position (183, 185), so as to ensure a high output of mint products (107) being produced with said first and second articulated arms (135a,135b) each having first and second grippers (177a, 177b).

As can also be understood by a person skilled in the art when referring to FIGS. 3-16, the blanks having been processed and dropped off by a corresponding articulated arm (135), whether it be the first articulated arm (135a) or the second articulated arm (135b), and being dropped off at the unloading position (185), will be conveyed along the conveying belt (167b) to a second scale (121b) where the weight of the blank having been processed (either by the first carrousel (129a) or the second carrousel (129b)) will be measured and compared with respect to the minimal weight or other parameter threshold being intended. If the weight of the processed mint product (107) is below a given threshold, then a pusher mechanism (169b) will push the blank down a chute (171) for reject blanks, where in contrast, those blanks having been processed, which are above the minimal threshold, will be conveyed towards corresponding recuperation boxes (187).

As illustrated in FIGS. 17-23, different components and features could be used for the processing assembly (111) of the system (101) according to the present invention, but according to a preferred embodiment of the invention, cooling of the mint products (107) being processed is made by a fluid (ex. compressed air, water, etc.), preferably filtered along different stages, which is not only a clean and efficient way of cooling, without introducing impurities onto the mint products (107) being processed, but also, the use of compressed air for example may be used in assisting the evacuation of the giveaway material having been removed from each mint product (107), preferably in the form of shavings. Preferably also, and as better shown FIG. 23, the system (101) is provided with a suction assembly (189) so that giveaway material having been removed from the mint products (107) can be sucked into said suction assembly (189) for recuperation and reprocessing, if need may be, although allowing the shavings to fall simply by gravity onto a corresponding bin or floor could also be used. An alternative manner of "cooling" and "evacuating" (or "retrieving") giveaway material being removed from mint products (107) according to the present invention could be the use of a substantially closed fluid circuit (ex. water) that would not only cool down the mint products (107) being processed and a processing tool (227) being used therefor, but that could also "wash away" or "drain away" giveaway material having been removed from the mint products (107), and this giveaway material may then be appropriately recuperated, filtered, reprocessed, etc., as can be easily understood by a person skilled in the art.

Figure 18:
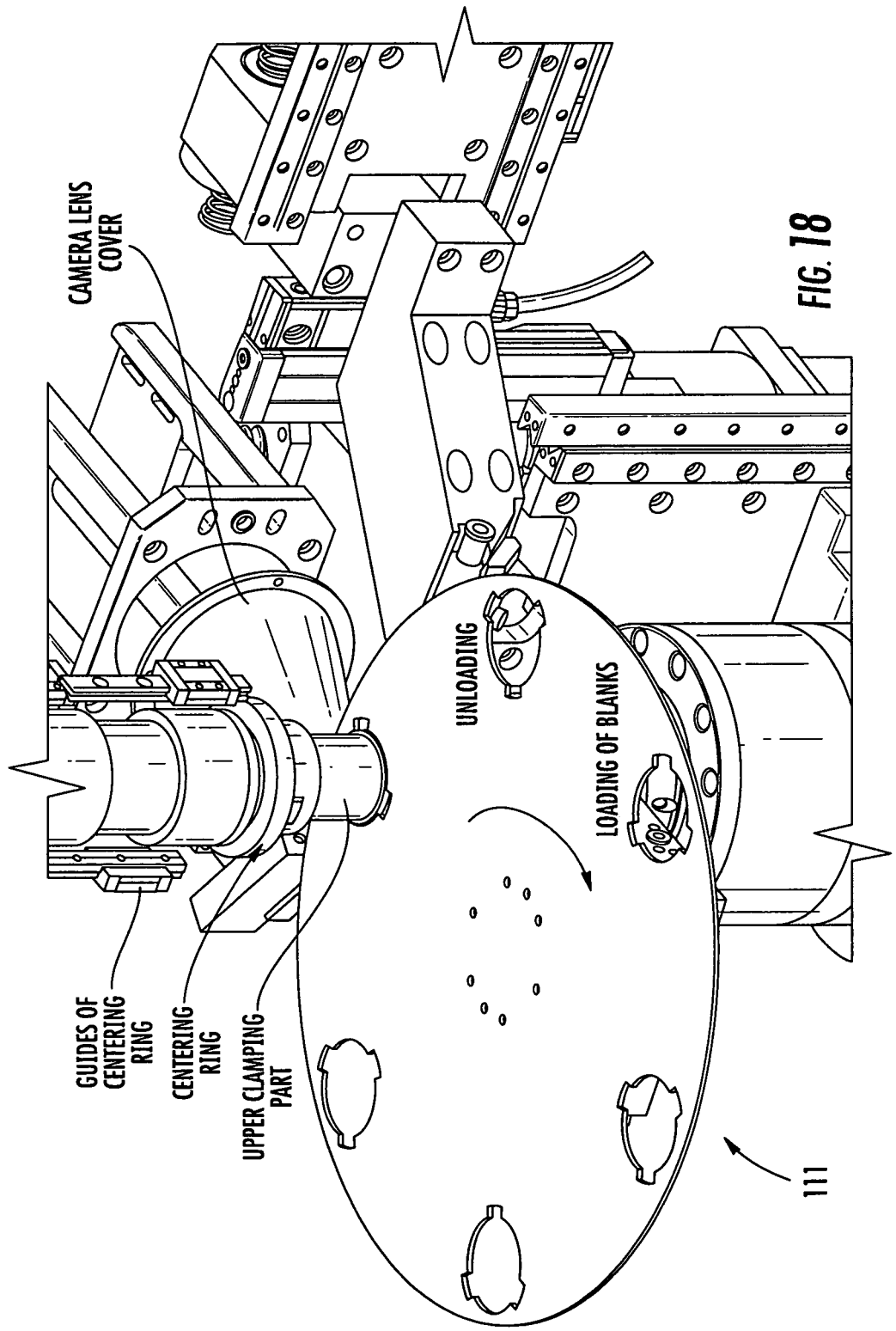
FIG. 18 is an enlarged perspective view of a portion of what is shown in FIG. 17.
Figure 19:
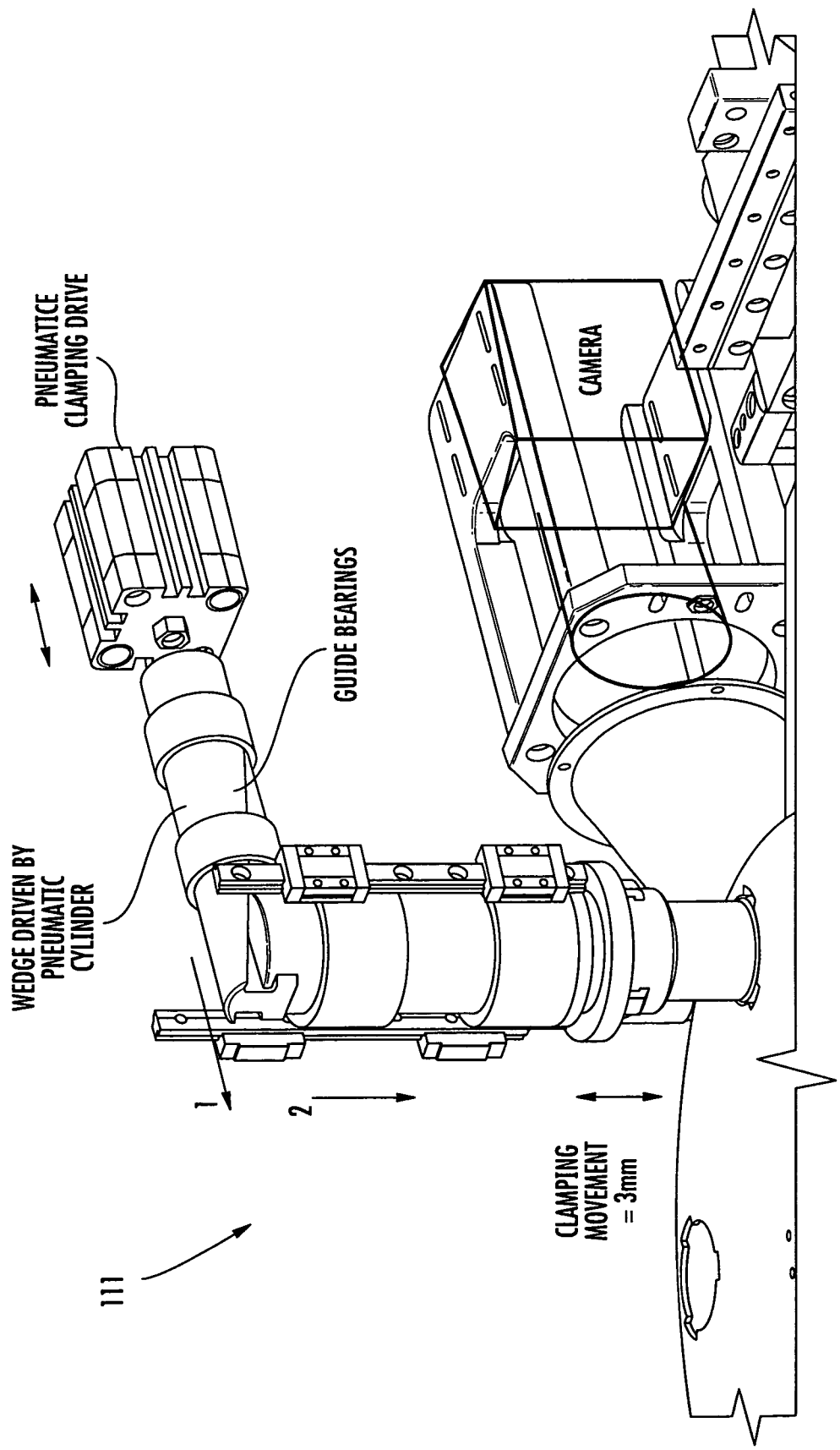
FIG. 19 is an enlarged perspective view of another portion of what is shown in FIG. 17.
Figure 20:
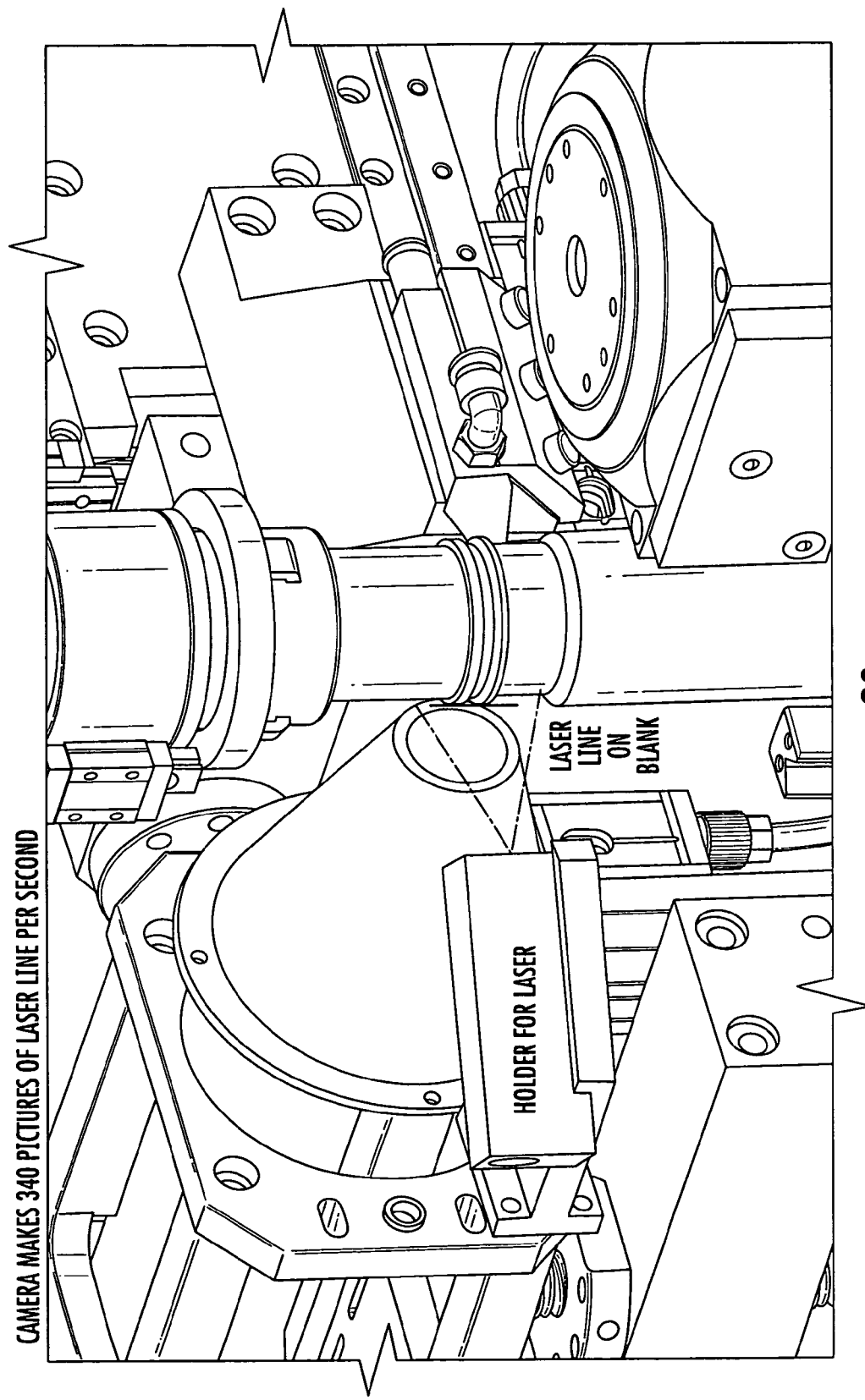
FIG. 20 is an enlarged perspective view of another portion of what is shown in FIG. 17.
Figure 21:
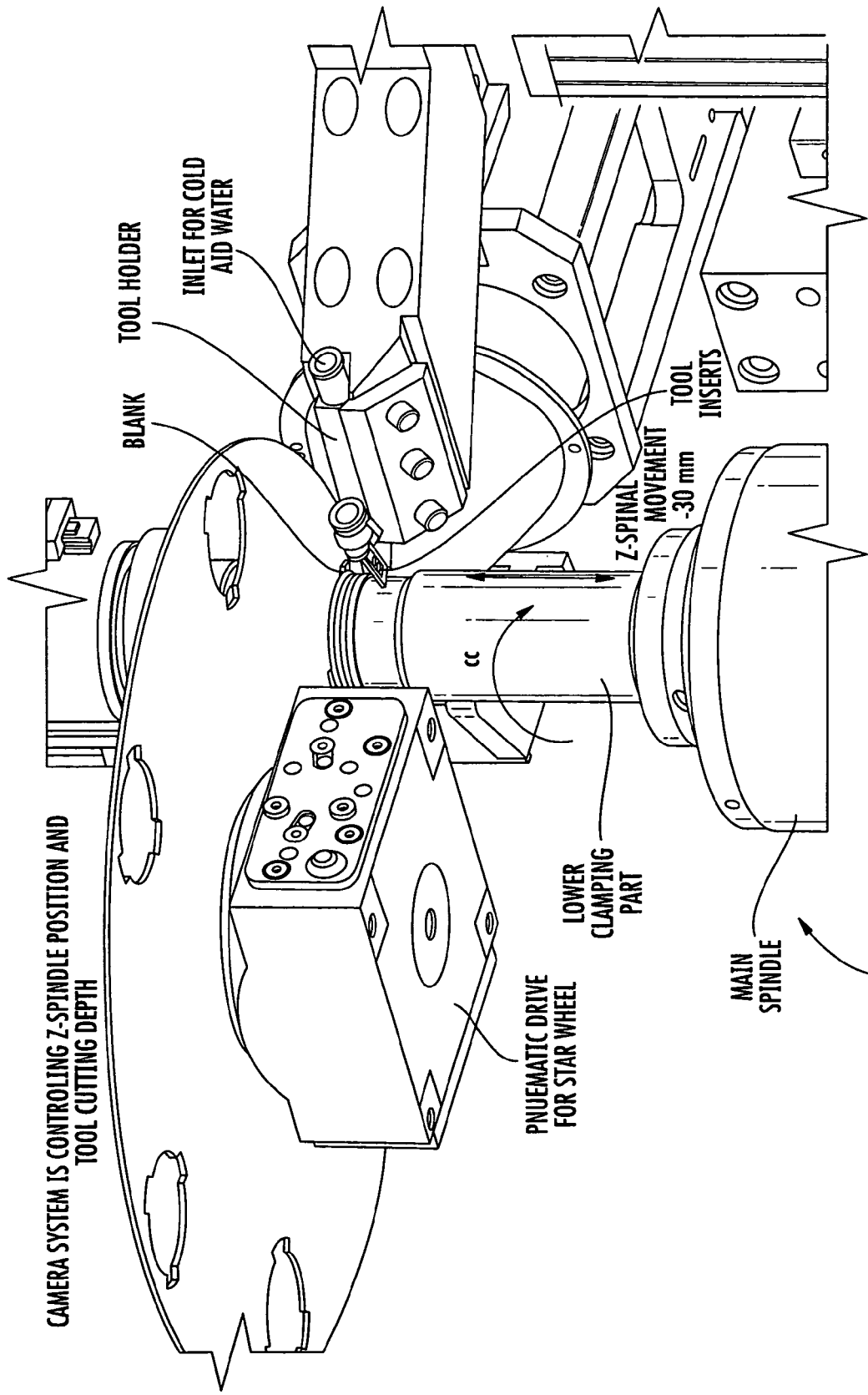
FIG. 21 is a bottom perspective view of some other components of the system shown in FIG. 17.
Figure 22:
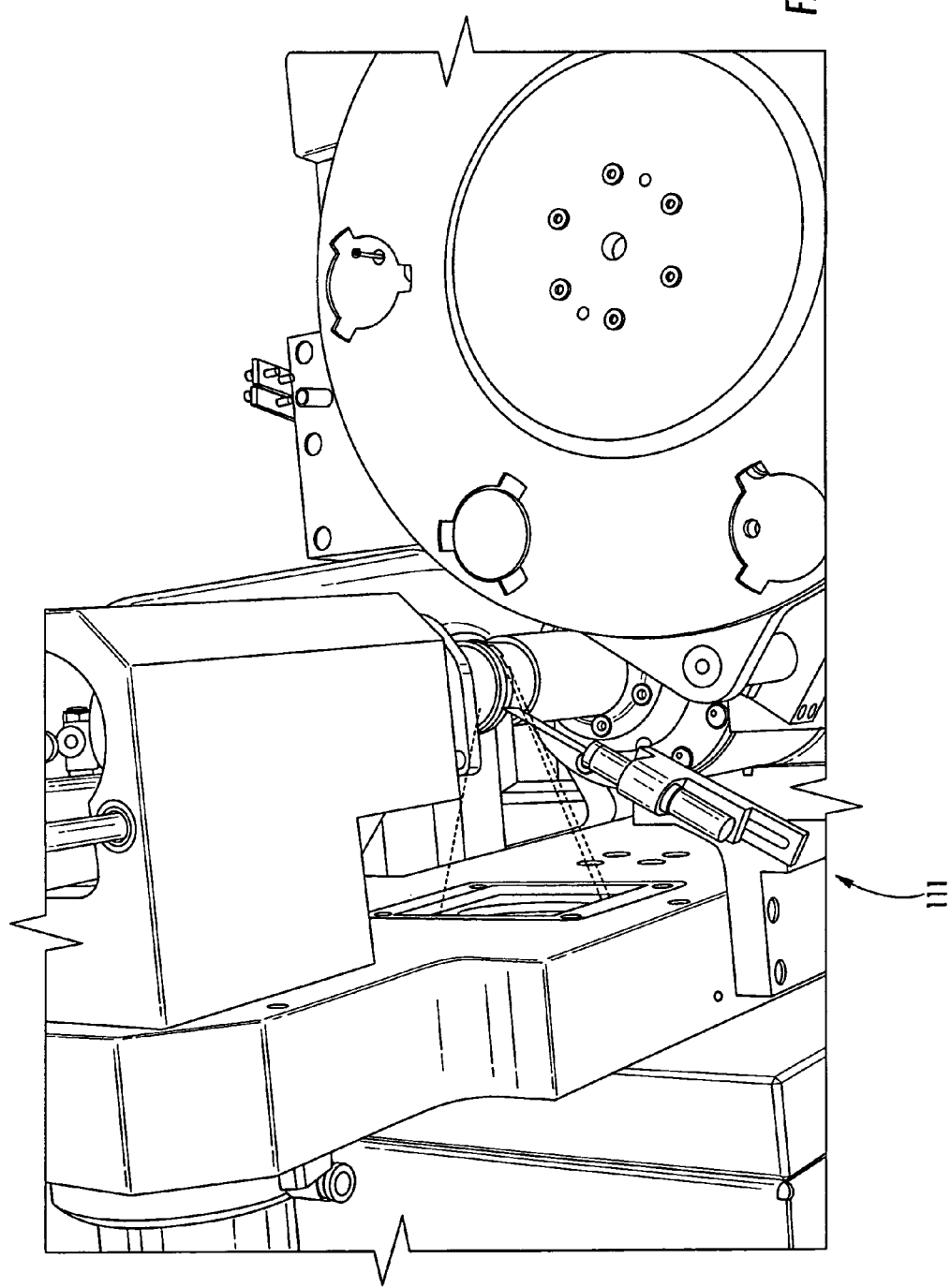
FIG. 22 is a top perspective view of some other components of the system shown in FIG. 17.
Figure 23:
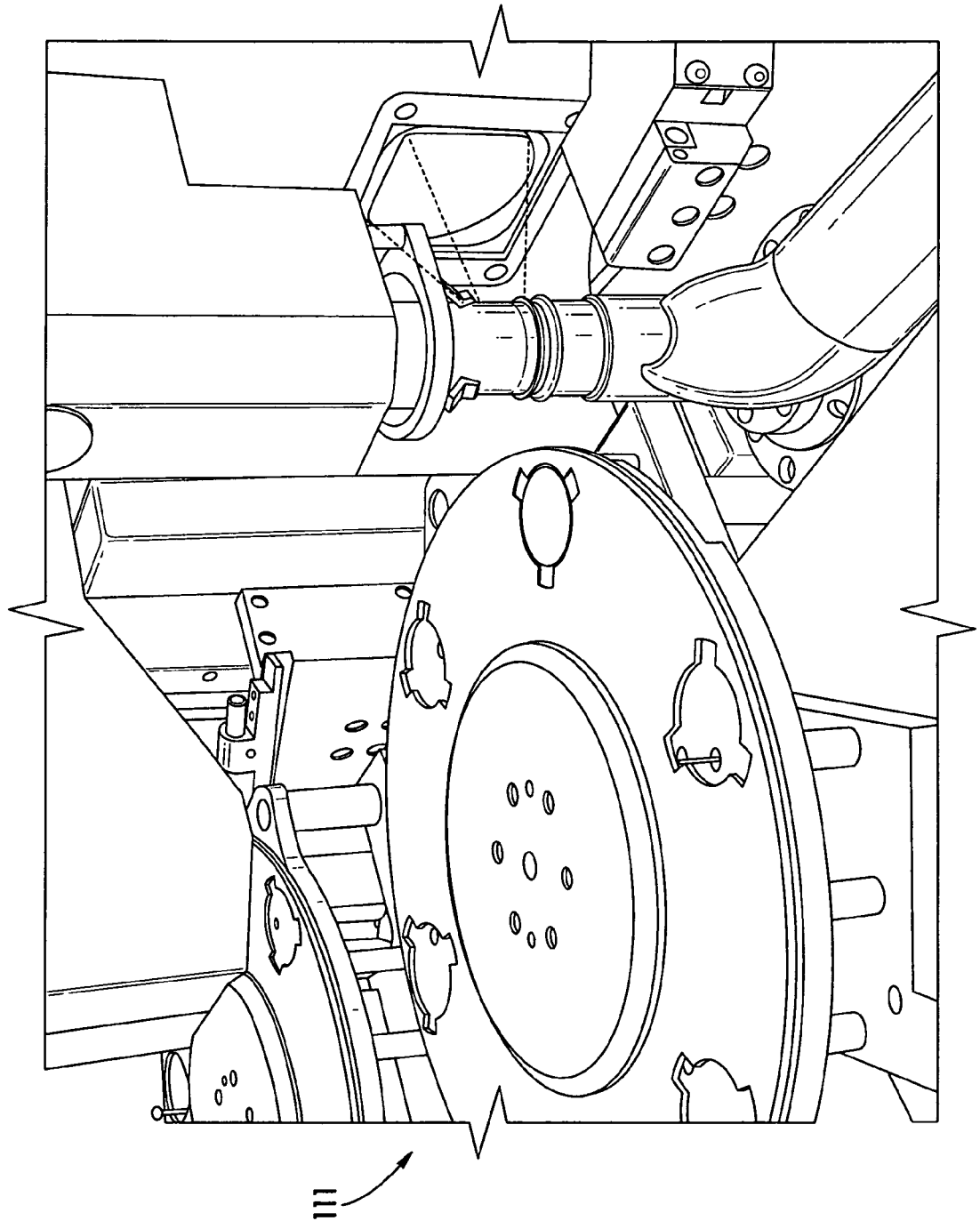
FIG. 23 is an enlarged perspective view of some other components of the system shown in FIG. 17.
Figure 41:
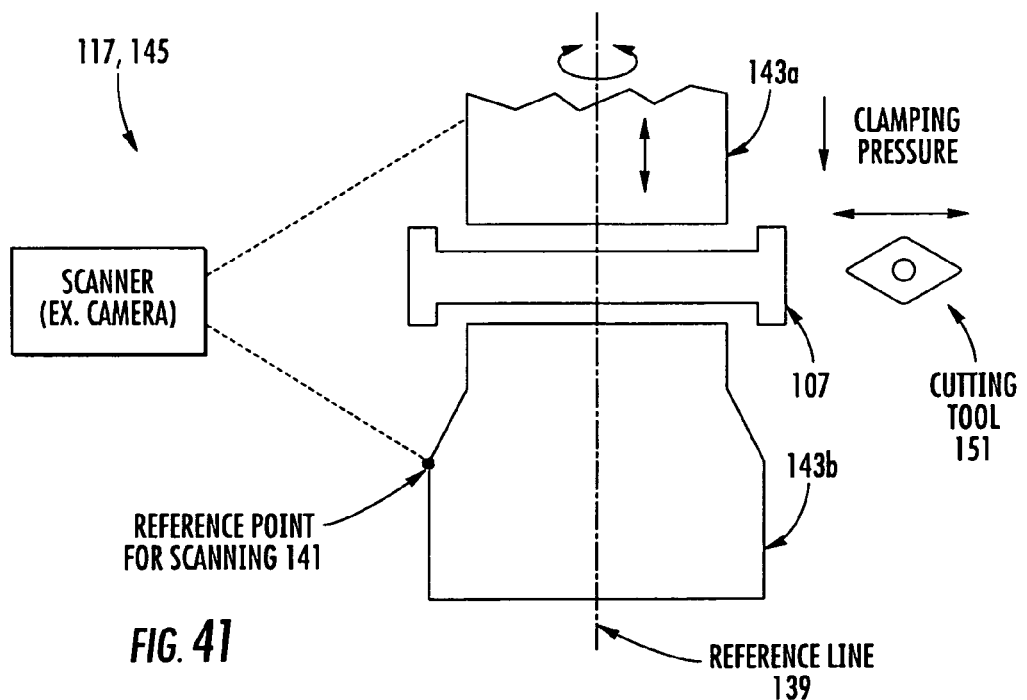
FIG. 41 is a schematic cross-sectional representation of an evaluating assembly and a processing assembly of a system used for reducing giveaway material and cooperating with a mint product to be processed according to a preferred embodiment of the present invention.
Figure 42:
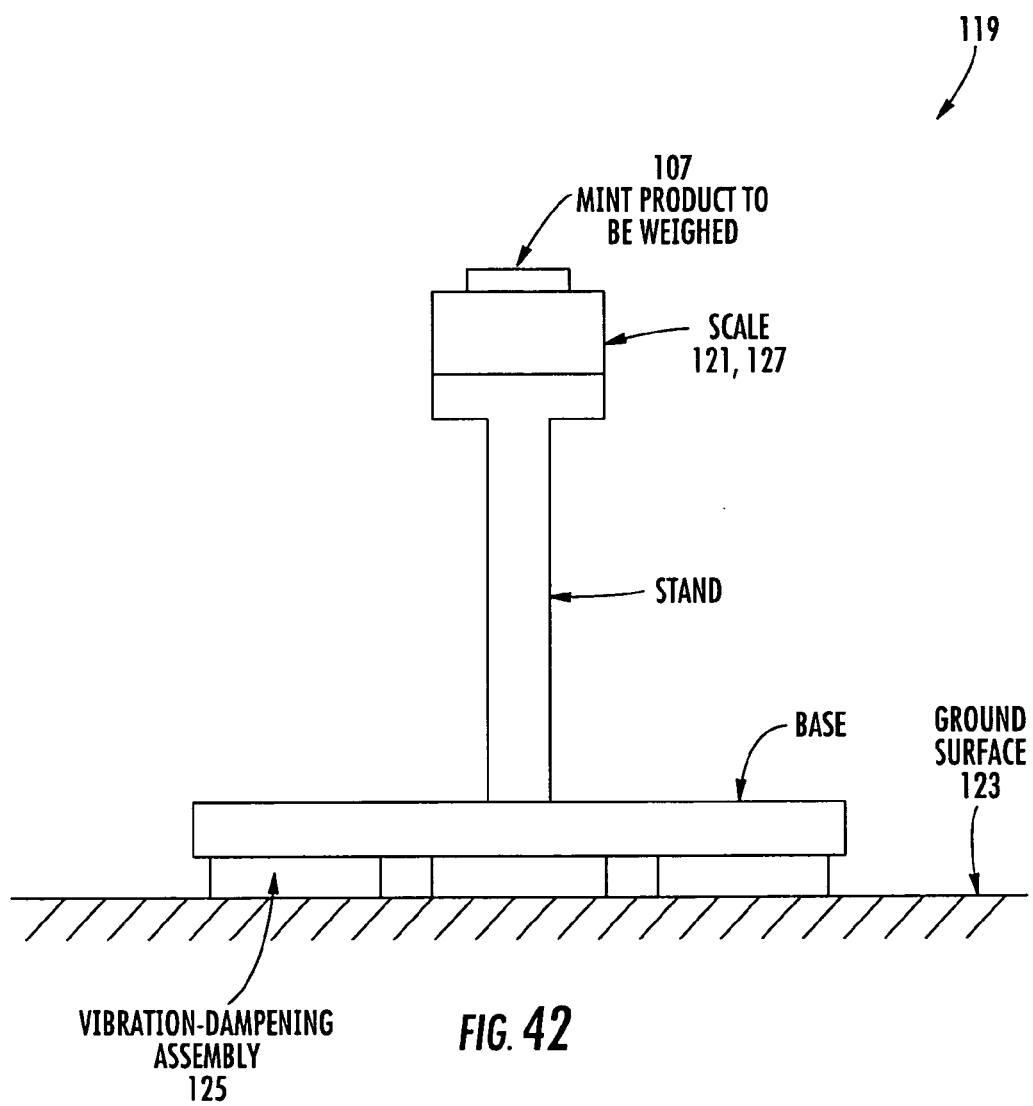
FIG. 42 is a schematic representation of a weighing assembly to be used with a system for reducing giveaway material according to a preferred embodiment of the present invention.
Figure 55:
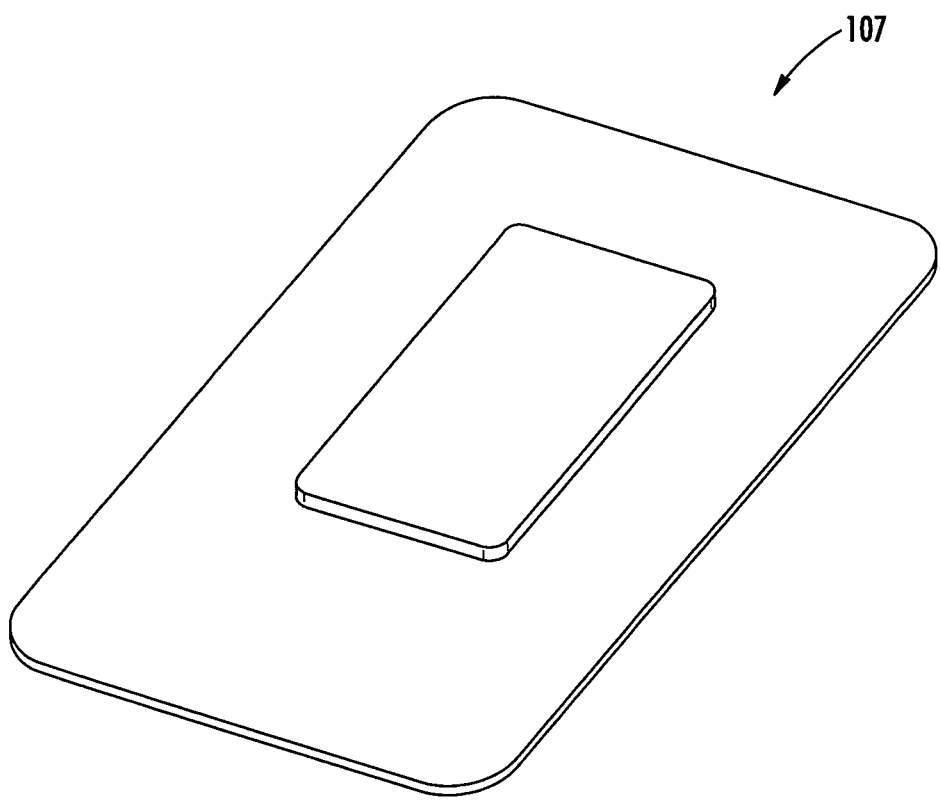
FIG. 55 is a perspective view of a mint product in the form of an ingot card and having a portion of precious metal having been processed according to a preferred embodiment of the present invention.
Figure 56:
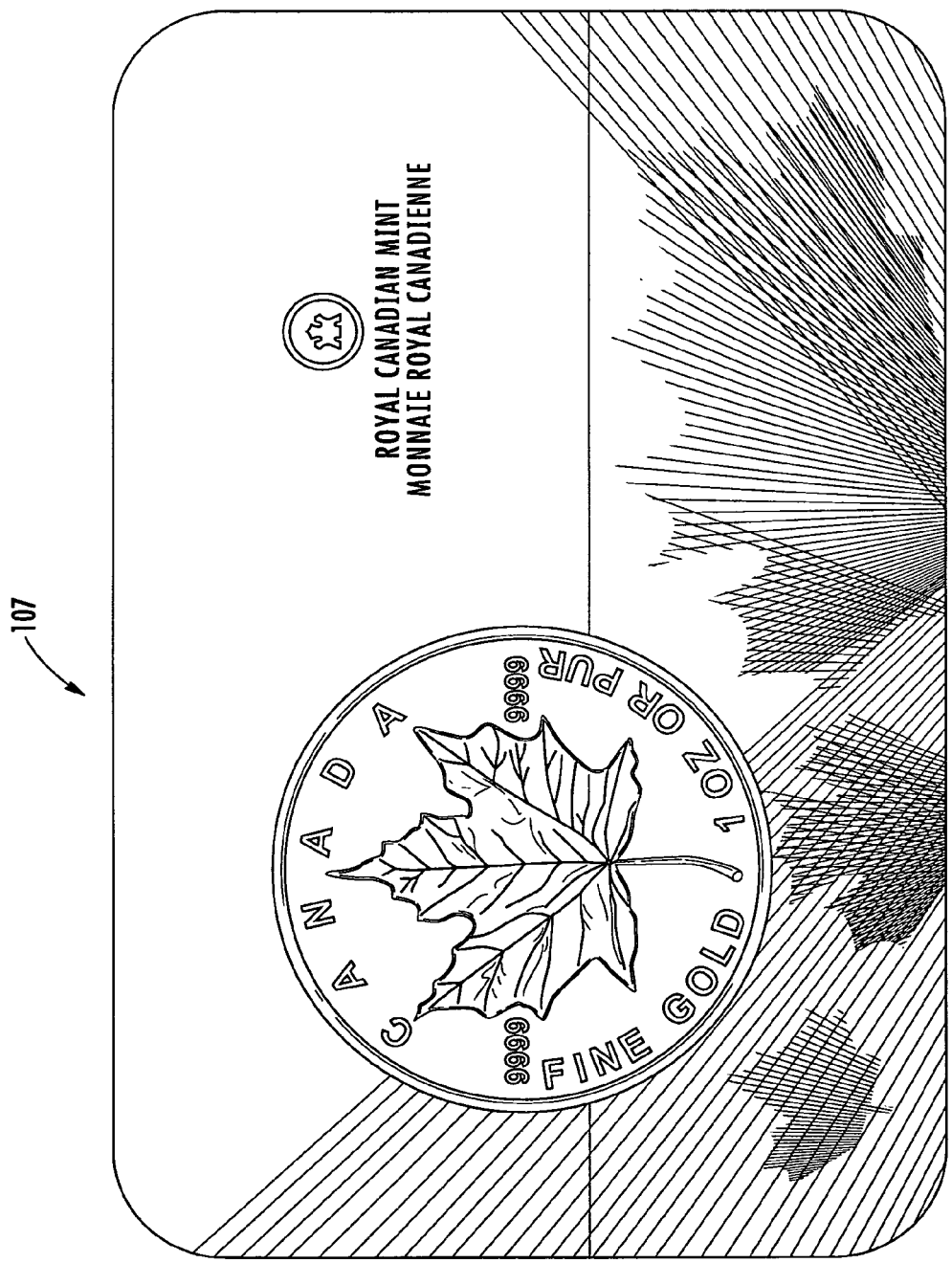
FIG. 56 is a plan view of a similar mint product having been processed with a system or a method for reducing giveaway material according to a preferred embodiment of the present invention.
Figure 57:
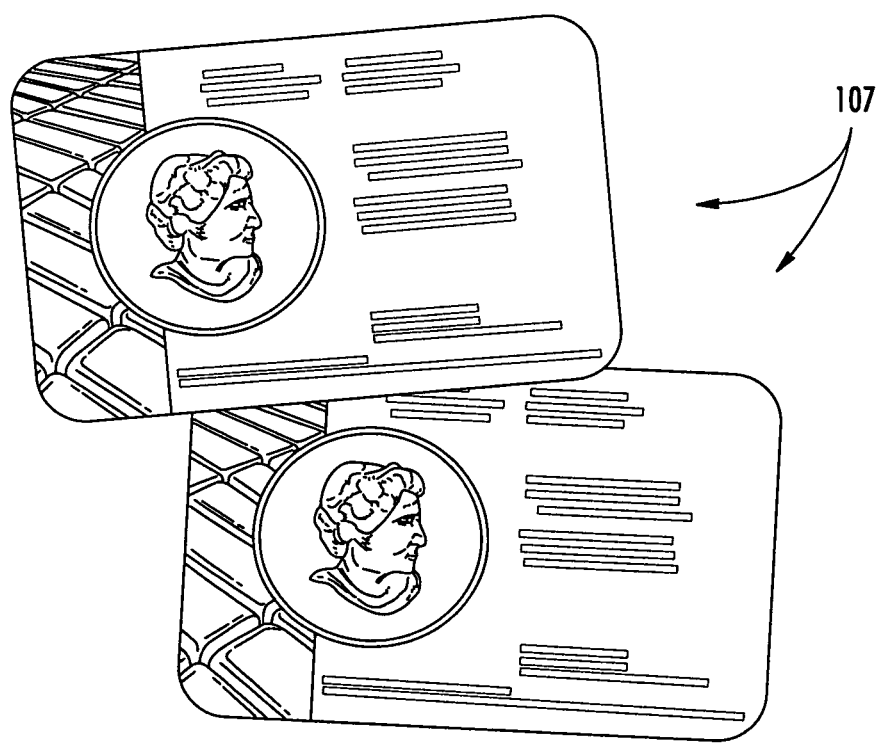
FIG. 57 is a plan view of a pair of other similar mint products having been processed with a system or a method for reducing giveaway material according to a preferred embodiment of the present invention.
Figure 58:
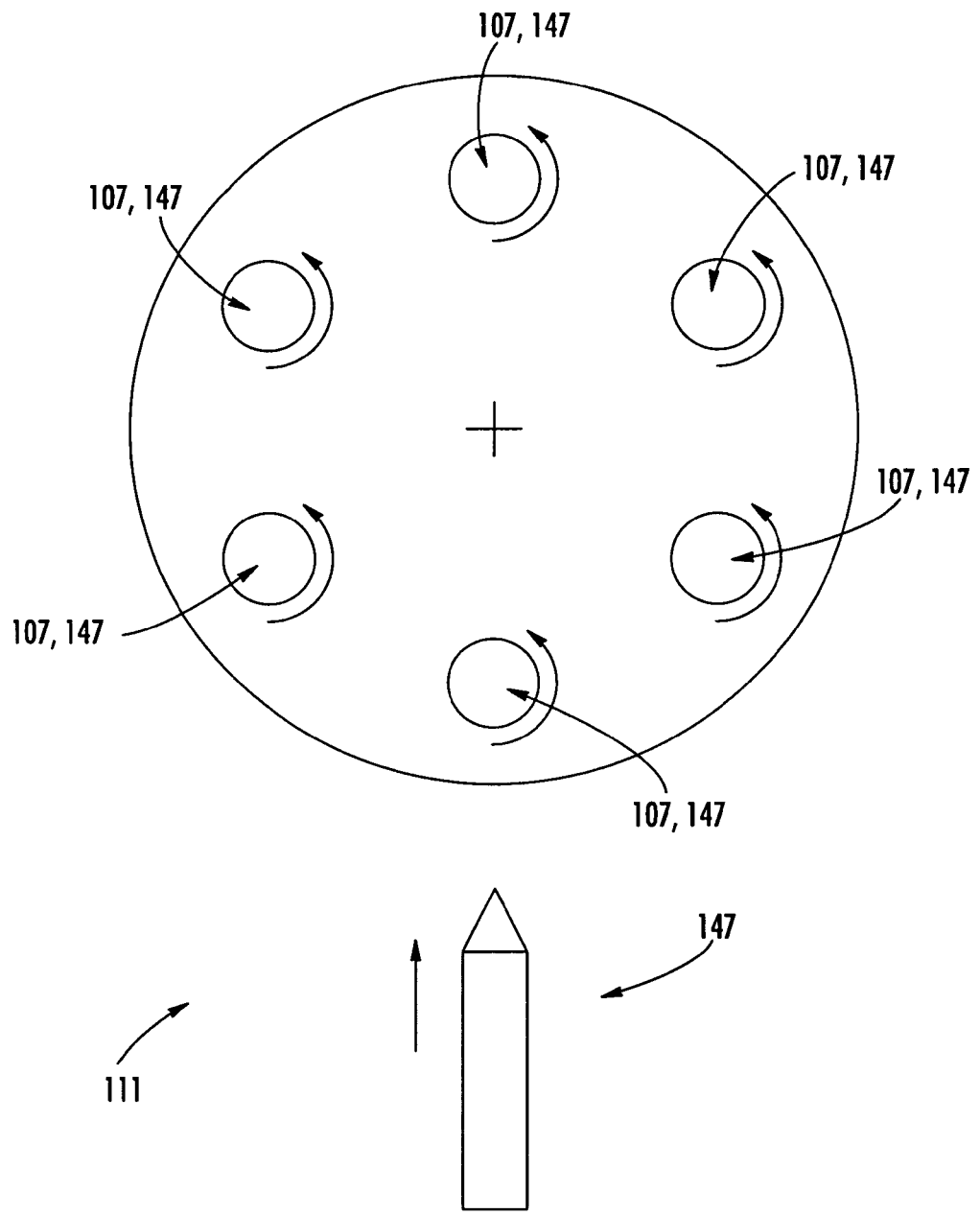
FIG. 58 is a schematic representation of a giveaway material reducing assembly including a carrousel provided with pockets each being configured for removing giveaway material from a corresponding mint product insertable therein, and having a main processing tool for further removing giveaway material from each of the mint products in the carrousel, according to another preferred embodiment of the present invention.

As can be easily understood by a person skilled in the art when referring to FIGS. 3-23, and as better shown in FIG. 18, the carousel (129) preferably has a first location (191) where each blank is loaded, a second location (193) where each blank is unloaded, and third location (195) where each blank is processed (i.e. machined, etc.), and at this third location (195), there is preferably an upper clamping part (143a) that is brought down onto the mint product (107) which is then vertically displaced downwardly within a range of a few millimetres for example, and rotated at high speed (about 3500 rpm in our example of a 1-ozt silver round coin) for processing via a corresponding cutting tool (151), as can be understood when referring to FIGS. 17-23, and as represented schematically in FIG. 41.

Furthermore, as will be explained in greater detail hereinbelow, prior to processing, there is preferably a visual recognition of the mint product (107) while it is rotated so as to obtain visual information from said product, and so as to use this information in the calculation of the targeted giveaway material to be precisely removed based on the initial weight of the mint product (107) having been obtained in the first scale (121a), and other considerations.

Thus, as may now be better appreciated, according to the preferred embodiment of the machine (103) as illustrated in the accompanying drawings, there is a common first scale (i.e. "IN" scale (121a)) for weighing on an individual basis each of the mint products (107) to be processed. These mint products (107) are either picked up by a first articulated arm (135a) or a second articulated arm (135b), which will in turn bring the pieces to a corresponding carousel (129a,129b) for processing, based on the information obtained and other operation parameters, and once each mint product (107) has been processed, it will be brought back by its same articulated arm (129) back onto the second portion of the conveyor belt (167b) where each mint product (107) will be brought to a second common scale (i.e. "OUT" scale (121b)), for re-evaluation, and depending on the weight of each blank, the blank will be either "accepted" or "rejected".

As can also be understood by a person skilled in the art when referring to FIGS. 3-14, the rejecting of the blanks via a corresponding chute (171) may not be necessarily limited if the blank simply is under a predetermined weight (i.e. "underweight"), but could also be done if the blank is above a predetermined weight (i.e. "overweight"), in which case, the same reject chute (171) could be provided with an overweight hatch (197) devised so that if an overweight blank passes thereon, the hatch (197) will be drawn downwardly due to the weight of the blank so as to allow the overweight blank to be brought down to a corresponding conveyor belt (199) which in turn conveys each overweight blank to a corresponding overweight box (201), whereas in contract, if a blank is underweight, it will pass over said hatch (197) and will go down the chute (171) onto a corresponding conveyor belt which will in turn convey each underweight blank onto a corresponding underweight box (175).

In order to further illustrate the merit of the present system (101) and method, several data has been obtained regarding the performance of the equipment in terms of precision, speed, percentage of recuperation of recovery, rejects, etc., and data has also been collected with respect to the quality of the products (107) originating from the equipment and corresponding method and basically, after having gone through over 35 000 data recorded since earlier January 2012, in short, the performances of the present system (101) and the method could be summarized as follows:

a) speed: about 30 pieces per minute;
b) weight in: 31.30-31.62 grams per blank;
c) weight out: 31.11-31.15 grams per blank; and
d) resulting percentage of giveaway recovery: about 94%.

Furthermore, FIG. 69a is a table containing data relating to a few samples (samples No. 99 to 111) of blanks among over 10 000 pieces having been tested on Feb. 7, 2012, by the Applicant, using a system and method for reducing giveaway material according to the present invention, and FIG. 69b is a table summarizing data regarding all of the pieces having been tested/processed that day (the amounts listed in terms of weight are shown in "grams", and once again, this is merely an example shown for 1-ozt silver round coins as a possible "mint product").

Thus, in short, and as may now be better appreciated, according a preferred embodiment of the present invention, the pieces are sequentially brought or conveyed up to a scale (121), where each piece is weighed a first time. Afterwards, there is a visual recognition of the surface (i.e. outer body) of each piece, this step being optional and added in order to be very precise in the amount of targeted giveaway material being removed. Giveaway material is then removed via an appropriate processing process. In the example shown, a cutting feed is used while the product is being vertical displaced and rotated. Each piece is then weighed again to ensure that it is above a minimum threshold value (ex. in the case of "weight" used as a parameter of evaluation, and in the case of manufacturing 1-ozt silver coins, making sure that it weighs at least 1-ozt, etc.).

On average, for our example of 1-ozt silver round coins, one has about 600 mg of giveaway to remove, and thanks to the visual recognition, one can attain attainable giveaway recovery within a range of about 30-40 mg, that is, a tolerance within about +/−15-20 mg. However, it is worth mentioning that without a scanning assembly (145) (i.e. without a visual recognition of each piece) and if using a 3D model, one can attain a tolerance within about +/−60-70 mg. Therefore, visual recognition of the surface is an optional step in order to achieve a greater precision.

It is worth mentioning also that in the context of the present invention, an objective is to reduce giveaway material, and not necessarily to completely remove the entire "theoretical" giveaway material, given that the complete removal of the giveaway material on a given mint product (107) is very difficult due to tolerances of measuring and processing devices, as well as various other factors, as can be easily understood by a person skilled in the art.

Furthermore, it is worth mentioning that the present system (101) or method of reducing giveaway material can be used as an option at different locations of many conventional manufacturing process used in the production of mint products (107) and the like.

Figure 24:
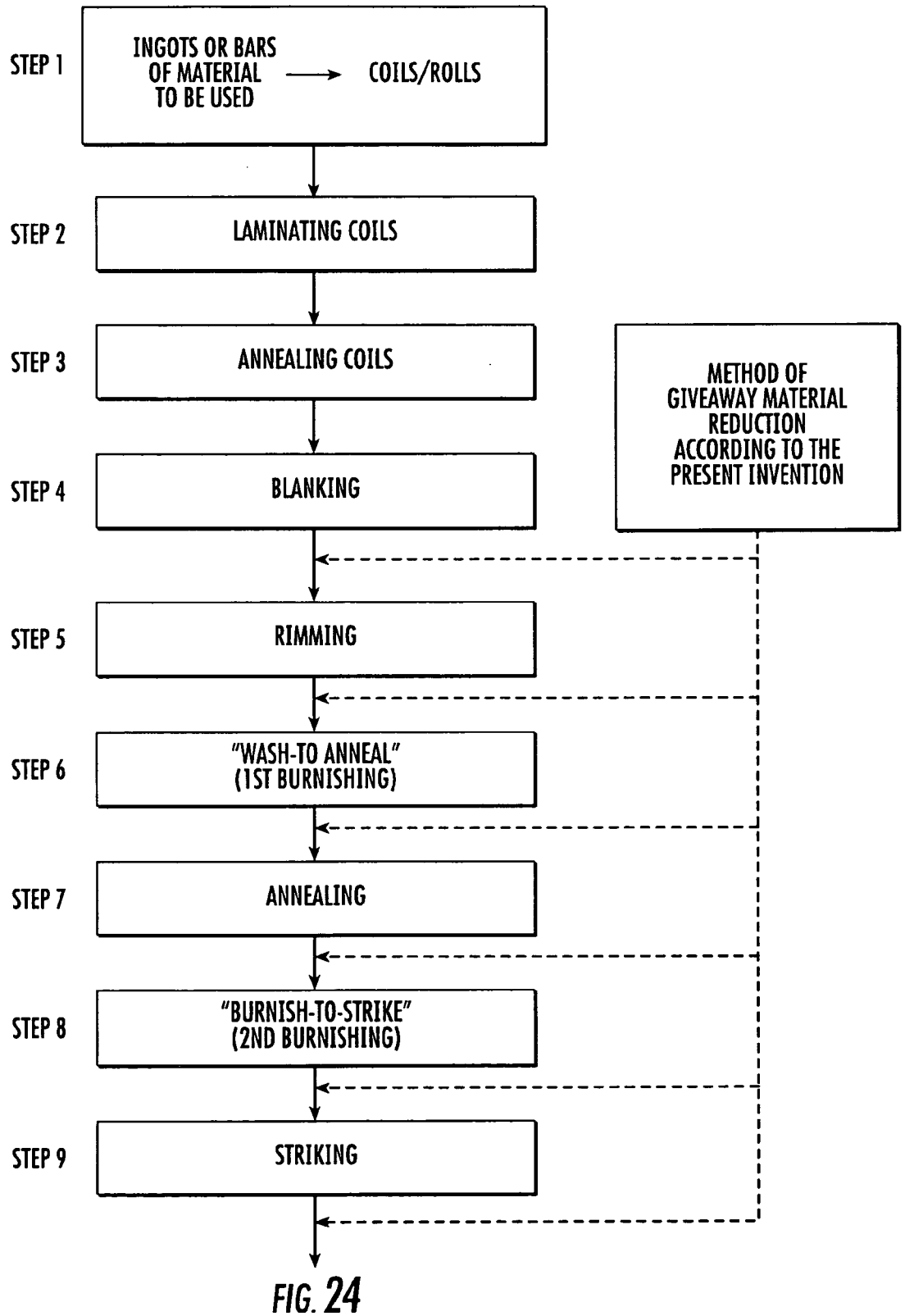
FIG. 24 is a schematic representation of a multi-step manufacturing process for manufacturing a typical bullion investment product (ex. 1-ozt silver round coins), and where the method for reducing giveaway material may be optionally introduced at different locations along the overall multi-step manufacturing process according to different preferred embodiments of the present invention.
Figure 25:
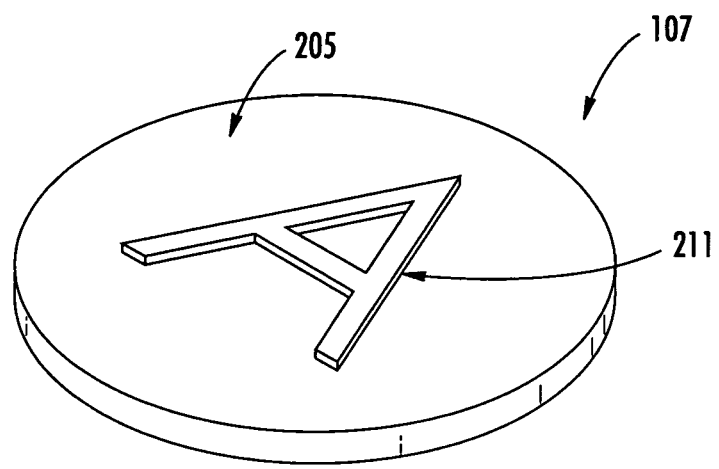
FIG. 25 is a perspective view of a top portion of a circular mint product having an obverse side being provided with a raised effigy.
Figure 26:
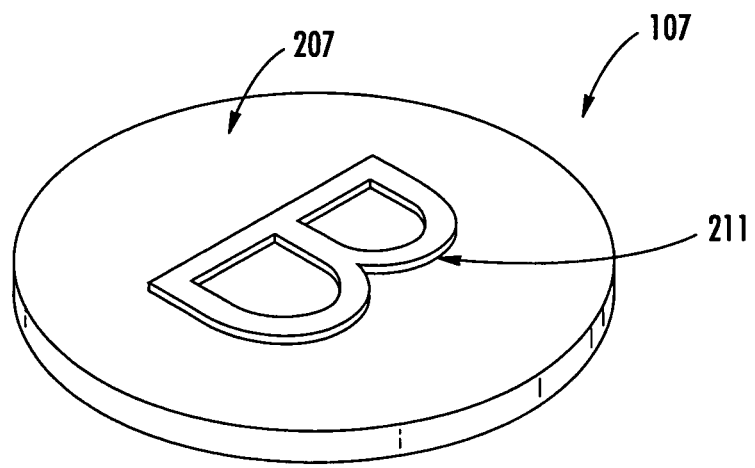
FIG. 26 is a perspective view of a bottom portion of the circular mint product shown in FIG. 25, the mint product being provided with a raised effigy on its reverse side as well.
Figure 27:
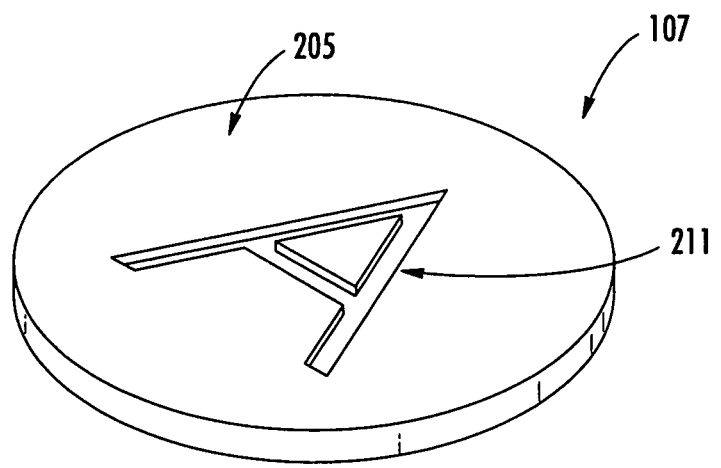
FIG. 27 is a perspective view of a top portion of a circular mint product having an obverse side being provided with an engraved effigy.
Figure 28:
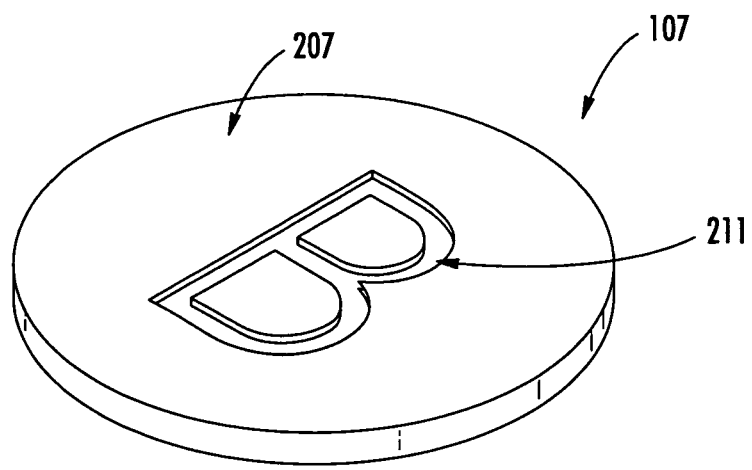
FIG. 28 is a perspective view of a bottom portion of the circular mint product shown in FIG. 27, the mint product being provided with an engraved effigy on its reverse side as well.
Figure 29:
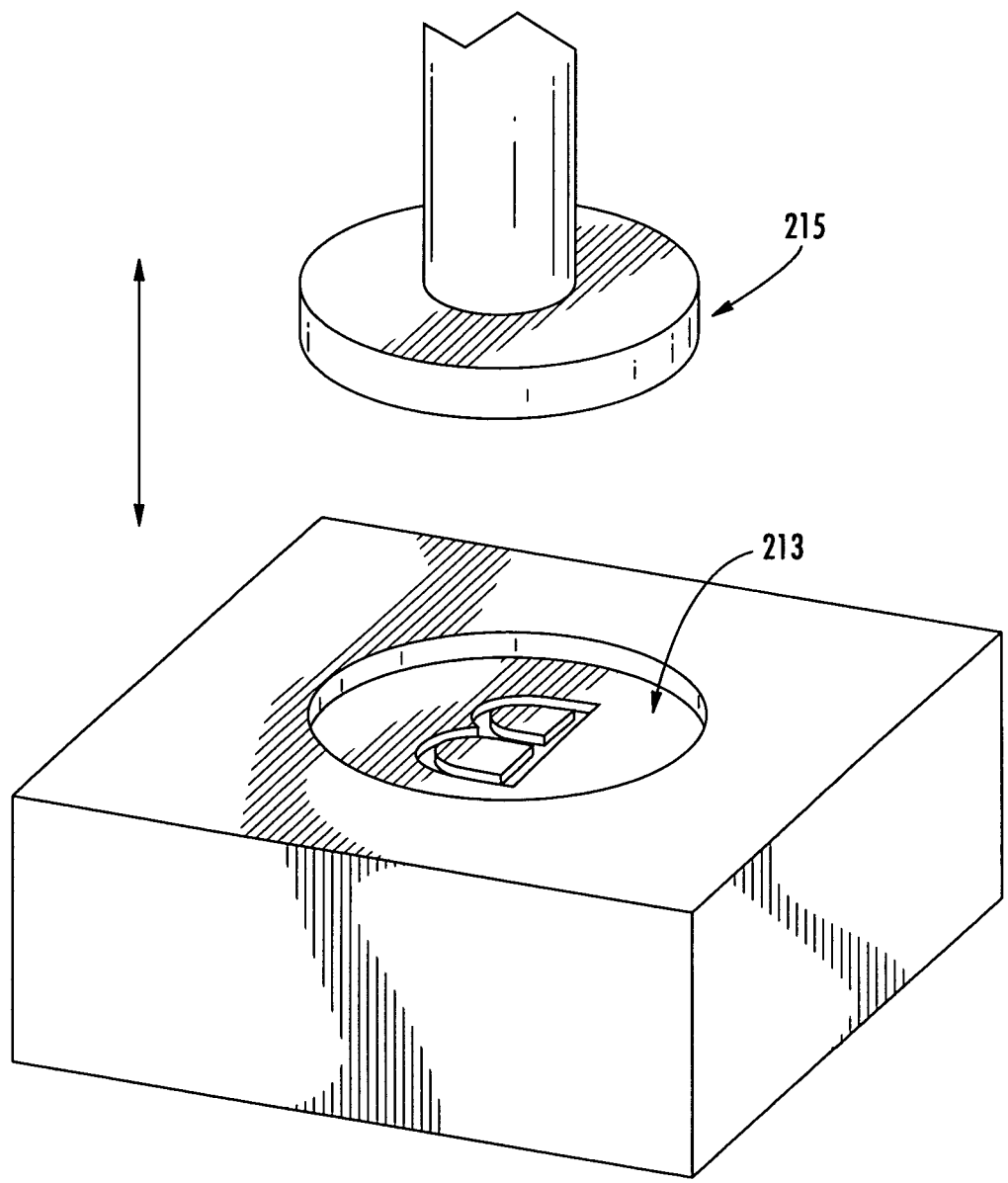
FIG. 29 is a schematic representation of a collar and clamp assembly used for manufacturing a circular mint product, such as the one illustrated in FIG. 25.
Figure 30:
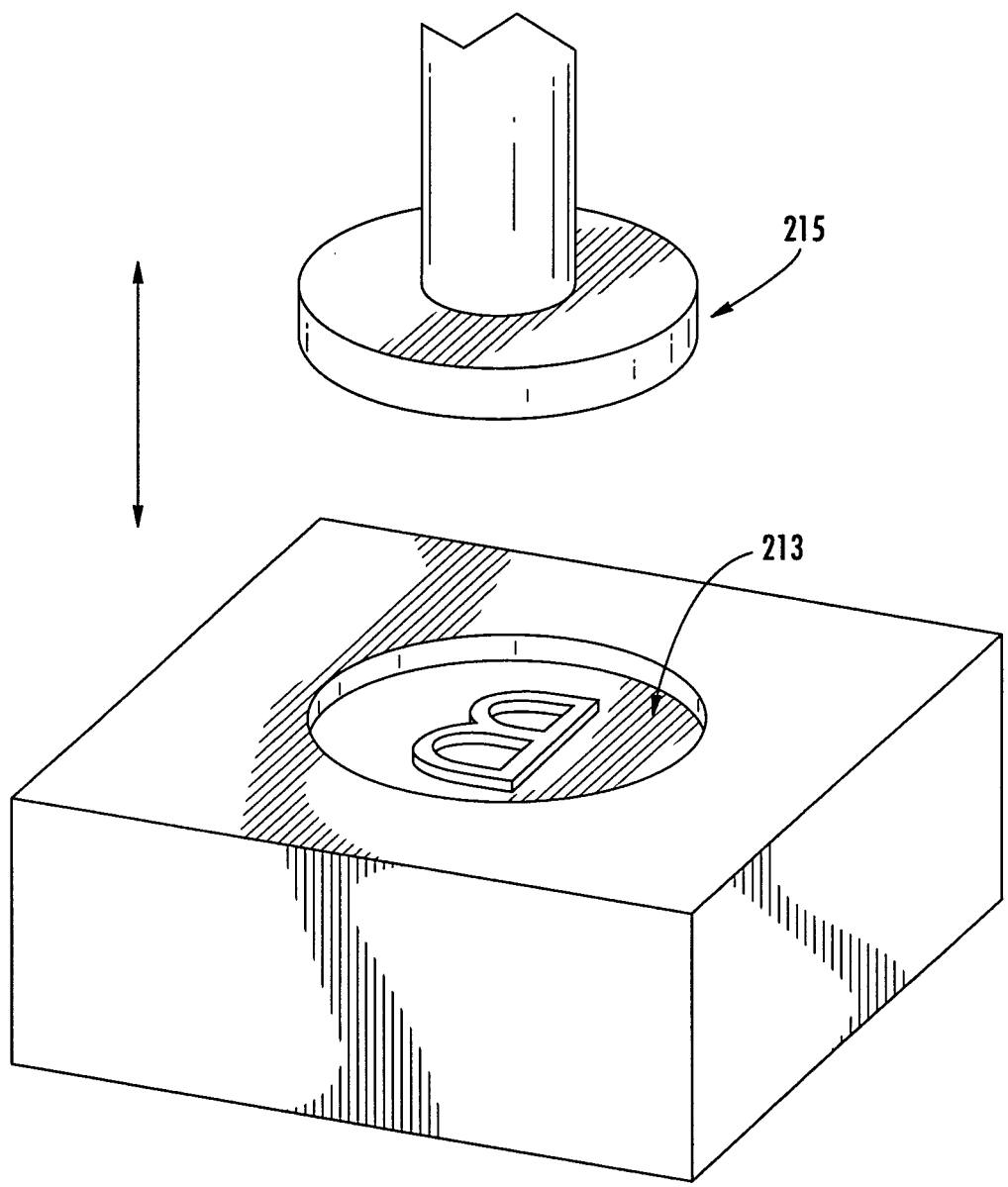
FIG. 30 is a schematic representation of a collar and clamp assembly used for manufacturing a circular mint product, such as the one illustrated in FIG. 27.
Figure 31:
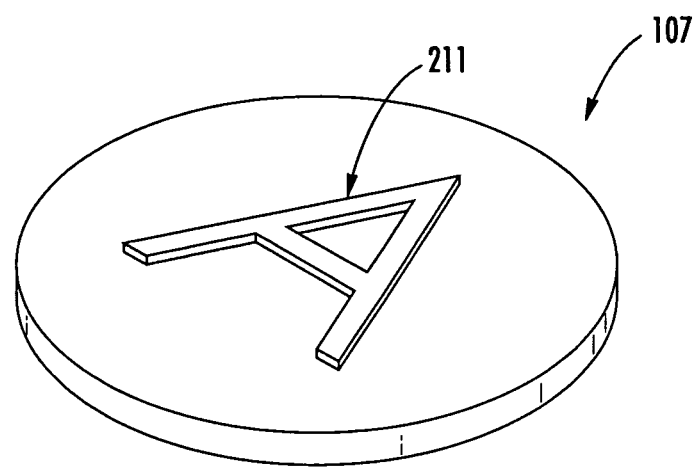
FIG. 31 is a perspective view of a top portion of a circular mint product having been struck with a plain collar.
Figure 32:
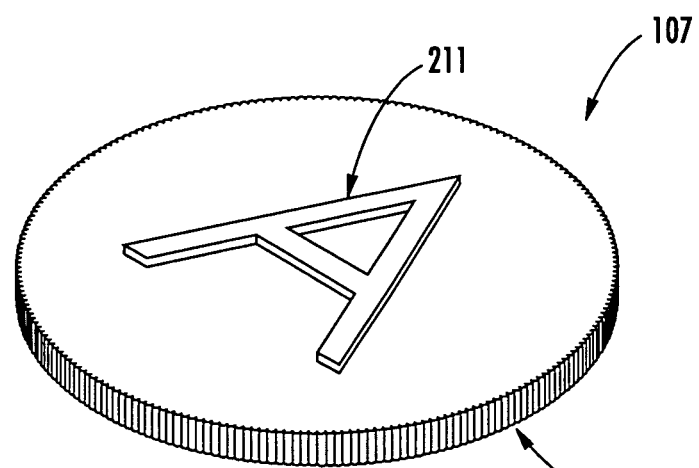
FIG. 32 is a perspective view of a top portion of a circular mint product having been struck with a serrated collar.

For example, when referring now to FIG. 24, there is shown a schematic representation of a conventional multi-step process of manufacturing a mint product (107), such as in the context of the present description, a 1-ozt silver round coin for example, and where the present method of reducing giveaway material may be conveniently and optionally incorporated at different locations without affecting the overall disposition and/or layout of the overall conventional multi-step process.

Indeed, in Step 1, the ingots or bars, which in the case of the present example, would be made of "silver", are typically melted and made out to take the form of coils. Afterwards, each coil will be typically brought to a desirable thickness via a laminating process. An annealing process usually follows, and blanking generally takes place afterwards, where blanks are cut out from the laminated sheet of precious metal (in our example, "silver"), similarly to what one would expect to see with a "cookie-cutter".

Figure 33A:
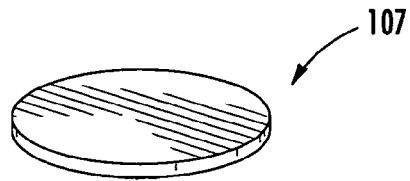
FIGS. 33A-33J illustrate different overall shapes for different types of mint products meant to be processed with a system and a method for reducing giveaway material according to a preferred embodiment of the present invention.
Figure 33B:
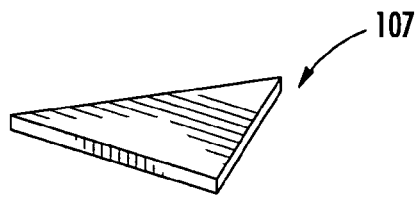
Figure 33C:
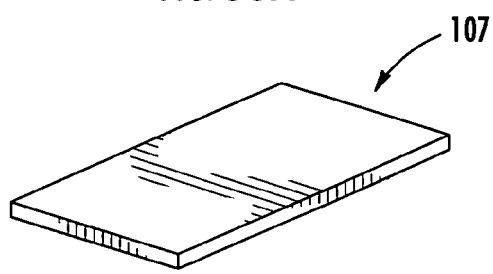
Figure 33D:
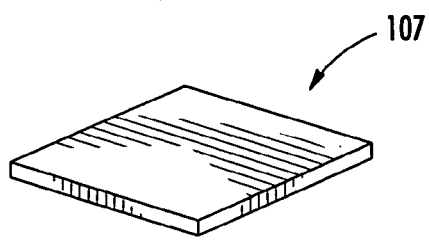
Figure 33E:
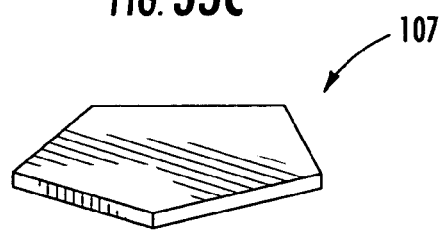
Figure 33F:
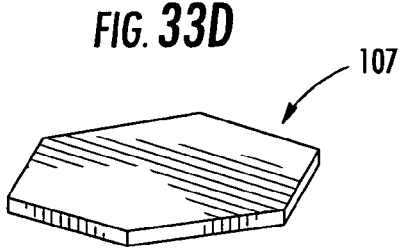
Figure 33G:
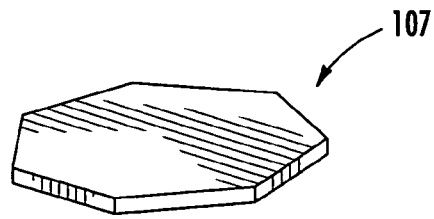
Figure 33H:
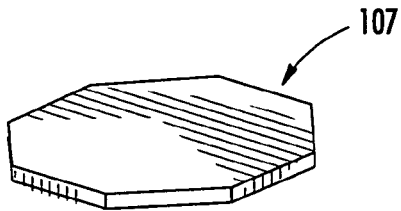
Figure 33I:
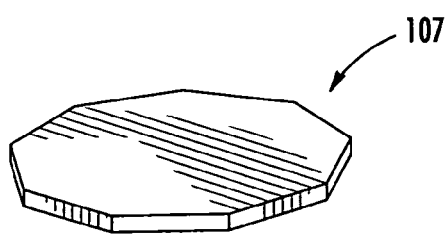
Figure 33J:
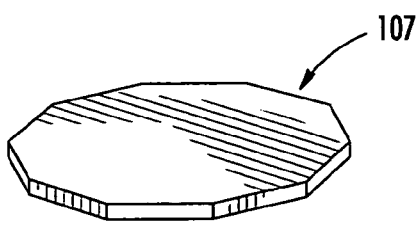
Figure 59:
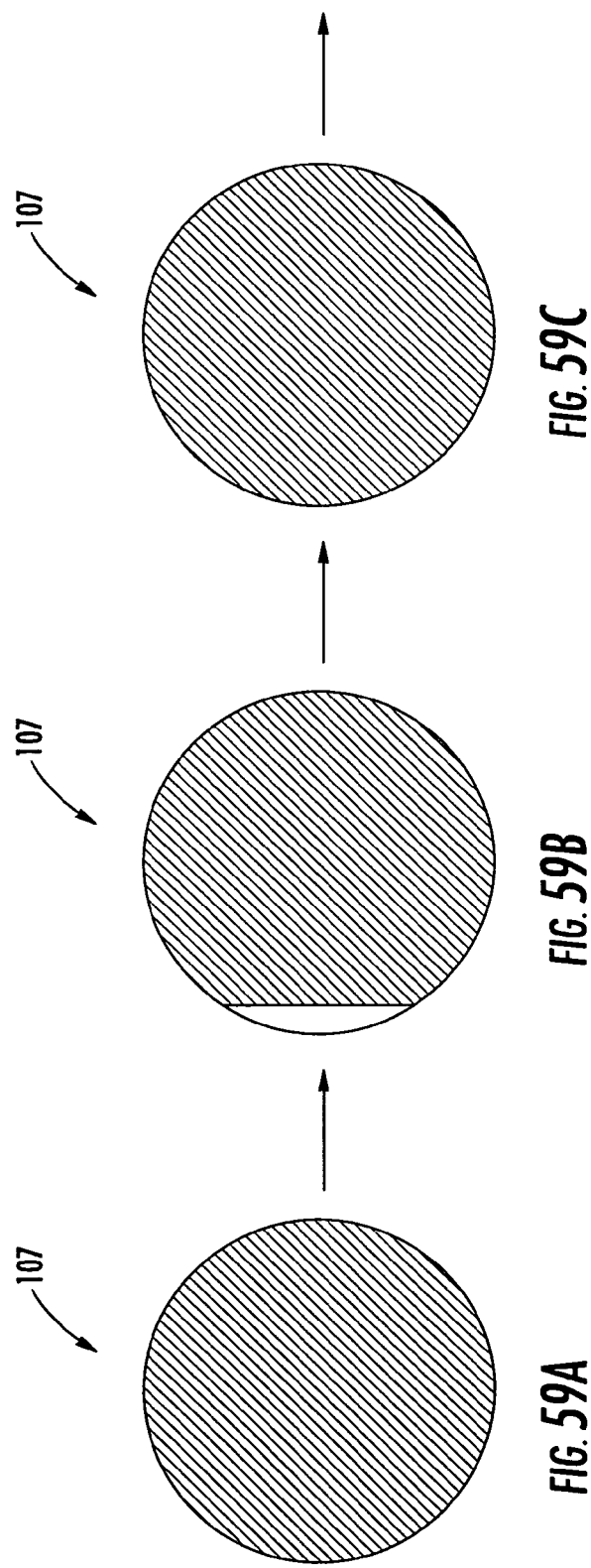
FIGS. 59*a*, 59*b* and 59*c* illustrate a schematic representation of how an unprocessed blank (FIG. 59*a*) may have giveaway material removed therefrom via a corresponding side (FIG. 59*b*) and may then be struck back into a finished mint product (FIG. 59*c*) according to a preferred embodiment of the present invention.
Figure 60:
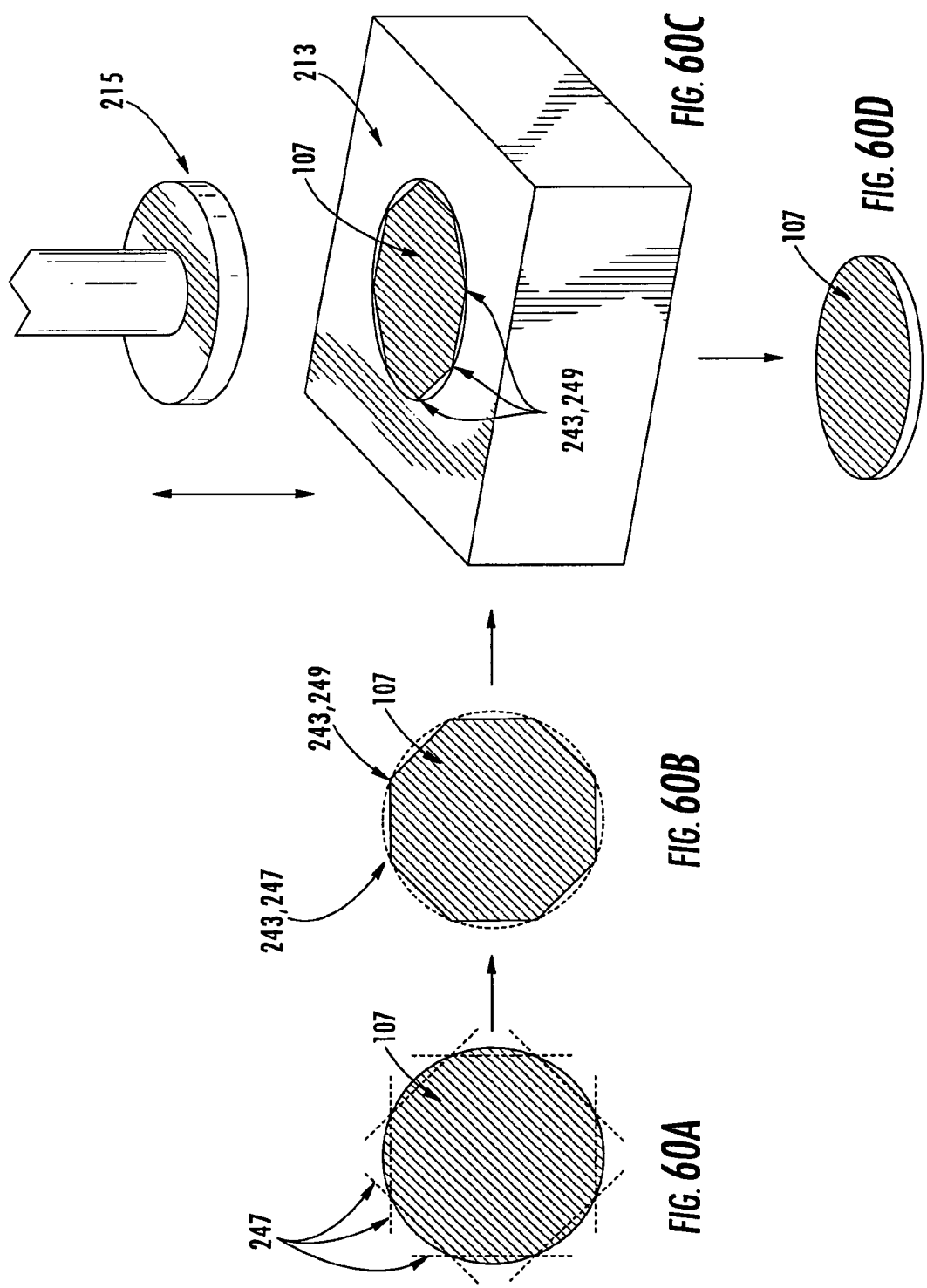
FIG. 60*a* is a schematic top plan view of a blank meant to have giveaway material reduced therefrom along a plurality of vertical planes according to a preferred embodiment of the present invention.
FIG. 60*b* is another top plan view of the blank shown in FIG. 60*a*, after giveaway material has been removed therefrom.
FIG. 60*c* is a perspective view of the blank shown in FIG. 60*b*, being inserted a schematic representation of a collar and clamp assembly used for striking, with apexes of the blank being in an abutment relationship within the collar for preventing jumping of the blank during striking according to a preferred embodiment of the present invention.
FIG. 60*d* is a perspective view of the blank shown in FIG. 60*c*, after it has been struck into a finished mint product by the collar and clamp assembly according to a preferred embodiment of the present invention.
Figure 61:
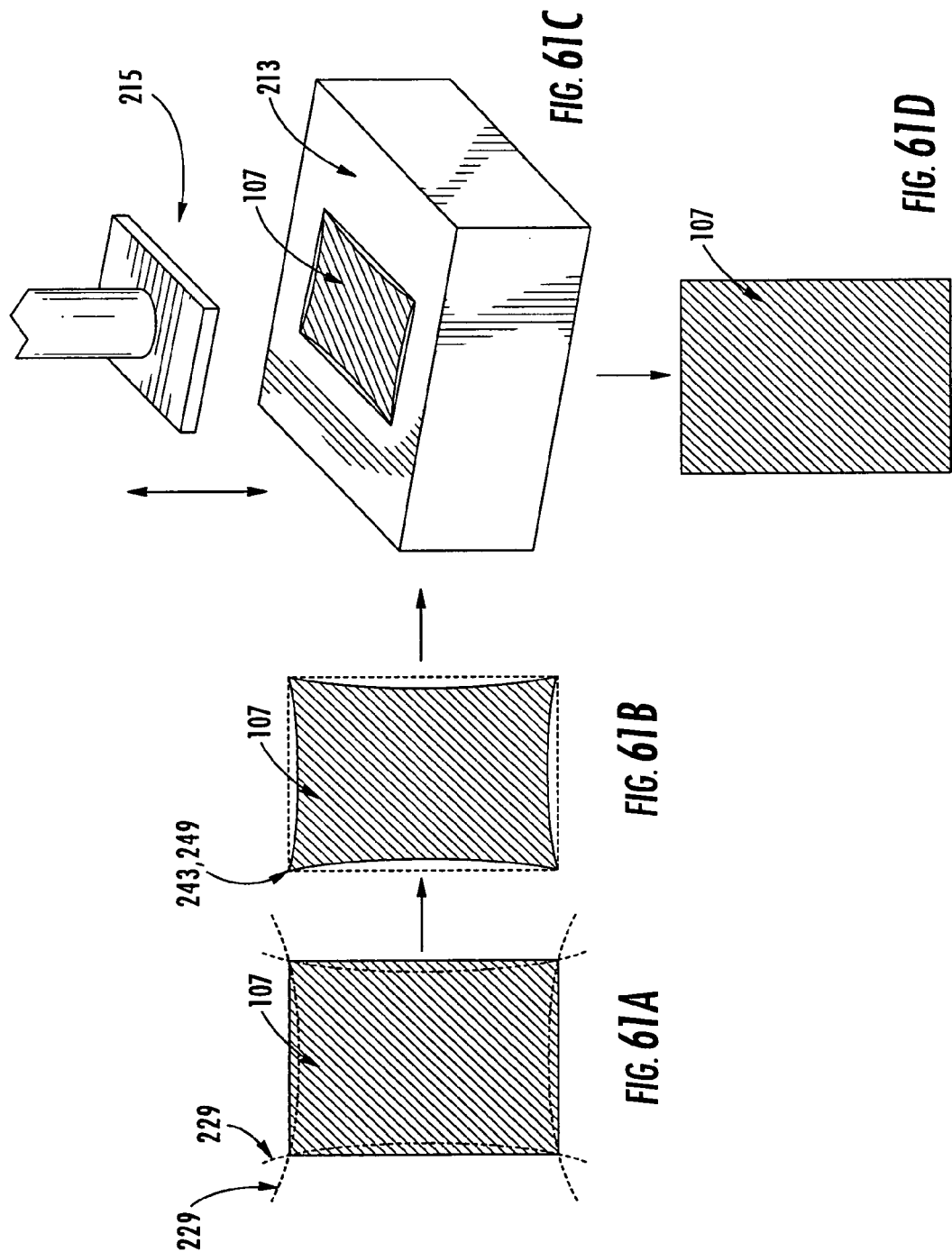
FIG. 61*a* is a schematic top plan view of a rectangular blank meant to have giveaway material reduced therefrom along a plurality of side edges according to a preferred embodiment of the present invention.
FIG. 61*b* is another top plan view of the blank shown in FIG. 61*a*, after giveaway material has been removed therefrom.
FIG. 61*c* is a perspective view of the blank shown in FIG. 61*b*, being inserted a schematic representation of a collar and clamp assembly used for striking, with original portions or corners of the rectangular blank being in an abutment relationship within the collar for preventing jumping of the blank during striking according to a preferred embodiment of the present invention.
FIG. 61*d* is another top plan view of the blank shown in FIG. 61*c*, after it has been struck into a finished mint product by the collar and clamp assembly according to a preferred embodiment of the present invention.
Figure 62:
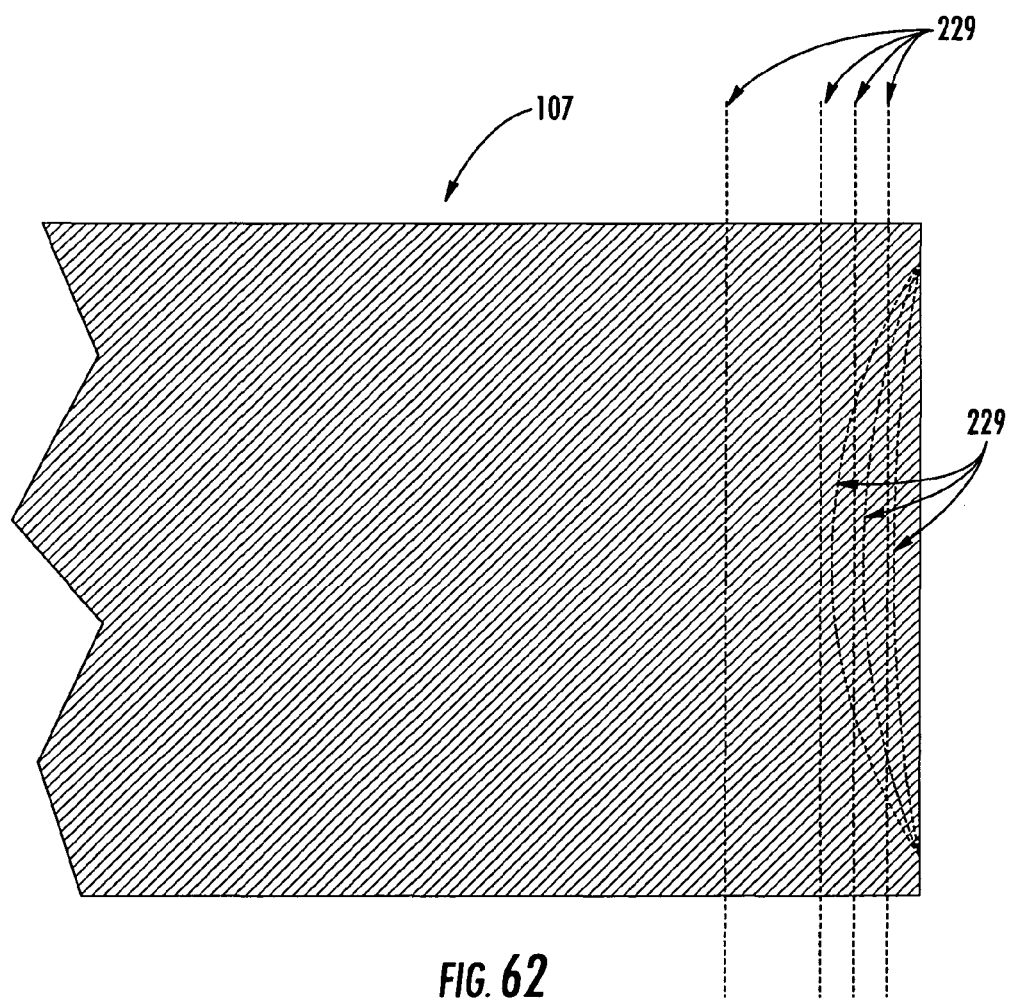
FIG. 62 is a partial schematic representation of a mint product about which different cutting profiles are illustrated according to preferred embodiments of the present invention.

In the case of the 1-ozt silver round coins manufactured by the Applicant, the blanks generally have an overall "circular" shape, as better shown in FIG. 33A, 59a or 60a, although various suitable shapes may be used according to the present invention, as exemplified in FIGS. 33B-33J, and as can be easily understood by a person skilled in the art.

Figure 34:
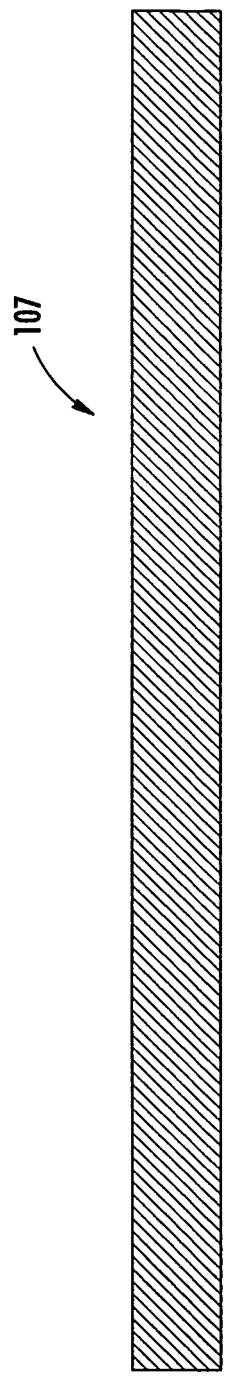
FIGS. 34-36 show cross-sectional views of different types of mint products with different types of rims meant to be processed with a machine or a method for reducing giveaway material according to a preferred embodiment of the present invention.
Figure 35:
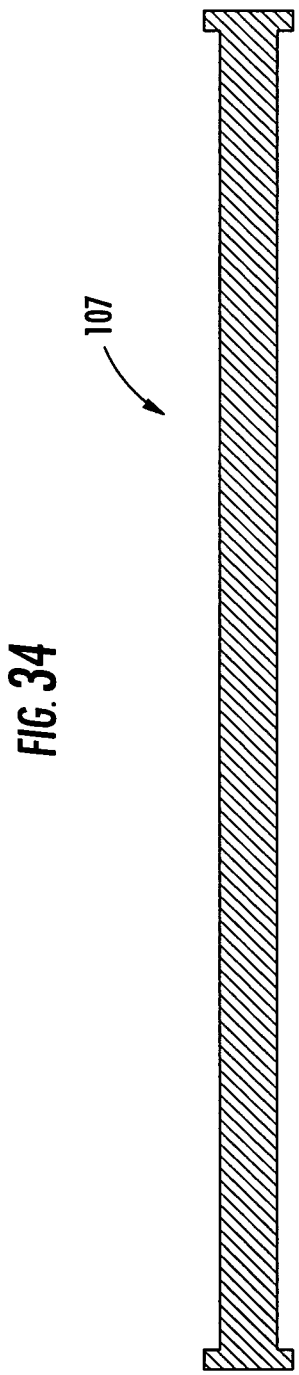
Figure 36:
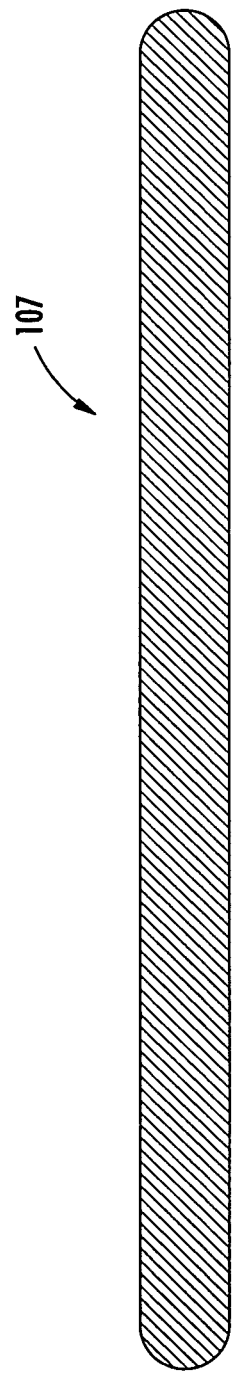
Figure 37:
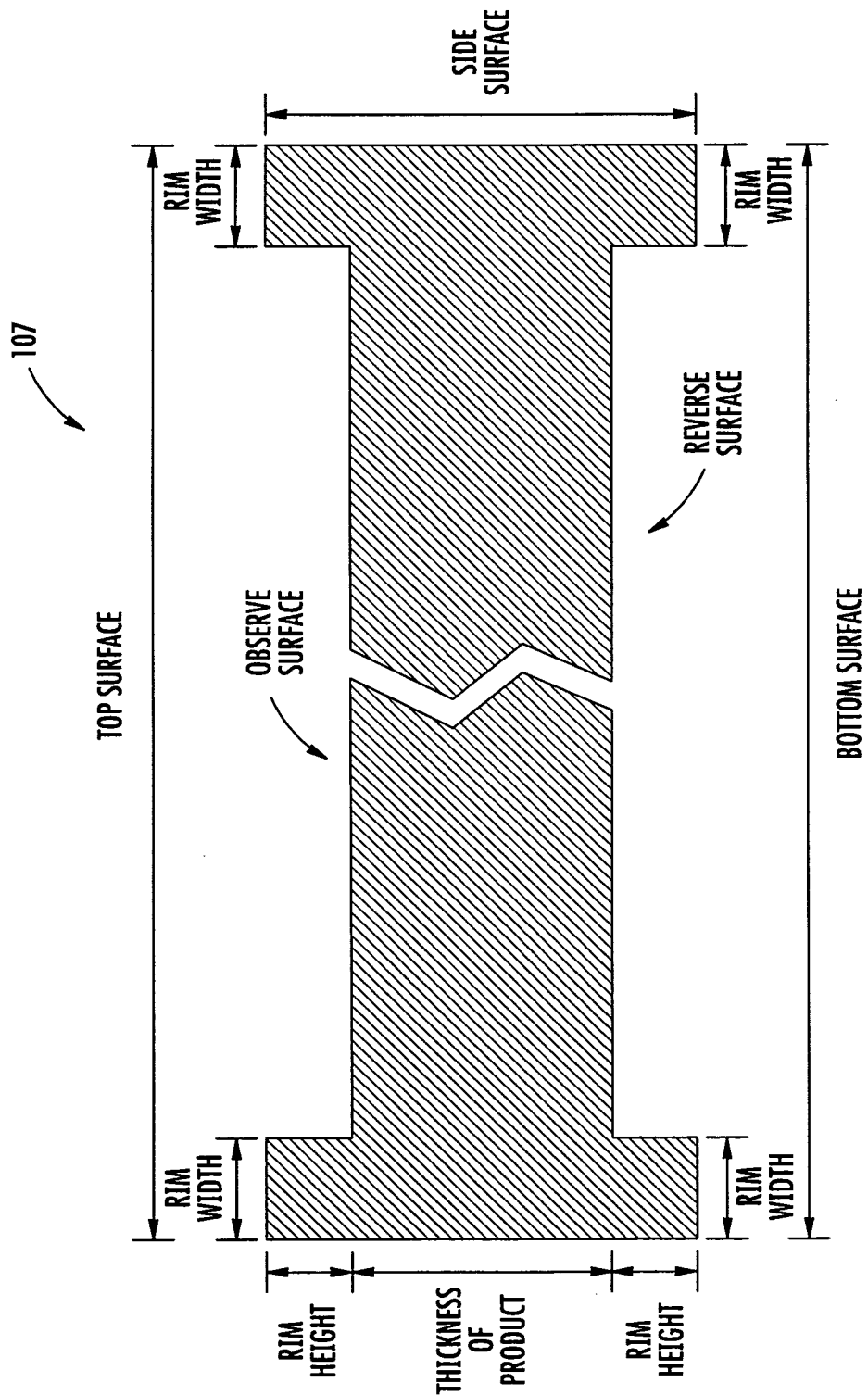
FIG. 37 is a schematic representation of a cross-sectional view of a mint product to be processed with a machine or a method for reducing giveaway material therefrom according to a preferred embodiment of the present invention.

A rim (203) may then be produced on each of the blanks about its peripheral edge, by typically compressing the diameter, the rim (203) being preferably intended to avoid that the obverse and reverse surfaces (205,207) of the resulting coin from being scratched (for example, in subsequent steps of the manufacturing process, etc.). It is worth mentioning that the mint product (107) according to the present invention need not be provided with rims (203), as exemplified in FIGS. 34, 36 and 65, and as can also be easily understood by a person skilled in the art.

The products (107) (in our example, round or "circular" silver blanks) may then be pre-washed or "wash-to-anneal" ($1^{st}$ burnishing). For example, the blanks may be subject to a liquid mixture of small ball bearings or pellets, cleaning agent(s) (such as soap, for example) and water in an attempt to remove as much impurities as possible, removing sharp edges, and to provide the blanks with desirable visual features, such as "shininess".

After that, another annealing process usually follows.

A "burnish-to-strike" ($2^{nd}$ burnishing) may take place afterwards, and typically, after this step, products are generally manipulated by workers with gloves and about the peripheral side edges (209) of each product so as to avoid that any oily residues from hands may adversely effect results in subsequent steps, such as in the striking step, for example, given that this type of step is very sensitive to impurities, and the presence of such unwanted impurities may greatly affect in an adverse manner the resulting quality of the product.

The blanks having gone through the processes are eventually struck during a striking process, which may be a "single strike" or a "double strike", as will be explained in greater detail hereinbelow.

Extensive studies and tests carried by the Applicant to determine an optimal location within the process for giveaway material recovery have shown that there were considerable losses of material per product (107) in some of the steps of the overall manufacturing process. For example, in the case of a 1-oz silver round coin, there was from about 2.5 mg to about 5 mg of material loss per product (107) in each of the burnishing processes, this material loss being washed away by the liquid mixture. It is important to note that material loss can be, and usually is, recuperated via an appropriate process.

Given the inconsistent and somewhat unpredictable nature of this material loss during the burnishing process, one cannot determine with certainty how much material per product (107) is actually being lost, whether it is close to about 2.5 mg or closer to about 5 mg. Further adding to uncertainty in the overall manufacturing process, depending on a deteriorated state of the liquid mixture used for burnishing and/or other factors, a given worker being unsatisfied with the visual aspect (for example, the "shininess") of the blanks being processed may decide to pass them though the same burnishing cycle once again, which would furthermore contribute to another undeterminable loss of material per product (107) (that is, one can easily understand that the total loss from 2 cycles would amount to approximately from about 5 mg to about 10 mg per product (107)).

As mentioned earlier, and as will be explained in greater detail hereinbelow, the giveaway recovery method according to the present invention can be used as an "option" at different locations on a conventional multi-step manufacturing process, without substantially disrupting the layout or the nature of the existing manufacturing process being used.

Indeed, if one wants to remove and recuperate material, so as to avoid giving millions of dollars away in excess precious metals that have been being given away until now, the present giveaway recovery method can be easily and conveniently incorporated between two standard steps of a conventional process of manufacturing a mint product (107), without having to substantially modify the sequence or equipment of the overall process. In fact, as will also be explained in greater detail hereinbelow, the present giveaway reducing method could ultimately be used after the striking step as well. Although the example of a 1-ozt silver round coin has been given when referring to FIG. 24, a person skilled in the art will understand that the above-mentioned advantages of the present invention can be applied to various other different types of mint products (107), or to various other types of products (107) manufactured, distributed or commercialized by other entities, such as furnishers, refiners, smelters and the like.

Extensive studies and tests carried by the Applicant have also shown that an ideal location for removing giveaway material is just before the striking process of mint product (107) (ex. blank), because, following the striking step, there is generally, at this point in time, no more loss of material, and the striking step is a convenient way of masking or concealing any giveaway material having been removed previously from the product (107) according to a preferred aspect of the present invention, especially in cases where the visual appearance of the resulting product (107) may be important.

Indeed, in the case of numismatic products, which are generally purchased for their beauty, the quality of the field of a coin, that is, the quality of the observe and reverse sides or surfaces (205,207), are generally sought out by collectors. In the case of bullion investments products, they are generally purchased for their weight (and thus, value), and only for their weight, given that purchasers of such bullion investments products will usually rely on fluctuations of the value of precious metals for transactional and/or investment purposes. Thus, visual appearance of bullion investment products is not as crucial. However, some owners of bullion investments will use them as collection pieces, that is, as numismatic products, and as a result, visual appearance, particularly of their observe and reverse sides (205,207), is increasingly become more important.

Striking is a step within the overall process manufacturing of a mint product (107) where effigy (211) is placed or marked onto the product (107). Typically, the piece is inserted into the die (213), and the upper press (215) or clamp strikes down onto the piece so as to create the effigy (211) on the observe and/or reverses sides (205,207), where the effigy (211) can be an engraving and/or an embossment, as can be easily understood when referring to FIGS. 25-30.

The present invention is particularly advantageous in that it works for both "single struck" and "double struck" pieces. Single striking allows for a greater output of products (107), but double striking technically allows for products (107) of greater quality, in terms of surface finish, etc. Double striking is typically used for numismatic products because striking the product twice enables the material to flow even more within the die (213), and thus also in turns enables the effigy (211) to have a richer and fuller "body" (i.e. more "relief", etc.). Double striking could also be used for some bullion investment products, where, as mentioned earlier, the quality of the surface finish may also be sought after.

Figure 38:
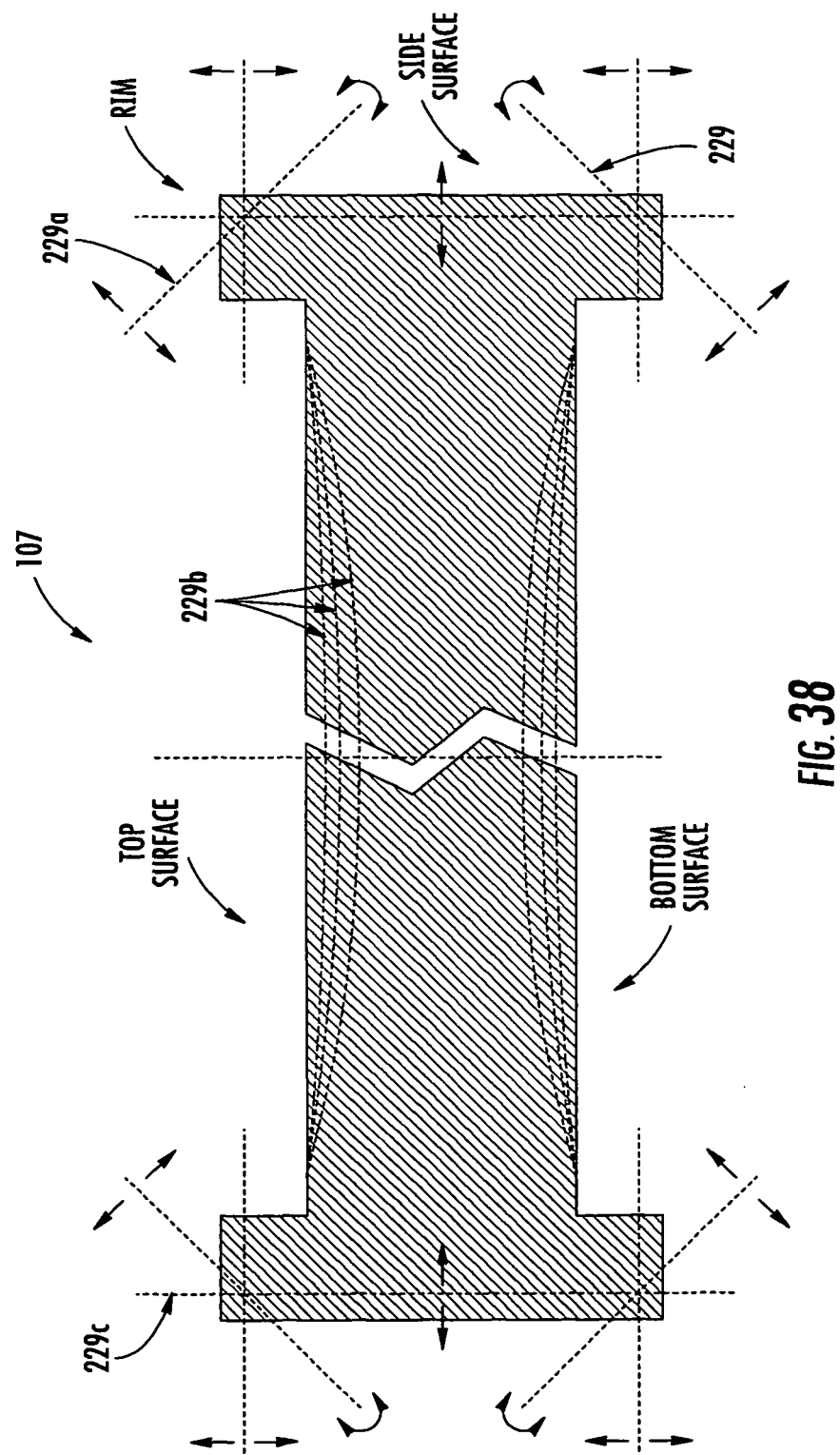
FIG. 38 is another schematic cross-sectional view of what is shown in FIG. 37, further illustrating different surfaces, profiles and other considerations that may be used in removing giveaway material from at least one surface or portion of said mint product according to preferred embodiments of the present invention.
Figure 65:
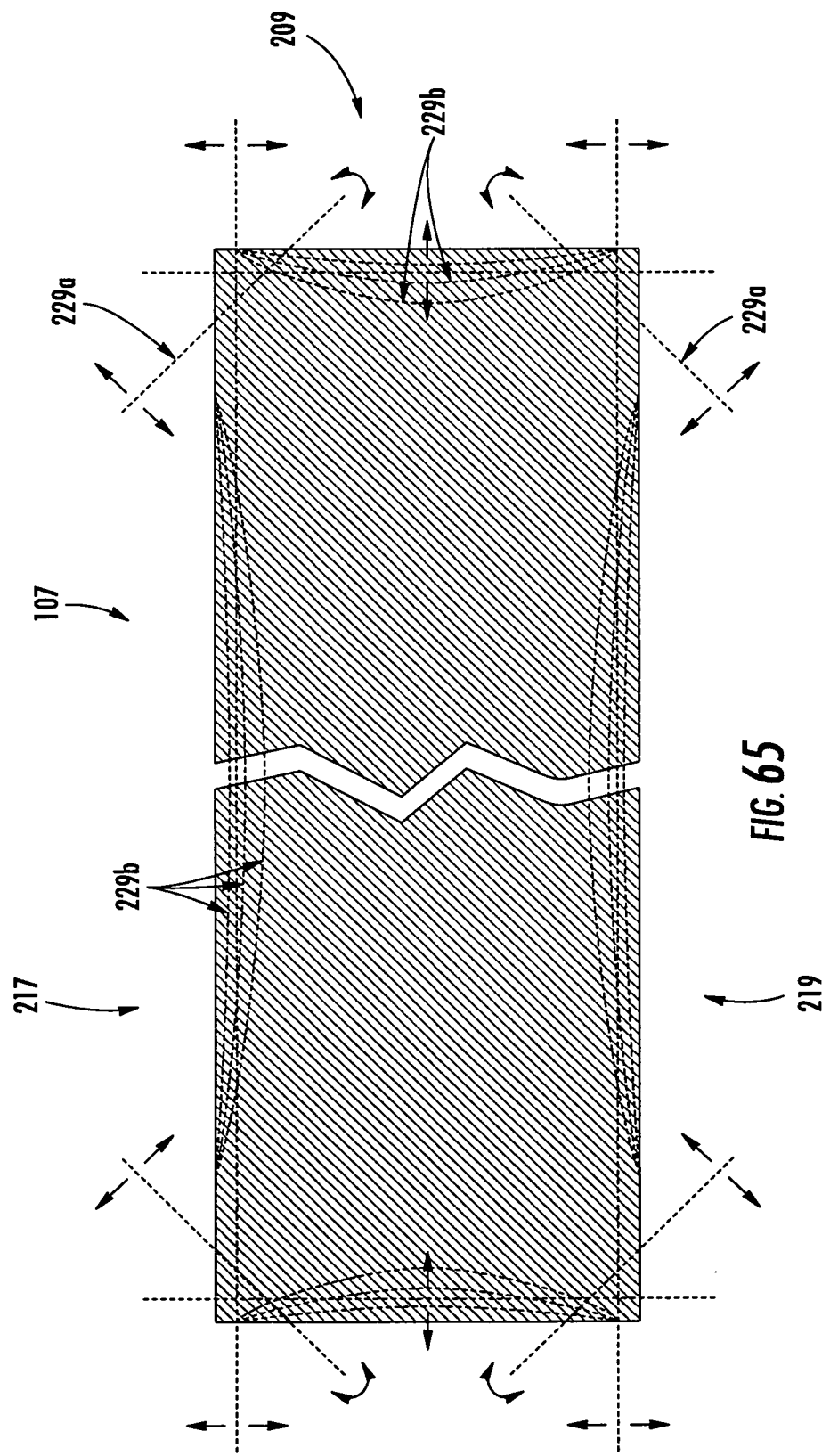
FIG. 65 is a schematic representation of a cross-sectional view of a mint product deprived of rims and to be processed with a machine or a method for reducing giveaway material therefrom, exemplifying different surfaces, profiles and other considerations that may be used in removing giveaway material from at least one surface or portion of said mint product according to preferred embodiments of the present invention.
Figure 66:
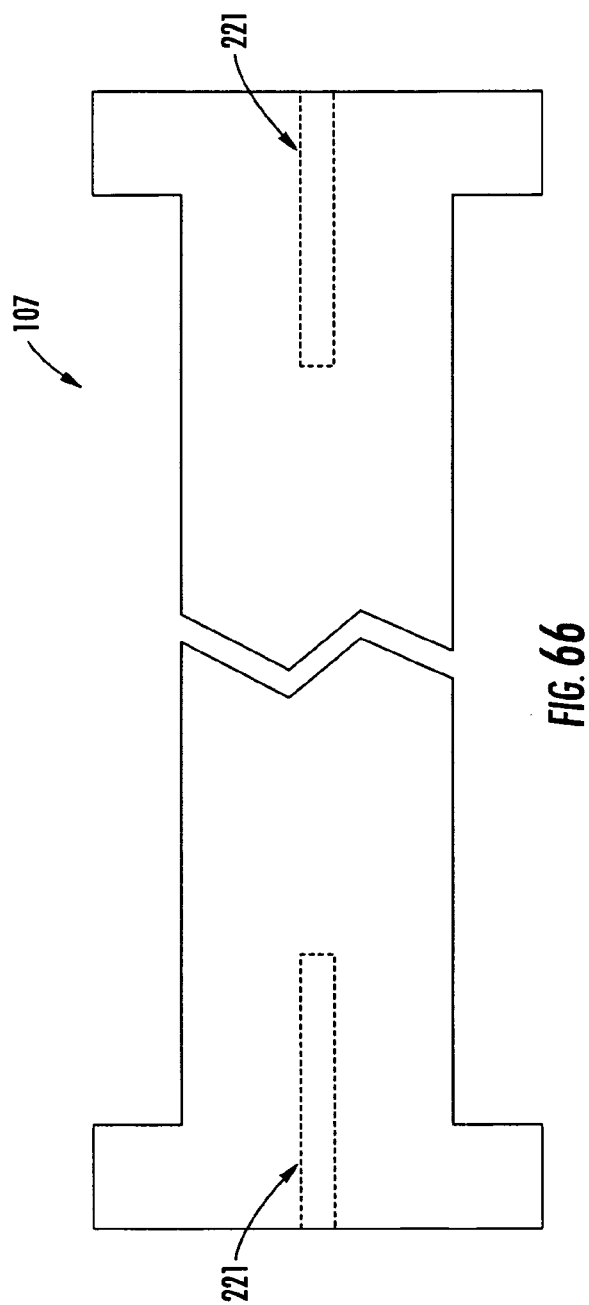
FIG. 66 is a schematic representation of a cross-sectional view of a mint product shown with a side surface having been processed with a system or a method for reducing giveaway material therefrom using at least one radial hole or bore according to a preferred embodiment of the present invention.
Figure 67:
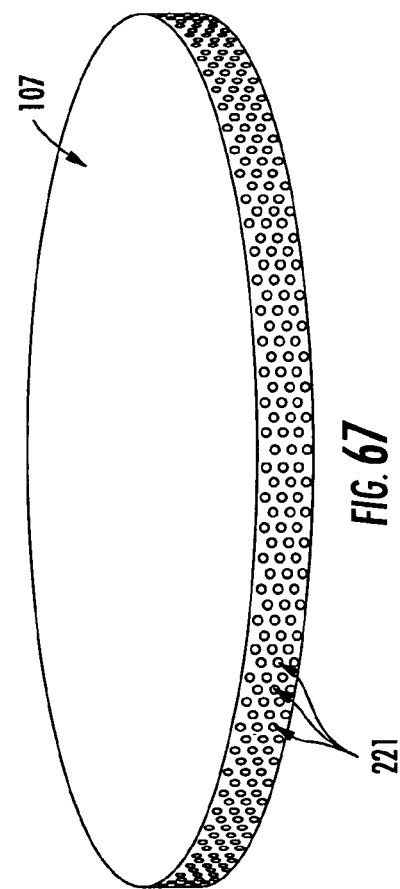
FIG. 67 is a perspective view of a mint product shown with a side surface having been processed with a system or a method for reducing giveaway material therefrom using a plurality of radial hole or bore according to a preferred embodiment of the present invention.
Figure 68A:
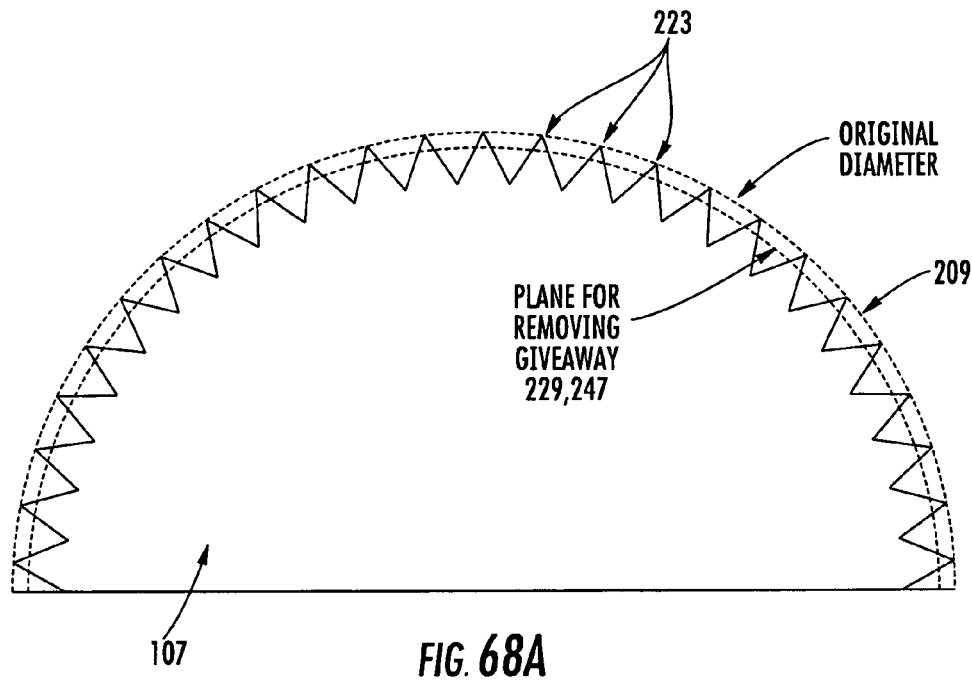
FIG. 68*a* is a partial schematic representation of a top plan view of a mint product provided with serrations and meant to have giveaway material reduced therefrom along a circular vertical plane or circumference according to a preferred embodiment of the present invention.
Figure 68B:
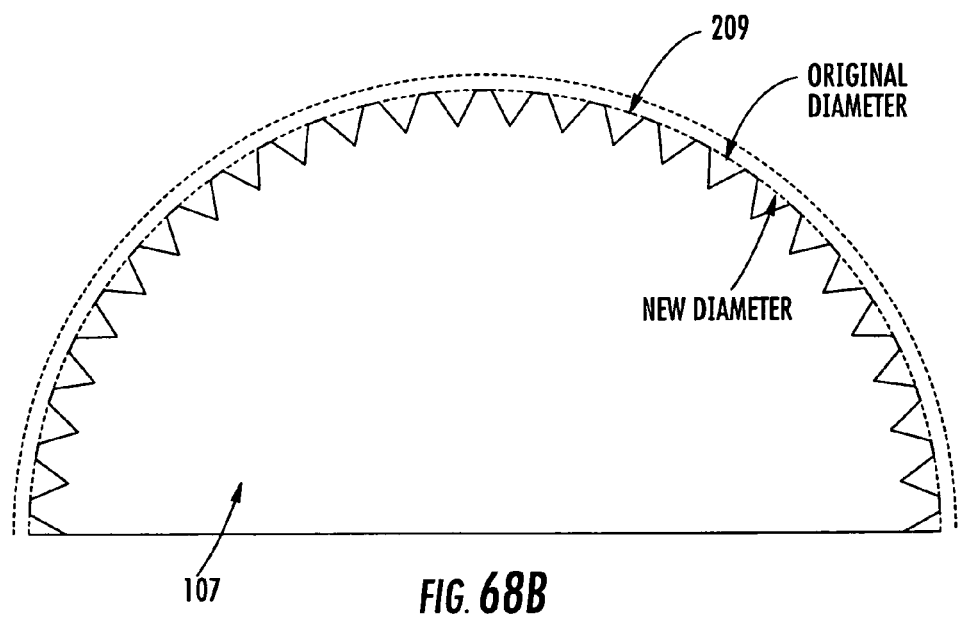
FIG. 68*b* is another top plan view of the blank shown in FIG. 68*a*, after giveaway material has been removed therefrom, and where a new reference diameter or side surface is defined as a result of the giveaway material having been removed.

Furthermore, and according to another aspect of the present invention, the choice of location for removal of giveaway material on a given product (107) to be processed can be varied, as can be easily understood by a person skilled in the art from referring to the accompanying drawings, namely FIGS. 38 and 65. Amongst the various possibilities, there is the top surface (217), bottom surface (219), side surface(s) (209), rim(s) (203) and/or other suitable locations or portions of a given mint product (107), and the approach about which the material removal is carried out can be a straight one, or a slanted approach, with a straight profile, a curvilinear profile, a radial profile and/or along various different types of profiles and manners, as can be easily understood by a person skilled in the art when referring to FIGS. 59-68, for example. When referring to examples illustrated in FIGS. 50-54, one can also appreciate that there might be even more alternatives as to how to remove giveaway material from a given mint product (107), using various different other ways, such as radial holes (221), removal of material between serrations (223) of a given coin, reducing rim height, etc.

Extensive tests and experiences carried out by the Applicant on struck pieces and un-struck pieces have shown that for the most part, it is difficult to remove giveaway material without leaving a mark on the product (107) because: a) there is always some type of discoloration; b) the resulting product (107) is not as shinny, and as a result, is incapable of attaining a desirable end visual effect; c) there is a dullness to the resulting product (107); d) it is incapable of impregnating material and allowing it to flow/fill in appropriately during different manufacturing processing steps; e) etc.

Thus, several of the above-mentioned concerns are also addressed by preferred embodiments of the present invention, as will be explained in greater detail hereinbelow.

Indeed, in addition to the machine (103) having been described earlier when referring to FIGS. 1-23, there is also provided a method of reducing giveaway material on mint products (107).

More particularly, according to a preferred aspect of the present invention, there is provided a method of reducing giveaway material from a plurality of mint products (107) each having different physical parameters, the method comprising the steps of: a) evaluating at least one physical parameter of a given mint product (107) to be processed; b) comparing said at least one physical parameter of the mint product (107) to be processed with a minimum threshold physical parameter in order to determine an attainable range of giveaway material to be removed; c) projecting a targeted amount of giveaway material to be removed from the mint product (107) to be processed depending on, or as a function of, the attainable range of giveaway material; and d) removing the targeted amount of giveaway material via at least one surface of the mint product (107).

It is worth mentioning that a main object of the present invention is to reduce as much as possible the amount of giveaway material on a given product (107) to be processed, and that this amount is generally evaluated in terms of weight. However, there are various manners in which to calculate a targeted amount of given weight of giveaway material to be removed, and as a result, the at least one physical parameter evaluated in step a) is not necessarily limited to "weight" per se, but may be any other type of physical parameters to be used, individually or in combination with others, to establish features of the mint product (107) to be processed, and in order be able to compare them with minimal threshold physical parameter(s), in order to enable to determine the attainable range of giveaway material to be removed, the best manner in which to reduce and/or remove a targeted amount of giveaway material, and other considerations. As way of an example, instead of just evaluating weight as a physical parameter in step a), one could ultimately evaluate the volume of the mint product (107) to be processed, and using an appropriate density, which could be pre-established or that could also be evaluated in step a), would be able to determine the initial weight of the mint product (107) to be processed. Alternatively, if one knows that all the given mint products to be processed by the present invention have a substantially same "average" weight, then there is no need to explicitly evaluate said at least one parameter of the mint products (107) to be processed, and at least one other physical parameter of the mint products (107) may be evaluated in step a), if deemed appropriate, such as "hardness" for example, in order to establish the best possible operating parameter to be used afterwards during the processing of the mint product (107) in order to optimally remove the targeted amount of the giveaway material therefrom, etc., as can be easily understood by a person skilled in the art.

It is worth mentioning also that although according to a preferred embodiment of the present invention, the method of reducing giveaway material can be intended to individually and sequentially evaluate each of the mint products (107) to be processed, this method may be simplified or reduced to approximate steps, in that, for example, one not need to evaluate each physical parameter of each mint product (107) to be processed, in that, one could ultimately carry out the present invention based on 3D models or approximations (using empirical data, averages, etc.). For example, instead of individually weighing each mint product (107) to be processed, which could correspond to a given embodiment of step a), such step a) could be simplified to simply assign an average weight (or other average parameter value) to a given batch of mint products (107) to be processed. Furthermore, instead of comparing the weight (or other parameter value) of each mint product (107) to be processed with a minimum threshold physical parameter in order to determine an attainable range of giveaway material to be removed, according to another simplified version of the present invention, one can simply rely on an average weight of a given batch of mint products (107), and compare said average weight with a desirable weight to be obtained, so as to calculate the targeted amount of giveaway materials to be removed as prescribed in step c), as can be easily understood by a person skilled in the art.

Another variation of the present invention could also to not explicitly carry out step c), in that, one may decide to simply pass mint products (107) to be processed according to the present invention through an evaluation step to see how they compare with respect to a minimum threshold physical parameter, and then directly have them proceed to a processing assembly (111) of the machine (103) so as to remove an approximate targeted amount of material via at least one surface of each mint product (107), after which, such mint products (107) having been processed in a first stage, would be reevaluated to see how they compare with respect to said minimum threshold physical parameter to be respected, and depending on the result, another "loop" of processing (i.e. giveaway material reduction) could take place. Thus, a person skilled in the art would also understand that step c) is not a "hard" step of individually calculating, but could also translate into simply approximately or nominally determining, assigning, aiming or projecting the targeted amount of giveaway material to be removed from each product (107) to be processed, whether it be in response to the evaluation of at least one physical parameter of said mint product (107), or based on at least one physical parameter having been approximated or pre-established based on an evaluation of a plurality of mint products (107), or other factors.

Referring to the embodiment explained earlier when referring to the machine (103) illustrated in FIGS. 1-23, and according to a preferred embodiment of the present invention, given that it is meant to be a very sophisticated way of precisely, repeatedly and systematically removing giveaway material from each of the mint products (107) being evaluated, on a personalized or individual basis, step a) preferably comprises the step of assigning an identifying tag (ex. label, number, etc.) to each one of the plurality of mint products (107) to be processed, and further comprises the step of individually evaluating at least one physical parameter of each one of said mint products (107) to be processed. Thus, according to the present invention, one can potentially individually evaluate each mint product (107) to be processed, and track down and monitor specifically and individually an exact amount of giveaway material removed from each one of these mint products (107) being processed.

As explained earlier, when referring to the machine, step b) may comprise the step of rejecting a mint product (107) if the at least one physical parameter of said mint product (107) is below the minimum threshold physical parameter. For example, if evaluating at least one physical parameter of a mint product (107) to be processed consists in evaluating the initial weight of the mint product (107) before it is even processed, then if the weight of such mint product (107) is below the minimum physical threshold physical value that is being sought, such as the minimal legal trade weight for said mint product (107), then the mint product (107) is simply rejected so that it may be reutilized in an appropriate manner (for example, it may be re-melted, so as to be reused again under at least a minimal appropriate weight, etc.).

When referring to the operation of the machine (103), it was mentioned that in order to be very precise in the amount of targeted giveaway material being removed from each mint product (107), the system (101) preferably included a visual recognition of the surface (i.e. outer body) of each piece to be processed, and as a result, according to the a preferred embodiment of the present invention, step c) comprises the step of scanning the mint product (107) to be processed so as to recreate a geometrical profile thereof, or at the very least, to obtain visual information from the product (107) that can be used for processing thereof. As can be easily understood by a person skilled in the art, there are various ways of scanning the mint product (107) to be processed so as to recreate a geometrical profile or to obtain a visual representation thereof. According to the embodiment explained earlier before, scanning of the mint product (107) to be processed is done by relatively rotating the mint product (107) with respect to a scanner (145), and preferably, it is the mint product (107) that is rotated with respect to the scanner (145) for obtaining a dimensional representation of said product (107), but depending on the particular applications and end results for which the present system (101) could be used, it is worth mentioning that other types of assemblies can be employed appropriately. For example, one could image that step c) would be carried out in a context where the mint product (107) to be processed by the present invention would be conveyed through a scanning assembly (145), and that the mint product (107) would be fixed with respect to the scanning assembly (145) which could be fixed or not. Therefore, it can be easily understood that a relative movement between the mint product (107) to be scanned and the scanning assembly (145) may not be required so as to obtain an appropriate visual information from said product (107) to be processed according to the present invention.

Figure 40:
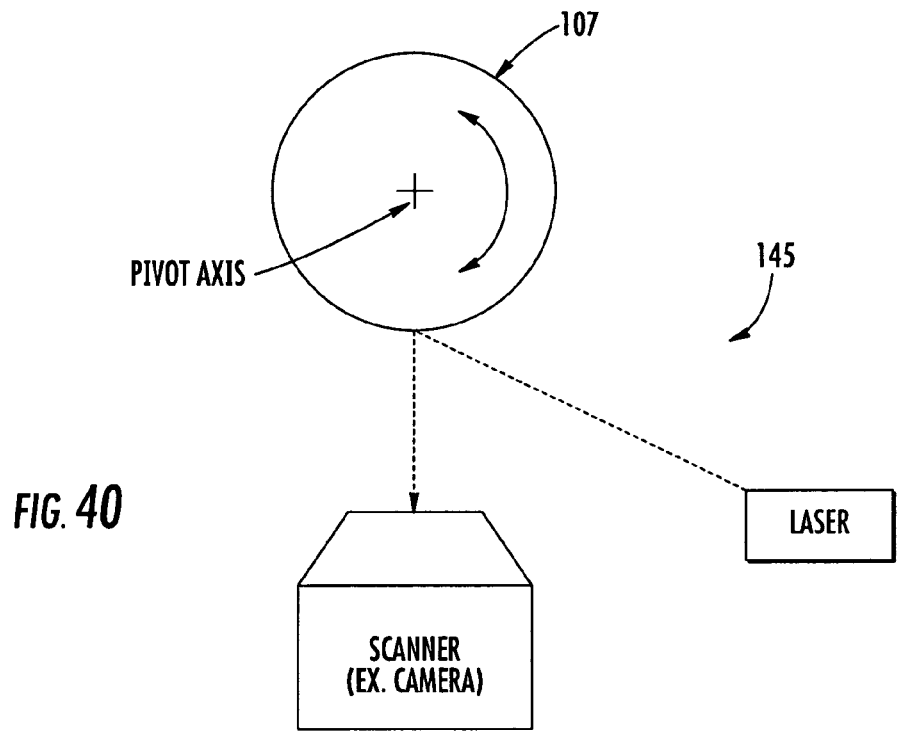
FIG. 40 is a schematic representation of a scanning assembly of a system for reducing giveaway material according to a preferred embodiment of the present invention.

However, according to the preferred embodiment explained earlier with reference to the machine (103), scanning of the mint product (107) to be processed is preferably done by relatively rotating the mint product (107) with respect to a scanner (145), as can be easily understood when referring to FIGS. 40 and 41, for example. One of the main advantages of proceeding as such, is that, advantageously, the present system (101) and method combine the scanning of the mint product (107) and the processing thereof (for example, cutting or removing of excess giveaway material) at a same given location, which is beneficial for attaining high outputs of processed mint products (107), in that less time is wasted compared to if the mint product (107) was first scanned in a first given location of the system (101), and then displaced in order to be processed or machined in another physical location of the system (101), etc.

As exemplified in FIGS. 40 and 41, scanning of the mint product (107) to be processed is done by rotating the mint product (107) with respect to a pivot axis (225). According to a preferred embodiment of the present invention, the mint product (107) to be scanned is preferably centered or positioned with respect to a fixed point (141) of reference line (139), but in the event of the mint product (107) being uncentered, preferably scanning of the mint product (107) is carried out in order to take into account such misalignment or uncentering. Indeed, a person skilled in the art will understand that there are various ways of appropriately recreating a dimensional representation of the mint product (107), and compensating for any deviations that may result from the positioning of the mint product (107) or from the equipment being used for scanning.

According to one way of carrying out step c) of the present invention, especially if a scanning of the mint product (107) has been used for a visual recognition thereof, the step c) preferably comprises the step of geometrically calculating the targeted amount of giveaway material to be removed. Namely, based on the initial weight of the mint product (107) having been evaluated in step a) for example, and a volumetric or geometric scanning of the product (107), one can determine the amount, which in this case will take the form of volume, of giveaway material to be removed from the mint product (107) to be processed.

Because equipments being used to take measures always have a certain margin of error, step c) preferably comprises the step of taking into account a tolerance from the process or equipment used in step d) to ensure that the at least one physical parameter of the mint product (107) still exceeds the minimum threshold physical parameter after giveaway material has been removed from said mint product (107). For example, if one always wants 31.109 grams as a minimal value on the final product (107), and taking into account that the tolerance of the process of reducing giveaway material is about +/−20 mg, this translates into a minimal value that could be targeted of about 31.129 mg, which, as a preventive measure, could be rounded off to about 31.130 mg. Alternatively, it is worth mentioning that one may decide not to take into account a given tolerance of the process, and the method could be simply reduced to a) removing giveaway material from a plurality of mint products (107), and then simply b) evaluating said processed mint products (107) to see which ones are above the minimum threshold, in which case, these processed pieces could be "accepted" (or reprocessed a little bit more, via another passage, if desired, etc.), and to see which ones are below the minimum threshold, in which case these processed pieces could be "rejected".

As can be easily understood, the targeted amount of giveaway material to be removed in step d) will be generally proportional to the attainable range of giveaway material determined in step b), especially if one wants to "maximize" the amount of giveaway material to be reduced/removed from what is possible on each mint product (107) to be processed. However, and once again, as explained earlier, different modifications or simplifications can be made to the present system (101) or method without departing from the scope of the present invention, which ultimately resides in reducing giveaway material from a given mint product (107), in that, one could decide to only remove a "fixed" amount of giveaway material from each mint product (107) to be processed, irrespectively of the attainable range of giveaway material to be removed in each one of said mint products (107).

Removal of giveaway material of the mint product (107) to be processed can be carried out in many ways, but according to a preferred embodiment of the present invention, removal of giveaway material in step d) is done by displacing the mint product (107) with respect to a processing tool (227) along at least one degree of motion, whether it be a rotational component, an x-y-z component, a radial component, etc., as can be easily understood by a person skilled in the art.

When referring to FIGS. 40 and 41, it can also be understood that according to a preferred embodiment of the present invention, removal of giveaway material in step d) is done by relatively displacing the mint product (107) to be processed vertically with respect to a processing tool (227), and preferably also, removal of giveaway material in step d) is done by relatively rotating the mint product (107) to be processed with respect to the processing tool (227). This has been found to be a very fast and simple, and thus very efficient way of removing giveaway material individually from each mint product (107) to be processed, given that according to a preferred embodiment of the present invention, a single cutting tool (151) is used as a processing tool (227), and this very same cutting tool (151) could be used for carrying out different cutting profiles thanks to at least two degrees/ranges of motion of the mint product (107), namely a vertical displacement ($1^{st}$ degree or range of motion) of the mint product (107) to be processed, while said mint product (107) is being rotated ($2^{nd}$ degree or range of motion). As way of a mere example for illustrative purposes only, when processing a mint product (107) made of silver for a 1-ozt coin using the machine (103) of the present invention, the mint product (107) to be processed is rotated at a rate of about 3500 rpm. It is worth mentioning that the present system (101) can also offer a $3^{rd}$ degree or range of motion, in that, according to a preferred embodiment of the machine (103), the cutting tool (151) is meant to move forwards and backwards, therefore, there is a linear displacement of the cutting tool (151), as can be easily understood when referring to FIGS. 39 and 41.

An important advantage of the present invention is that it enables for adaptability in various ways of removing giveaway material from different portions or parts of various different types of mint products (107) to be processed, and as a result, one way of removing giveaway material in step d) could be done using at least one cutting profile (229) selected from a predetermined said of cutting profiles (229) which would cover a wide array of practically all different possibilities that would be required for certain given applications to be intended with the present system (101) or method according to the present invention. As mentioned before, the present system (101) and method according to the present invention could be simplified, and ultimately, one could decide to have one single cutting profile (229) to be used on all mint products (107) of a given batch to be processed with a system (101) or with the method. Indeed, the present method could ultimately be simplified to the following two (2) steps: a) conveying a plurality of mints products to be processed; and b) processing at least one given mint product at a time, so as to remove an amount of giveaway material from each one of the mint products.

However, because according to a preferred aspect of the present invention, the present system and method provide for a very precise, systematic and repeatable manner, of removing giveaway material on products (107) to be processed, and more particularly, based on individually evaluating and processing said products (107), removal of giveaway material in step d) is preferably done using at least one cutting profile (229) selected depending on an amount of giveaway material to be removed, and more particularly, and preferably also, depending on an amount of giveaway material to be removed on the particular mint product (107) to be processed, after it has been individually evaluated. Furthermore, it is worth mentioning that the different cutting profiles (229) being selected in response to the particularities of a given mint product (107) to be processed may be carried out with a single cutting tool (151), or with a plurality of different cutting tools (151) selected based on the array of different cutting profiles (229) provided by the system. However, as can be easily understood by a person skilled in the art, there are advantages in terms of simplicity, efficiency and other factors, of using one single cutting tool (151) configured for cutting out different cutting profiles (229) that would cover a wide array of different cutting needs, depending on the different ranges of material to be removed on a particularly given mint product (107).

Based on extensive tests carried out by the Applicant, it has been determined that a chamfer cutting profile (229*a*) may be used when there is a given range (ex. "minimal" range) of amount of giveaway material to be removed from the mint product (107) to be processed. For example, when referring once again to our example of a 1-oz silver coin, a chamfer cutting profile (229*a*) could be used when there is a range of about 0-100 mg to be removed from each mint product (107) to be processed, this chamfer cutting profile (229*a*) being illustrated for example in FIGS. 38 and 65.

A curvilinear cutting profile (229*b*) may be advantageously used when there is another given range (ex. "intermediate" range) of amount of giveaway material to be removed from the mint product (107) to be processed. For example, referring once again to our illustrative case of a 1-oz silver coin, the curvilinear cutting profile (229*b*) is very useful when having to remove about 100-300 mg from each mint product (107) to be processed.

A radial-component reducing cutting profile (229*c*) or flat-edging can also be used when the amount of giveaway material to be removed exceeds a given range (i.e. "maximum" range) of amount of giveaway material to be removed from the mint product (107) to be processed. Once again, in our example of a 1-oz silver circular coin, this type of cutting profile (229) is particularly useful when having to remove about 300 mg or more.

It is worth mentioning that in the case of a circular mint product (107), such a blank for example, as used in our illustrative case of a 1-oz silver round coin, and according to a preferred embodiment of the present machine (103), the step of radial-component reducing cutting profile (229*c*) or flat-edging, could correspond to an advance of the cutting tool (151) of about 0.05 mm for example, which would correspond to the removal of about 175 mg, thereby creating a new reference surface (209) to work with, as can be easily understood by a person skilled in the art.

Furthermore, it is worth mentioning also in our example illustrated in FIGS. 38 and 65, chamfering might take a little bit longer to execute, because when a single cutting tool (151) is being used (see for example FIG. 41), it as to do two passes (top and bottom), whereas in the case of a curvilinear cutting profile (229b), the tool (151) just has to do one pass (going in and coming out while the mint product is being rotated), therefore, in terms of cadence, the curvilinear and radial-component reducing cutting profiles (229b,229c) might be more advantageous than the chamfering one, for certain applications.

As a result, it can be easily understood that the use of a curvilinear cutting profile (229b) is preferably used to cover both cases ("minimal" range of about 0-100 mg, and "intermediate" range of about 100-300 mg). Indeed, for removing material within the smaller range (ex. about 0-100 mg), the machine (103) is intended to advance of just a few microns, while removing giveaway material about a wide span (231) of the surface to be processed, and can remove quantities as little as about 30 mg.

Furthermore, the advantage of removing giveaway material along a very wide span (231) of the surface to be processed is that one does not need to going in as deeply into the product (107) for a given amount of material as with a narrower span (231), and the angle of attack or slope on entry point and exit point is not as abrupt, thereby contributing to a better overall visual finish (less likelihood of marks on the final product (107) after striking).

Figure 63:
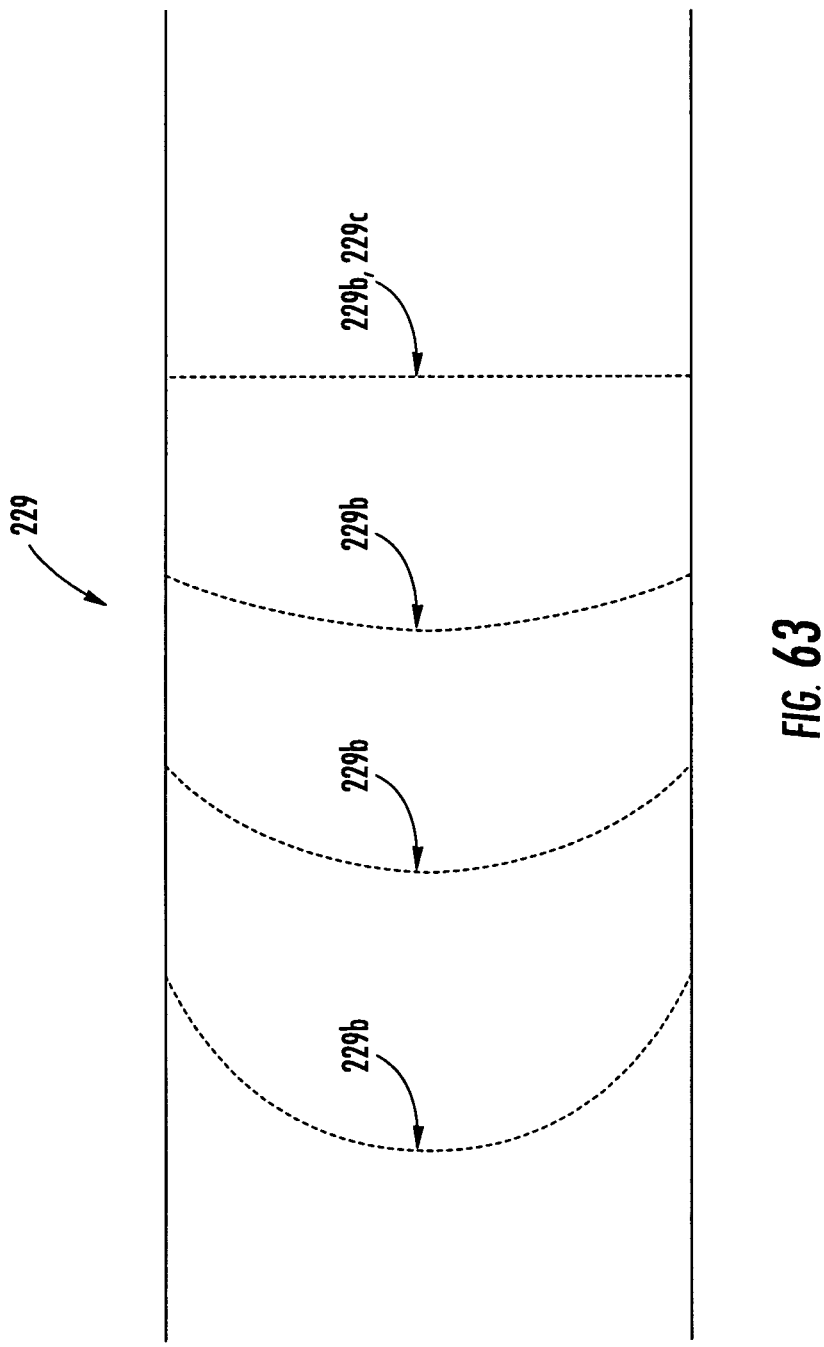
FIG. 63 is a schematic representation of different curvilinear profiles shown between a pair of parallel planes, including a subset or limit of the range where one of the curvilinear profiles is straight.
Figure 64:
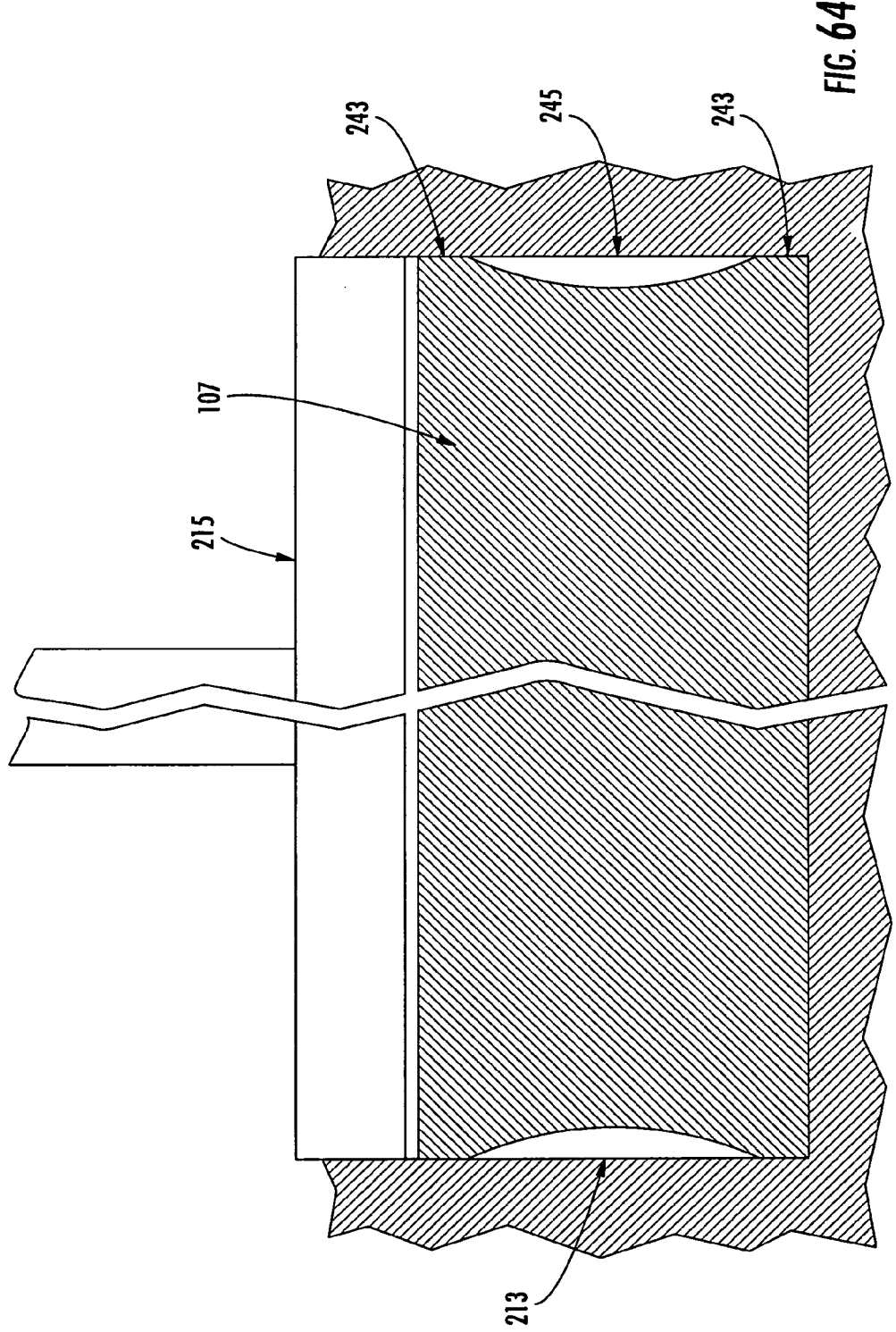
FIG. 64 is a schematic representation of a press about to strike a mint product inserted within a collar, the mint product being shown with a side surface having been processed with a system or a method for reducing giveaway material therefrom, and with remaining top and bottom portions of the side surface in abutment relationship against an inner wall of the collar according to a preferred embodiment of the present invention.

Moreover, it can also be easily understood that the use of a single cutting tool (151) can be advantageously be used for cover all three ranges (minimum, intermediate and maximum ranges), in that, a radial-component reducing or flat-edging cutting profile (229c) can simply be a special case of a curvilinear cutting profile (229b) where said curvilinear cutting profile is "straight", and introduced radially inwardly into the mint product (107) to be processed, as apparent to a person skilled in the art when referring to FIG. 63.

It is worth mentioning once again that the present system (101) or method for reducing giveaway material is not necessarily limited to "circular" mint products (107), and that is why the term "radial-component reducing cutting profile (229c)" has been used instead of a "diameter-reducing cutting profile", because ultimately various other types of suitable forms instead of just circular, such as rectangular shapes, for example, in the case of wafers or bars, could also be processed according to the present invention in which case, a radial-component cutting profile (229c) would be used to reduce an outer edge or portion of such mint product (107). Indeed, one can imagine the use of a router bit, for example.

Figure 39:
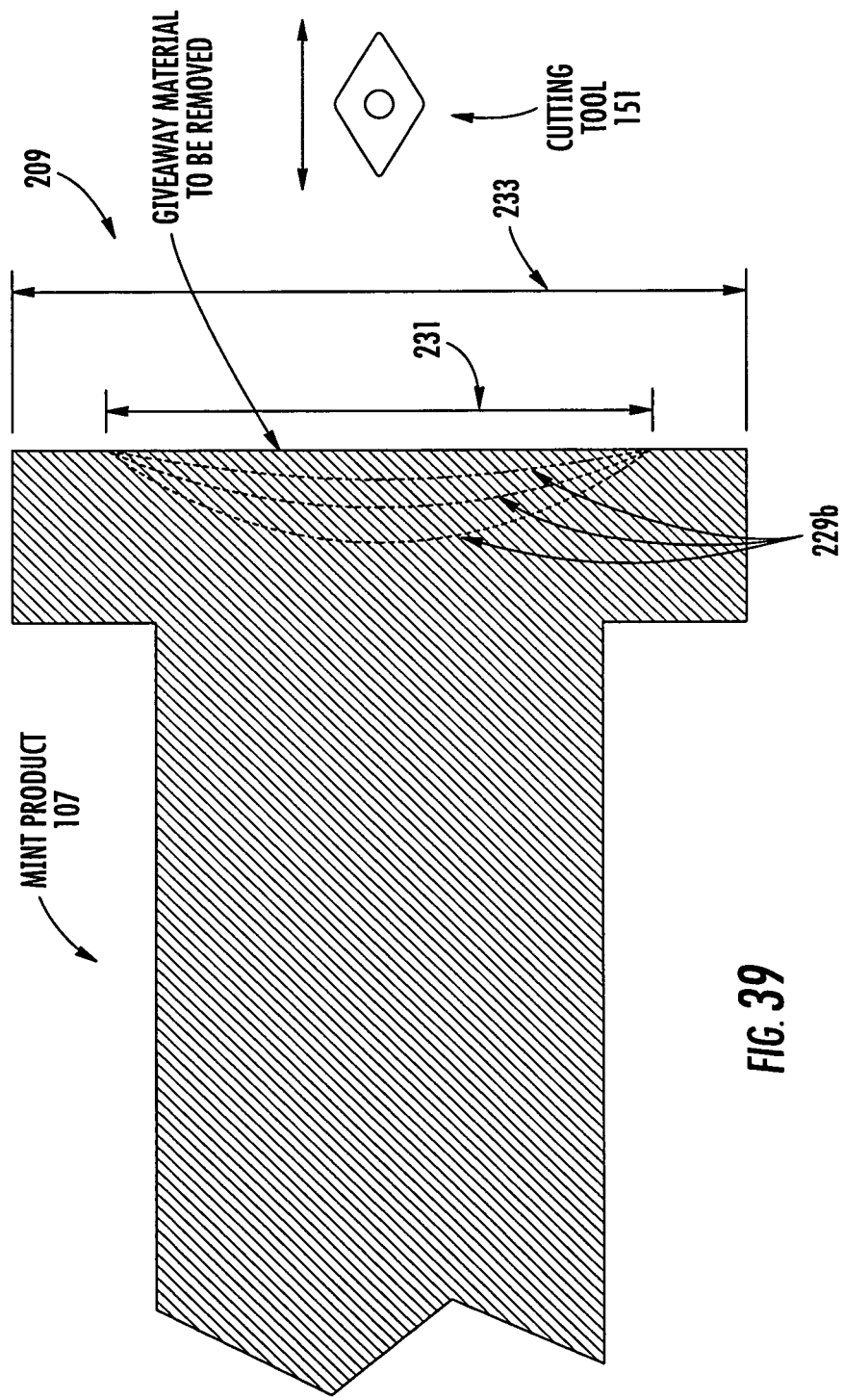
FIG. 39 is an enlarged schematic cross-sectional view of a portion of a mint product provided with rims and to be processed with a system or a method for reducing giveaway material according to a preferred embodiment of the present invention, illustrating different curvilinear profiles that may be used with a given cutting tool to remove giveaway material from a side surface of the mint product according to a preferred embodiment of the present invention.

As can be easily understood when referring to FIGS. 38 and 39, for example, removal of giveaway material in step d) is done within a proportion of a full extent (233) of the least one surface of the mint product (107) where giveaway material is removed from. The surface about which the giveaway material is to be removed can be any suitable surfaces or portions of the mint products (107), depending on the particular application for which the mint product (107) is intended for, and the desired end results. Given that an object of the present invention is also to ensure that removal of giveaway material on the resulting product (107) of said processed mint product (107) is practically unnoticeable, or at the very least, satisfies a given criteria of a visual quality assurance, it has been found that the side surface is an ideal surface (209) for removal of giveaway material, as exemplified in FIG. 39, given that according to a preferred embodiment of the present invention, an ideal location for removing giveaway material within the manufacturing process of a given mint product (107) is just before the striking step, because, following the striking step, there is generally no further loss of material, and the striking step is a convenient way of masking or concealing any giveaway material having been removed from the product (107) according to the present invention.

Preferably, the above-mentioned proportion is at least about 60% of the full extent (233) of the least one surface of the mint product (107) where giveaway material is removed from. However, it is worth mentioning that for best results, in terms of quality of "finish" of the end mint product (107), such as "shininess", for example, and other desirable effects, it is best when the proportion is at least about 90% of the full extent (233) of the least one surface of the mint product (107) where giveaway material is removed from, and for even better results, it is preferable that the proportion be between about 90% and about 95% of the full extent (233) of the least one surface of the mint product (107) where giveaway material is to be removed from.

A narrow span (231) of material removal is more likely to be noticeable on the final product (107), and other extensive studies and tests carried out by the Applicant have shown that it is best if material removal is done over the largest span (231) possible of a given surface (ex. around 95% of full extent span (233)). Indeed, one should strive to maximize the span (231) of the surface over which giveaway material is removed.

So preferably, according to one aspect of the present invention, there are two main parameters to be considered when proceeding to removal of giveaway material about at least one surface of a mint product (107) to be processed, namely: a) span (231) of surface about which giveaway material is removed, and b) amount of material to be removed.

According to a preferred embodiment, the percentage of span (231) with respect to the full extent (233) of the surface is kept a fixed parameter (for example, about 95% of a side surface in the case of a 1-oz silver round coin), and the amount of giveaway material (depth, profile of material removal, etc.) is the variable parameter and is removed as a function of the first parameter and other considerations.

Namely, for obtaining optimal results, in terms of percentage of giveaway material recovery and quality of processed/finished products, it is not only necessary to determine how much giveaway material to be removed, and where on the mint product (107) to remove it from, and at which step within the manufacturing process of the mint product (107), but also, in the manner which the giveaway material is to be removed. And preferably, removal of giveaway material in step d) is done in accordance with at least one operating parameter, having been selected based on the particular applications for which the present invention is intended for, and the desired results.

Preferably, the at least one operating parameter is selected depending on at least one physical parameter of the mint product (107) to be processed, which could be the same as that or those evaluated in step a) of the method according to the present invention, or based on at least one other physical parameter of the mint product (107) to be processed, such as for example, weight, dimension, geometric profile, type of material, purity of material, material density and material hardness of the mint product (107) to be processed, for example, as can be easily understood by a person skilled in the art. Indeed, as way of an example, it can be easily understood that smaller products (107) are probably not processed or machined at the same operating parameters as compared to bigger products (107), even though the remaining physical parameters of the mint products (107) might be the same (same type of material, same type of hardness, etc.). Similarly, different natures of materials often require to be processed and machined along different operating parameters. For example, when compared to silver, gold is a very soft material, which reacts greatly, which is harder to machine, and which tends to stick on equipment when hot after having been cut, etc.

Among the different operating parameters that could be considered when removing giveaway material from a given mint product (107) to be processed, if removal of said giveaway material is done via a cutting tool (151) for example, then a main operating parameter to be considered is the cutting feed rate to be used. As can be easily understood when referring to FIGS. 38 and 41, and as better exemplified in FIGS. 43 and 44, a preferred embodiment of a cutting tool (151), particularly used for our example of a 1-oz silver round coin, is a carbide cutting tool (151) having a rounded cutting tip (235), the rounded cutting tip (235) having a radius of about 0.02 mm which enables very precise and versatile cutting profiles (229). In our example, given for illustrative purposes only, that is, when referring to the machine (103) for reducing the giveaway material according to the present invention being used on a 1-oz silver round coin, for example, the cutting feed is between about 0.04 mm and about 0.12 mm per rotation of the mint product (107) to be processed.

In addition to the incredible results of the surface finish after striking, the use of this type of such a carbide cutting tool (151) is advantageous in that it is a very inexpensive tool and does not introduce any other elements that may harmful to chemistry of the material (e.g. silver, in the example described herein) of the mint product (107) to be processed. Therefore, it is a very good compromise in terms of durability, performance and cost.

Given that the targeted amount of the giveaway material removed from the mint product (107) in step d) is meant to take on the form of shavings, which can be easily recuperated for reprocessing, the cutting tool (151) according to a preferred embodiment of the present invention is also provided with a chip-breaker (237), similar to a "pelican's beak", for cutting the shavings in lengths of a predetermined length, such as about 0.5-1 inch, for example, so as to avoid accumulation and/or forming of nests of shavings within the machine (103) which is undesirable for obvious reasons.

Once again, various other suitable types of different processing tools (227), or cutting tools (151) in the case where the giveaway material to be removed is done mechanically, via an appropriate machining tool or process, could be used for the present invention, depending on the particular applications for which it is intended, and the desired results on the mint products (107) to be processed.

Similarly, it is worth mentioning that there may be other various ways of removing giveaway material according to the present invention, and as way of example, removal of giveaway material in step d) could be done by a process selected from the group consisting of polishing, brushing, grinding, machining, milling, drilling, chemical etching, using a laser, etc. Once again, various other suitable ways of removing giveaway material from a mint product (107) to be processed according to the present invention could be used, as can be easily understood by a person skilled in the art, and furthermore, the giveaway material need not to be limited to be removed in a form of shavings, but it could also be removed in the form of dusts, particles, fumes, liquid extracts, or any other suitable forms, as also apparent to a person skilled in the art.

Indeed, chemical processes (ex. insertion into acid baths, and passing an electric current therethrough so as to grind away material from the surface product being subject to such process) could also be ultimately used but they tend to be very complex, messy and environmentally unfriendly (harmful chemicals used, difficult to manipulate, etc.). Furthermore, this type of process is not as fast, easy, reliable, repeatable and advantageous as the embodiments described herein.

According to a preferred embodiment of the present invention, and as better exemplified in FIGS. 47 and 48, for instance, when contrasted to FIG. 46, removal of giveaway material in step d) is preferably done so as to leave a non-polished surface on the least one surface of the mint product (107) where giveaway material is removed from. Preferably, removal of giveaway material in step d) is done so as to leave a plurality of surface grooves (239) on the least one surface of the mint product (107) where giveaway material is removed from. Indeed, contrary to what one intuitively assume as being the best way of removing giveaway material from a mint product (107) to be processed, for example, from a side thereof, using a highly polished tool, so as to have to a highly polished (for example, "mirror like") and smooth surface, and in turn, hope to have the best surface finish after striking for example, it has been found that removal of giveaway material should be done so as to leave a plurality of surface grooves (239) with corresponding peaks (241) on the at least one surface of the mint product (107) where giveaway material is removed from, because this is the best way of ensuring that the serrations (223) of the product (107), in the case for example where the mint product (107) is struck within a serrated die (213) or collar, are properly filled out and that the resulting finished product (107) is provided with a proper visual finish, such as shininess, for example. This way of removing giveaway material has also found to provide excellent results on mint products (107) that are not provided with serrations (223), that is, for mint products (107) that are struck within a plain die (213) or collar.

Another disadvantage of attempting to achieve highly polished (for example mirror-like) and smooth surfaces is that cutting tools (151), such as diamonds and the like, will often be required for such work, which translates into very expensive equipment, and which is thus undesirable, for obvious reasons.

Thus, contrary to what one would normally expect, it has been found by the Applicant that the use of a tool deprived of a very fine or sharp tip (235), and operated at an approximate feeding rate, so as to leave surface grooves (239) defining corresponding material peaks (241), provide for the best resulting end products (107) when removal of giveaway material is done before the striking process.

Indeed, when striking the product (107), the fact that it is provided with material peaks (241) resulting from the surface grooves (239) enables to better fill material within the collar (213), for better visual end results. Namely, an unassisted eye (i.e. without the use of a microscope, etc.) cannot generally tell that there have been several grooves (239) or notches made previously on the product (107) for removing giveaway material. Furthermore, when the surface grooves (239) are very tight together, as exemplified in FIG. 47, this might adversely affect the brightness of the treated surface material after striking, whereas as exemplified in FIG. 48, if the surface grooves are substantially "separated", over the entire span or extent of the surface, or the greatest range thereof being possible, it provides for a more much shinny result (light projected thereon is advantageously reflected, etc.).

As explained earlier, removal of giveaway material in step d) can be done via at least one surface (portion, edge, rim, etc.) of the mint product (107) to be processed, and different types of surfaces (portions, edges, rims, etc.) may be selected, such as for example, a top surface (217), a bottom surface (219), a side surface (209), a rim (203) of the mint product (107) to be processed, or any other suitable surfaces or portions thereof. However, according to a preferred embodiment of the present invention, the targeted amount of giveaway material to be removed in step d) is removed from a side surface (209) disposed between opposite obverse and reverse surfaces (205,207) of the mint product (107) to be processed. Indeed, as can be easily understood when referring to FIGS. 34-48, the mint product to be process is generally a substantially solid mint product, having top and bottom surfaces (217,219), and a side surface (209) extending therebetween. The mint product (107) may also comprise at least one rim (203) (see different examples illustrated in FIGS. 45a-45f), and in such a case, typically comprises top and bottom rims (203a,203b). As explained earlier, the mint product to be processed by the present invention can take on various different overall geometrical shapes, in that it can be round, polygonal, triangular, rectangular, square, pentagonal, hexagonal, heptagonal and octagonal for example, as exemplified in FIGS. 33A-33J, but it may also take on various other non-symmetrical shapes, and very different "unusual" shapes, in that, as is well known in the art, numismatic products can take the forms of animals, plants, and various other types of objects, whether 3D, or to a certain extent, could be considered as two-dimensional, in that if the thickness of the main product (107) is substantially "negligible" with respect to a top surface area, for example. It is worth mentioning also that the system (101) and method according to the present invention may be used to process each of these different types of mint products (107), in which case, the components of the machine (103), or the steps of the method, could be easily altered or adjusted to accommodate these different types of mint products (107).

Moreover, it is mentioning that when proceeding to giveaway material recovery on a given mint product (107), particularly just before a striking step, it is advantageous to keep within the product (107) to be processed an untouched original portion (243) of the diameter (or of the peripheral edge in the case of an "non-circular" product (107)), so that during the striking step for example, this original and untouched outer (i.e. peripheral) portion (243) of the product (107) enables it to be properly positioned and secured within the collar (213), as can be easily understood when referring to FIGS. 59, 60, 61 and 64, where top and bottom peripheral contact portions (243a,243b) of the processed mint product (107) (corresponding, for example, to about 5% of the full extent of the side surface (209)) would abut against an inner wall (245) of the collar (213), so as to avoid jumping of the product (107) during the striking step. Alternately, if giveaway material is removed along vertical planes, as shown in FIG. 60a for example, then it would be preferable that resulting apexes and/or outer peripheral segments/portions (241) of the processed product (107) be in an abutment relationship with the collar (213) for preventing jumping of the product (107), as can be easily understood by a person skilled in the art when referring to FIGS. 60b-60d.

As mentioned earlier, a preferred embodiment of removing the targeted amount of giveaway material from the mint product (107) in step d) takes on the form of shavings, which can be easily recuperated and reprocessed, but it is worth mentioning that also, according to the present invention, the giveaway material of the mint product (107) to be done can be removed in various different other suitable forms, such as dusts, fumes, liquids (for example, if giveaway material is melted away from the product (107)), etc., as can be easily understood by a person skilled in the art.

In the case where removal of giveaway material in step d) is done using an abrasive assembly (251), for example, the machine (103) or method could be slightly altered to ensure that the mint product (107) to be processed is brought to and maintained with respect to the abrasive assembly (251), in order to appropriately remove the targeted amount of giveaway material, via at least one portion of said mint product (107). Once again, it is important to remember that the mint product is not limited to a circular shape, but may take on various other suitable shapes (ex. rectangular, etc.) as explained earlier, and as can be easily understood by a person skilled in the art.

Preferably, the giveaway material removed from the mint product (107) in step d) complies with a given criteria of quality assurance in terms of visual appearance on the final mint product having been processed. Indeed, an object of the present invention, at least as imposed by the Applicant, was to not only enable the reducing and recovering of giveaway material from products (107) made of solid precious metals, but also to ensure that the removal of the giveaway on the resulting products (107) of said processed mint products (107) was practically unnoticeable, or at the very least, would satisfy a given criteria of visual qualify assurance.

Preferably, step d) is carried out in a controlled confined environment in order to prevent loss of giveaway material from said environment, and preferably also, the method further comprises the step of e) recuperating giveaway material having been removed in step d). Preferably also, step e) is carried out in a controlled confined environment in order to prevent loss of giveaway material from said environment. In its simplest form, the step e) of recuperating giveaway material having been removed in step d) is done by allowing the giveaway material having been removed to fall within a desired location via gravity, so as to subsequently recuperate said giveaway material having been removed. However, as explained earlier, it is worth mentioning that step e) could also include the step of sucking giveaway material having been removed in step d) with a suction assembly (189), and step e) could also include the step of filtering giveaway material having been removed in step d) with a filtering assembly (253).

According to another aspect of the present invention, there could be also provided a looping feature to the system (101) or method of reducing giveaway material in that the method could further comprise the steps of re-evaluating said at least one physical parameter of the mint product (107) (i.e. another step a)); and repeating either one of the subsequent steps (step b, c or d) if the mint product (107) still contains an amount of giveaway material that is outside a predetermined range of allowable tolerances.

As can be understood, the present system (101) or method of reducing giveaway material according to the present invention can be done on finished mint products, or can be carried out on intermediate mint products (107) not having yet been finished, and according to a preferred embodiment of the present invention, as exemplified in FIG. 24, the system (101) or method is incorporated into a manufacturing process, and the mint product (107) on which giveaway material is removed and recovered is a "blank", preferably before the striking step, although material removal could ultimately be done on a blank at other suitable location(s) within the manufacturing process, as also exemplified in FIG. 24. As a result, depending on the nature of the mint product to be processed, the system and method could be altered or adjusted accordingly. For example, in the case where the mint product is a "blank", prior to being provided with a mark, step a) could comprise the steps i) providing a blank; and ii) evaluating at least one physical parameter of the blank.

Preferably, step i) could comprise the step of providing a plurality of blanks, and step ii) could comprise the step of evaluation at least one physical parameter of each blank on an individual basis, as mentioned earlier when referring to the operation of the machine (103). Step b) could comprise the step of rejecting a blank if the at least one physical parameter of said mint product (107) is below the minimum threshold physical parameter, and similarly to what was discussed earlier, the at least one physical parameter of step a) could be selected from the group consisting of weight, dimension, geometric profile, type of material, purity of material, material density and material hardness of the mint product (107) to be processed, and/or other criteria, as can be easily understood by a person skilled in the art.

As mentioned earlier, the percentage of giveaway material is higher with respect to smaller products (107) (ex. less than about 100 ozt), then with respect to bigger products (107). As a result, the present invention is particularly advantageous when used with mint products (107) weighing less than about 101 ozt, such as 100 ozt for example, 1 kg, 10 oz, 5 oz, 2 oz, or 1 oz, for example. The present invention could also be used on mint products (107) that are even smaller than the above-mentioned examples given. Thus, the minimum threshold physical parameter according to a preferred embodiment of the present invention is preferably less than about 101 troy ounces (ozt). In the case of an 1-ozt, for example, the minimum threshold physical parameter is about 31.1034768 grams. However, it is also worth mentioning that although the percentage of giveaway material tends to be smaller within bigger products (107) (known in the art are products weighing 400 oz, for example, etc.), the principles of the present invention (i.e. "giveaway material reduction") could still be used on such big products, in which case, components and parameters of the system (101) and/or the method could me modified, simplified, altered, omitted and/or interchanged accordingly, as apparent to a person skilled in the art. For example, conveyor belts, scales, etc. being used would be made more robust, etc.

As a result, it can be easily understood that the minimal threshold physical parameter may be very different depending on the particular applications for which the present invention is intended for, and the different types of objects or materials used therewith. For example, reverting back to our example of a 1-oz round coin, the minimum threshold physical parameter is at least about 31.1066 grams when the mint product (107) to be processed is made of silver having a purity of about 99.99%, whereas, the minimum threshold physical parameter is about 31.1346 grams when the mint product (107) to be processed is made of silver having a purity of about 99.9%, and the minimum threshold physical parameter is about 33.9298 grams when the mint product (107) to be processed is made of 22-carat gold.

As explained earlier, the present system (101) or method of reducing giveaway material can be used on various types of different mint products (107), whether they be finished mint products (107), or intermediate products (107) thereof, such as for example, a bullion product, an investment product, a numismatic product, a circulation product, a medal product, a medallion product, a bar product, an ingot product, and a token product. As explained earlier, the mint product (107) could also be a "blank", that is, an intermediate product (107) used in the overall manufacturing process of a mint product (107), irrespectively of whether it is circular or not. Furthermore, the present invention is not limited to "mint products" (107) per se, but could be use on any other types of products (107) made of solid precious metals, where giveaway material is to be reduced/removed and advantageously recovered. As a result, the present invention could also be used on certain types of products (107), such as coins used for recreational purposes and the like, for example, where the product (107) need not be made of a solid precious metal, etc., as can be easily understood by a person skilled in the art.

However, according to a preferred and advantageous embodiment of the present invention, the mint product (107) is a final end product (107) having been processed by a method according to the present invention, so as to obtain a bullion investment product, which contains or is made of a precious metal, and generally, such mint product (107) is made of solid precious metals selected from the group consisting of gold, silver, platinum and palladium, although other types of precious metals (ex. rhodium, iridium, osmium, rhenium, ruthenium, etc.), and various other types of different forms (ex. sponge-like, powder-like, etc.), could also be processed with the present invention.

According to a preferred aspect of the present invention, the method is an automated method carried out via a corresponding machine (103) or process, such as the one exemplified in FIGS. 1-23, and preferably, this automated method processes a given output of products per minute, such output being adjustable by selectively adjusting corresponding parameters of the machine (103) or process.

As mentioned earlier, the present system (101) or method of giveaway material recovery can be used as an optional and/or complementary feature, on a conventional multi-step manufacturing process, without substantially disrupting the layout or the nature of the existing manufacturing process being used, and can be introduced at different locations within the manufacturing process. For example, the method of reducing giveaway material could be carried out between a blanking step and a rimming step of the multi-step process of the manufacturing the mint product (107). The present method could also be carried out between a rimming step and a burnishing step. The present method could also be carried out between a burnishing step and an annealing step. The present method could be carried out between an annealing step and a burnishing step. According to a most preferred embodiment of the present invention, the method of reducing giveaway material is carried out just before a striking step of the multi-step of process of manufacturing the mint product (107), such as between a second burnishing and a striking step, for example, as exemplified in FIG. 24. As explained earlier, carrying out a giveaway material recovery according to the present invention just before a striking step is advantageous in that following the striking step, there is generally no loss of material, and the striking step is a convenient way of masking or concealing any giveaway material having been removed from the product (107) according to the present invention, for an optimal surface finish of the mint product (107).

It is worth mentioning however that a user of the present invention may decide to apply the present invention at other locations or stages of a manufacturing/processing process, for different reasons, and that the use of a method of giveaway material is not limited to just before a striking step, as can also be easily understood by a person skilled in the art.

It is worth mentioning also that one can play with the hardness of the product (107) (ex. blank) during the annealing process, so as to have a harder or a softer product (107), and that there are advantages and disadvantages to each one of them.

For example, when a product material is "hard" (for example, about 56 Rockwell), the product tends to be more visually appealing, and is less likely to be subject to have little surface defects, imperfections, notches, scratches, etc. However, when a blank is hard, it is also more difficult to strike. The mark being struck on the product (107) is much more challenging in terms of attaining the desirable end visual effect, especially in the case where the effigy (211) comprises an embossed or elevated portion, etc. Generally, a much higher tonnage is required, and as a result, the dies have a shorter lifespan.

Conversely, when one uses a blank that is "softer" (for example, about 48 Rockwell), it is more likely to be subject to scratches, but it is easier to fill in during the striking step, and less tonnage is required, and thus causes less wear on equipment or dies being used.

As can be easily understood by a person skilled in the art, an important aspect of the present invention is that the system (101) and method of giveaway material can be used on products having different types of hardness, given that the present method of reducing giveaway material may be conveniently and optionally incorporated at different locations without affecting the overall disposition and/or layout of the overall conventional multi-step process.

Striking of the mint product (107) can be carried out in various different ways, such as for example: a) a mint product (107) can be single struck during the striking step; b) the mint product (107) can be double struck during the striking step; c) the mint product (107) can be struck with a plain collar (213); d) the mint product (107) can be struck with a serrated collar (213); etc. According to the present invention, the method of reducing giveaway material could ultimately be carried out after a striking step, if the visual appearance of the material having thus been removed is not a deterrent for the particular applications or purposes for which the mint product (107) is intended for.

According to another aspect of the present invention, there is also provided a mint product (107) having been processed with a system (101) or a method of reducing giveaway according to the present invention. It is worth mentioning however that the products (107) meant to used with the present invention are not necessarily limited to products (107) manufactured by or for mints, but rather can be any variety of products made of precious metals where there may be a need or an advantage to have giveaway material be removed, etc., and also that, in the case where the products (107) being processed are blanks, the blanks can be manufactured on location, or can be purchased from corresponding providers, etc., as can be easily understood by a person skilled in the art.

Furthermore, as may now be better appreciated, the system (101) and method for reducing giveaway material on manufacturing products (107) according to the present invention can be used on "new" products (107) or "old" products (107), on "finalized" products (107) or "intermediate" products (107) thereof, at "one" or "several" stages of a manufacturing or processing process of the product (107), and irrespectively of whether the product (107) is provided with a visual mark (ex. effigy, etc.) or not. Indeed, as explained earlier and for example, the present invention may be used for by various other types of entities than mints (refiners, smelters, etc.), with various other types of objects (cast bars, minted bars, minted coins, coin blanks, medallions, ingots, etc., even if these products (107) are unmarked or un-engraved, etc.), made of various other types of materials (gold, platinum, palladium, etc.) and in various other types of different forms (substantially solid form, sponge-like, etc.), without departing from the scope of the present invention, as can be easily understood by a person skilled in the ar.

Preferably, the components of the system (101) or machine according to the present invention are made of suitable materials, for properly sustaining the different loads to which the station may be subjected to and other parameters to be considered, as apparent to a person skilled in the art.

As can be easily understood by a person skilled in the art, in view of the present description and the accompanying drawings, various other modifications and/or additions could be made to the system (101) without departing from the scope of the present invention. For example, and in the preferred embodiments of the machine (103) illustrated in FIGS. 1-23, the system (101) may include one or several of the following: a collection box (255) for shaving vacuum extraction; at least one robot (257); an electrical cabinet (259); a vacuum generator (261); a main spindle drive (263); a Z-spindle drive (265) for moving blank to tool by a certain distance (ex. 30 mm); a planetary gear (267); cross roller guides (269); a ball screw (271); a tool axis drive (273) (ex. 5 mm); a harmonic drive (275); glass scales (277); a centering ring (279); guides (281) of centering ring; a camera lens cover (283); a pneumatic clamping drive (285); glide bearings (287); a wedge (289) driven by a pneumatic cylinder (291); a camera (293); a holder (295) for laser; a laser line (297) on blank; a tool insert (299); a tool holder (301); an inlet (303) for fluid (ex. cold compressed air, water, etc.); a pneumatic drive for star wheel (305); etc.

As may now be appreciated, the present invention is a substantial improvement over the prior art in that, by virtue of its design and components, as briefly explained herein, the system (101) according to the present invention, to overcomes several of the aforementioned prior art problems, providing for easy, accurate, functional and versatile system for reducing and/or removing, and recovering, giveaway material.

Namely, the present invention is advantageous over the prior art in that, for example: a) it enables to reduce and to recuperate giveaway material from a product (107) which normally would be simply "given away"; b) depending on the nature of the machine (103) and/or of the method, this manner of reducing and recovering giveaway material can be done in a very precise, systematic and repeatable manner; c) this translates in tremendous savings, particularly when the nature of the giveaway material being recovered is a precious metal; d) removal of the giveaway material can be conveniently carried out at different given location(s) of an existing conventional manufacturing process; e) giveaway material reduction from a given mint product (107) can also be done so as to ensure that the removal of the giveaway material on the resulting product (107) of said processed mint product (107) is practically unnoticeable, particularly when giveaway material is reduced just before a striking step; f) the present system and method can be used on products (107) having different types of hardness; g) the present system and method can be used on products (107) having different types of collars; h) the present system and method can be used on products (107) having different types of rims; i) the present system and method can be used on products (107) having different types of strikes; j) the present system and method do not introduce any pollutants (no cutting oils, etc.) in the overall manufacturing process and/or onto the mint products (107); k) etc.

To further demonstrate the superiority of the present invention, tests carried out by the Applicant have shown to enable to recuperate above 90% of the material giveaway, and that it is worth mentioning that even higher amounts could be attained if not limited by tolerances of existing machines. In the example given earlier, there was mention of the fact that some machines have a tolerance of +/−20 mg, therefore, this tolerance is preferably left on the mint product (107) as a preventive measure to ensure that the final product is above its legal trade weight.

Another substantial advantage of the present invention is that the use of the present system or method is not limited to the manufacturing or processing of new mint products (107), but ultimately, could be used on existing products (107), that are already in circulation, etc.

Although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims.

The invention claimed is:

1. A method of reducing giveaway material from a plurality of mint products, the method comprising the steps of:
   a) evaluating at least one physical parameter of a given mint product;
   b) comparing said at least one physical parameter with a minimum threshold physical parameter in order to determine an attainable range of giveaway material to be removed;
   c) projecting a targeted amount of giveaway material to be removed from the mint product to be processed depending on the attainable range of giveaway material; and
   d) removing the targeted amount of giveaway material via at least one surface of the mint product, within a proportion of a full extent of the at least one surface of the mint product where giveaway material is removed from.

2. The method according to claim 1, wherein step a) comprises the step of assigning an identifying tag to each one of the plurality of mint products to be processed, and further comprises the step of individually evaluating at least one physical parameter of each one of said mint products to be processed.

3. The method according to claim 1, wherein step c) comprises the step of scanning the mint product to be processed so as to recreate a geometrical profile thereof.

4. The method according to claim 3, wherein scanning of the mint product to be processed is done by relatively rotating the mint product with respect to a scanner.

5. The method according to claim 3, wherein scanning of the mint product to be processed is done by rotating the mint product with respect to a pivot axis.

6. The method according to claim 1, wherein step c) comprises the step of geometrically calculating the targeted amount of giveaway material to be removed.

7. The method according to claim 1, wherein step c) comprises the step of taking into account a tolerance from the process used in step d) to ensure that the at least one physical parameter of the mint product still exceeds the minimum threshold physical parameter after giveaway material has been removed from said mint product.

8. The method according to claim 1, wherein the targeted amount of giveaway material to be removed in step d) is proportional to the attainable range of giveaway material determined in step b).

9. The method according to claim 1, wherein removal of giveaway material in step d) is done by displacing the mint product with respect to a processing tool along at least one degree of motion.

10. The method according to claim 1, wherein removal of giveaway material in step d) is done by relatively displacing the mint product to be processed vertically with respect to a processing tool.

11. The method according to claim 1, wherein removal of giveaway material in step d) is done by relatively rotating the mint product to be processed with respect to a processing tool.

12. The method according to claim 1, wherein the mint product to be processed is rotated at a rate of about 3500 rpm.

13. The method according to claim 1, wherein removal of giveaway material in step d) is done using at least one cutting profile selected from a predetermined set of cutting profiles.

14. The method according to claim 1, wherein removal of giveaway material in step d) is done using at least one cutting profile selected depending on an amount of giveaway material to be removed.

15. The method according to claim 1, wherein a chamfer cutting profile is used when there is a given range of amount of giveaway material to be removed from the mint product to be processed.

16. The method according to claim 15, wherein a curvilinear cutting profile is used when there is another given range of amount of giveaway material to be removed from the mint product to be processed.

17. The method according to claim 16, wherein a radial-component reducing cutting profile is also used when the amount of giveaway material to be removed exceeds a given range of amount of giveaway material to be removed from the mint product to be processed.

18. The method according to claim 1, wherein the proportion is at least about 60% of the full extent of the least one surface of the mint product where giveaway material is removed from.

19. The method according to claim 1, wherein the proportion is at least about 90% of the full extent of the least one surface of the mint product where giveaway material is removed from.

20. The method according to claim 1, wherein the proportion is between about 90% and about 95% of the full extent of the least one surface of the mint product where giveaway material is removed from.

21. The method according to claim 1, wherein removal of giveaway material in step d) is done in accordance with at least one operating parameter.

22. The method according to claim 21, wherein the at least one operating parameter is selected depending on at least one physical parameter of the mint product to be processed.

23. The method according to claim 21, wherein the at least one operating parameter includes a cutting feed rate.

24. The method according to claim 23, wherein the cutting feed rate is between about 0.04 mm and about 0.12 mm per rotation of the mint product to be processed.

25. The method according to claim 1, wherein removal of giveaway material in step d) is done by means of a cutting tool having a cutting tip.

26. The method according to claim 25, wherein the cutting tool has a rounded cutting tip.

27. The method according to claim 26, wherein the rounded cutting tip has a radius of about 0.02 mm.

28. The method according to claim 25, wherein the cutting tool is a carbide cutting tool.

29. The method according to claim 25, wherein the cutting tool is provided with a chip breaker.

30. The method according to claim 1, wherein removal of giveaway material in step d) is done by a process selected from the group consisting of polishing, brushing, grinding, machining, milling, drilling, chemical etching and using a laser.

31. The method according to claim 1, wherein removal of giveaway material in step d) is done so as to leave a non-polished surface on the least one surface of the mint product where giveaway material is removed from.

32. The method according to claim 1, wherein removal of giveaway material in step d) is done so as to leave a plurality of surface grooves on the least one surface of the mint product where giveaway material is removed from.

33. The method according to claim 1, wherein the targeted amount of giveaway material to be removed in step d) is removed from a side surface disposed between opposite obverse and reverse surfaces of the mint product to be processed.

34. The method according to claim 1, wherein the targeted amount of giveaway material removed from the mint product in step d) takes on a form selected from the group consisting of shavings, particles, dust, fumes and liquid extracts.

35. The method according to claim 34, wherein the targeted amount of giveaway material removed from the mint product in step d) takes on the form of shavings which are recuperated.

36. The method according to claim 1, wherein the giveaway material removed from the mint product in step d) complies with a given criteria of quality assurance in terms of visual appearance on the final mint product having been processed.

37. The method according to claim 1, wherein removal of giveaway material in step d) is done using an abrasive assembly.

38. The method according to claim 37, wherein the mint product to be processed is brought to and maintained with respect to the abrasive assembly in order to remove the targeted amount of giveaway material via at least one portion of said mint product.

39. The method according to claim 1, wherein step d) is carried out in a controlled confined environment in order to prevent loss of giveaway material from said environment.

40. The method according to claim 1, wherein the method further comprises the step of:
   e) recuperating giveaway material having been removed in step d).

41. The method according to claim 40, wherein step e) is carried out in a controlled confined environment in order to prevent loss of giveaway material from said environment.

42. The method according to claim 40, wherein step e) also includes the step of sucking giveaway material having been removed in step d) with a suction assembly.

43. The method according to claim 40, wherein step e) also including the step of filtering giveaway material having been removed in step d) with a filtering assembly.

44. The method according to claim 1, wherein the method further comprises the steps of re-evaluating said at least one physical parameter of the mint product; and repeating steps a) to d) if the mint product still contains an amount of giveaway material that is outside a predetermined range of allowable tolerances.

45. The method according to claim 1, wherein the mint product is a blank prior to being provided with a mark, and wherein step a) comprises the steps of:
   i) providing a blank; and
   ii) evaluating at least one physical parameter of the blank.

46. The method according to claim 45, wherein step i) comprises the step of providing a plurality of blanks, and wherein step ii) comprises the step of evaluation at least one physical parameter of each blank on an individual basis.

47. The method according to claim 45, wherein step b) comprises the step of rejecting a blank if the at least one physical parameter of said mint product is below the minimum threshold physical parameter.

48. The method according to claim 1, wherein the at least one physical parameter is selected from the group consisting of weight, dimension, geometric profile, type of material, purity of material, material density and material hardness of the mint product to be processed.

49. The method according to claim 1, wherein the minimum threshold physical parameter is less than about 101 troy ounce (ozt).

50. The method according to claim 1, wherein the minimum threshold physical parameter is 1 troy ounce (ozt) which corresponds to about 31.1034768 grams.

51. The method according to claim 1, wherein the minimum threshold physical parameter is at least about 31.1066 grams when the mint product to be processed is made of silver having a purity of about 99.99%.

52. The method according to claim 1, wherein the minimum threshold physical parameter is about 31.1346 grams when the mint product to be processed is made of silver having a purity of about 99.9%.

53. The method according to claim 1, wherein the minimum threshold physical parameter is about 33.9298 grams when the mint product to be processed is made of 22-carats gold.

54. The method according to claim 1, wherein the mint product is a mint product selected from the group consisting of a bullion product, an investment product, a numismatic product, a circulation product, a medal product, a medallion product, an ingot bar, a bar product, a blank product and a token product.

55. The method according to claim 54, wherein a final end product of the mint product to be processed by the method is a bullion investment product.

56. The method according to claim 1, wherein the mint product is made of a precious metal.

57. The method according to claim 1, wherein the mint product is made of a solid precious metal selected from the group consisting of gold, silver, platinum and palladium.

58. The method according to claim 1, wherein the mint product is a substantially solid mint product.

59. The method according to claim 1, wherein the mint product comprises top and bottom surfaces, and a side surface extending thereinbetween.

60. The method according to claim 59, wherein the mint product further comprises at least one rim.

61. The method according to claim 1, wherein the mint product comprises top and bottom rims.

62. The method according to claim 1, wherein removal of giveaway material in step d) is done via at least one surface of the mint product to be processed, and wherein said at least one surface is selected from the group consisting of a top surface, a bottom surface, a side surface and a rim of the mint product to be processed.

63. The method according to claim 1, wherein the mint product comprises an overall geometrical shape selected from the group consisting of round, polygonal, triangular, rectangular, square, pentagonal, hexagonal, heptagonal and octagonal.

64. The method according to claim 1, wherein the method is an automated method carried out via a corresponding machine or process.

65. The method according to claim 64, wherein the automated method processes a given output of products per minute, said output being adjustable by selectively adjusting corresponding parameters of the machine or process.

66. The method according to claim 1, wherein the method of reducing giveaway material is carried out between a blanking step and a rimming step of a multi-step process of manufacturing the mint product.

67. The method according to claim 1, wherein the method of reducing giveaway material is carried out between a rimming step and a burnishing step of a multi-step process of manufacturing the mint product.

68. The method according to claim 1, wherein the method of reducing giveaway material is carried out before a striking step of a multi-step process of manufacturing the mint product.

69. The method according to claim 68, wherein the mint product is struck within a plain collar.

70. The method according to claim 68, wherein the mint product is struck within a serrated collar.

71. The method according to claim 1, wherein the mint product is single-struck during a striking step.

72. The method according to claim 1, wherein the mint product is double-struck during a striking step.

73. A mint product having been processed with a method of reducing giveaway material according to claim 1, wherein the mint product comprises at least one surface having a targeted amount of giveaway material removed from said at least one surface, and wherein a final weight of remaining giveaway material present in the mint product is less than about 5% of a final overall weight of the material constituting the mint product.

* * * * *